United States Patent
Yin et al.

(10) Patent No.: US 11,550,886 B2
(45) Date of Patent: *Jan. 10, 2023

(54) DISAMBIGUATION AND AUTHENTICATION OF DEVICE USERS

(71) Applicant: Experian Information Solutions, Inc., Costa Mesa, CA (US)

(72) Inventors: Steven Yin, San Diego, CA (US); Kevin Chen, San Diego, CA (US); Eric Haller, Escondido, CA (US); Alan Tsang, San Diego, CA (US); David Kerry, Nottinghamshire (GB); Derek Toub, San Diego, CA (US); Jack Yu, San Diego, CA (US); Zhixuan Wang, Irvine, CA (US); Christopher Wheeler, Nottingham (GB); Sreeram Upendran, Tamil Nadu (IN)

(73) Assignee: Experian Information Solutions, Inc., Costa Mesa, CA (US)

( * ) Notice: Subject to any disclaimer, the term of this patent is extended or adjusted under 35 U.S.C. 154(b) by 351 days.

This patent is subject to a terminal disclaimer.

(21) Appl. No.: 16/864,443

(22) Filed: May 1, 2020

(65) Prior Publication Data

US 2020/0349240 A1 Nov. 5, 2020

Related U.S. Application Data

(63) Continuation of application No. 15/684,590, filed on Aug. 23, 2017, now Pat. No. 10,678,894.
(Continued)

(51) Int. Cl.
*G06F 21/31* (2013.01)
*G06F 16/903* (2019.01)
(Continued)

(52) U.S. Cl.
CPC ........ *G06F 21/31* (2013.01); *G06F 16/90335* (2019.01); *G06F 21/316* (2013.01);
(Continued)

(58) Field of Classification Search
CPC .. G06F 21/31; G06F 16/90335; G06F 21/316; G06F 3/0481; G06F 2221/2111;
(Continued)

(56) References Cited

U.S. PATENT DOCUMENTS

| | | | |
|---|---|---|---|
| 3,316,395 | A | 4/1967 | Lavin et al. |
| 4,774,664 | A | 9/1988 | Campbell et al. |

(Continued)

FOREIGN PATENT DOCUMENTS

| | | |
|---|---|---|
| CA | 2 865 348 | 3/2015 |
| CA | 2 895 452 | 1/2016 |

(Continued)

OTHER PUBLICATIONS

U.S. Appl. No. 12/705,489, filed Feb. 12, 2010, Bargoli et al.
(Continued)

*Primary Examiner* — Theodore C Parsons
*Assistant Examiner* — Howard H. Louie
(74) *Attorney, Agent, or Firm* — Knobbe, Martens, Olson & Bear, LLP

(57) ABSTRACT

Features are described for efficiently and accurately identifying a user of an electronic device with limited user interaction. The features include receiving a mobile device identifier from the mobile device. The features include transmitting the mobile device identifier to a service provider associated with the mobile device. The features include receiving information identifying the user from the service provider. The features include identifying a set of candidates associated with at least a portion of the information. The features include generating a metric for the can-
(Continued)

didates included in the set of candidates. An individual metric indicates a degree of relatedness between a value for the user for the at least one data field and a value for a candidate for the at least one data field. The features include identifying the user as a specific candidate included in the set of candidates based on the metric corresponding to a threshold.

20 Claims, 9 Drawing Sheets

Related U.S. Application Data

(60) Provisional application No. 62/459,919, filed on Feb. 16, 2017, provisional application No. 62/379,019, filed on Aug. 24, 2016.

(51) Int. Cl.
```
H04W 12/06        (2021.01)
H04W 12/08        (2021.01)
H04W 12/02        (2009.01)
G06Q 40/02        (2012.01)
H04W 4/021        (2018.01)
H04W 88/02        (2009.01)
H04W 4/029        (2018.01)
G06F 3/0481       (2022.01)
H04W 4/14         (2009.01)
H04L 9/40         (2022.01)
```
(52) U.S. Cl.
CPC ............ *G06Q 40/025* (2013.01); *H04L 63/08* (2013.01); *H04L 63/108* (2013.01); *H04W 4/021* (2013.01); *H04W 12/02* (2013.01); *H04W 12/06* (2013.01); *H04W 12/08* (2013.01); *H04W 88/02* (2013.01); *G06F 3/0481* (2013.01); *G06F 2221/2111* (2013.01); *H04W 4/029* (2018.02); *H04W 4/14* (2013.01)

(58) Field of Classification Search
CPC .... G06F 16/903; G06Q 40/025; G06Q 40/02; H04L 63/08; H04L 63/108; H04W 4/021; H04W 12/02; H04W 12/06; H04W 12/08; H04W 88/02; H04W 4/029; H04W 4/14
See application file for complete search history.

(56) References Cited

U.S. PATENT DOCUMENTS

| | | |
|---|---|---|
| 4,775,935 A | 10/1988 | Yourick |
| 4,827,508 A | 5/1989 | Shear |
| 4,868,570 A | 9/1989 | Davis |
| 4,872,113 A | 10/1989 | Dinerstein |
| 4,935,870 A | 6/1990 | Burk, Jr. et al. |
| 4,982,346 A | 1/1991 | Girouard et al. |
| 5,056,019 A | 10/1991 | Schultz et al. |
| 5,201,010 A | 4/1993 | Deaton et al. |
| 5,247,575 A | 9/1993 | Sprague et al. |
| 5,274,547 A | 12/1993 | Zoffel et al. |
| 5,283,731 A | 2/1994 | Lalonde et al. |
| 5,305,195 A | 4/1994 | Murphy |
| 5,325,509 A | 6/1994 | Lautzenheiser |
| 5,341,429 A | 8/1994 | Stringer et al. |
| 5,347,632 A | 9/1994 | Filepp et al. |
| 5,454,030 A | 9/1995 | de Oliveira et al. |
| 5,459,306 A | 10/1995 | Stein et al. |
| 5,504,675 A | 4/1996 | Cragun et al. |
| 5,515,098 A | 5/1996 | Carles |
| 5,528,701 A | 6/1996 | Aref |
| 5,555,409 A | 9/1996 | Leenstra, Sr. et al. |
| 5,560,008 A | 9/1996 | Johnson et al. |
| 5,563,783 A | 10/1996 | Stolfo et al. |
| 5,583,380 A | 12/1996 | Larsen et al. |
| 5,592,560 A | 1/1997 | Deaton et al. |
| 5,627,973 A | 5/1997 | Armstrong et al. |
| 5,629,982 A | 5/1997 | Micali |
| 5,630,127 A | 5/1997 | Moore et al. |
| 5,640,551 A | 6/1997 | Chu et al. |
| 5,649,114 A | 7/1997 | Deaton et al. |
| 5,655,129 A | 8/1997 | Ito |
| 5,659,731 A | 8/1997 | Gustafson |
| 5,661,516 A | 8/1997 | Carles |
| 5,666,528 A | 9/1997 | Thai |
| 5,689,565 A | 11/1997 | Spies et al. |
| 5,696,898 A | 12/1997 | Baker et al. |
| 5,696,907 A | 12/1997 | Tom |
| 5,717,923 A | 2/1998 | Dedrick |
| 5,724,521 A | 3/1998 | Dedrick |
| 5,737,732 A | 4/1998 | Gibson et al. |
| 5,739,512 A | 4/1998 | Tognazzini |
| 5,740,549 A | 4/1998 | Reilly et al. |
| 5,745,654 A | 4/1998 | Titan |
| 5,745,694 A | 4/1998 | Egawa et al. |
| 5,754,938 A | 5/1998 | Herz et al. |
| 5,768,423 A | 6/1998 | Aref et al. |
| 5,774,357 A | 6/1998 | Hoffberg et al. |
| 5,774,692 A | 6/1998 | Boyer et al. |
| 5,774,868 A | 6/1998 | Cragun et al. |
| 5,774,870 A | 6/1998 | Storey |
| 5,778,405 A | 7/1998 | Ogawa |
| 5,797,136 A | 8/1998 | Boyer et al. |
| 5,812,840 A | 9/1998 | Shwartz |
| 5,819,092 A | 10/1998 | Ferguson et al. |
| 5,819,226 A | 10/1998 | Gopinathan et al. |
| 5,822,410 A | 10/1998 | McCausland et al. |
| 5,822,750 A | 10/1998 | Jou et al. |
| 5,822,751 A | 10/1998 | Gray et al. |
| 5,825,884 A | 10/1998 | Zdepski et al. |
| 5,828,837 A | 10/1998 | Eikland |
| 5,835,915 A | 11/1998 | Carr et al. |
| 5,848,396 A | 12/1998 | Gerace |
| 5,857,175 A | 1/1999 | Day et al. |
| 5,864,822 A | 1/1999 | Baker, III |
| 5,870,721 A | 2/1999 | Norris |
| 5,873,068 A | 2/1999 | Beaumont et al. |
| 5,875,108 A | 2/1999 | Hoffberg et al. |
| 5,881,131 A | 3/1999 | Farris et al. |
| 5,884,287 A | 3/1999 | Edesess |
| 5,889,799 A | 3/1999 | Grossman et al. |
| 5,889,958 A | 3/1999 | Willens |
| 5,890,140 A | 3/1999 | Clark et al. |
| 5,905,985 A | 5/1999 | Malloy et al. |
| 5,907,608 A | 5/1999 | Shaffer et al. |
| 5,907,830 A | 5/1999 | Engel et al. |
| 5,912,839 A | 6/1999 | Ovshinsky et al. |
| 5,915,243 A | 6/1999 | Smolen |
| 5,924,082 A | 7/1999 | Silverman et al. |
| 5,926,800 A | 7/1999 | Baronowski et al. |
| 5,930,764 A | 7/1999 | Melchione et al. |
| 5,930,776 A | 7/1999 | Dykstra et al. |
| 5,933,813 A | 8/1999 | Teicher et al. |
| 5,944,790 A | 8/1999 | Levy |
| 5,948,061 A | 9/1999 | Merriman et al. |
| 5,950,179 A | 9/1999 | Buchanan et al. |
| 5,953,707 A | 9/1999 | Huang et al. |
| 5,956,693 A | 9/1999 | Geerlings |
| 5,963,932 A | 10/1999 | Jakobsson et al. |
| 5,966,695 A | 10/1999 | Melchione et al. |
| 5,974,396 A | 10/1999 | Anderson et al. |
| 5,978,780 A | 11/1999 | Watson |
| 5,991,735 A | 11/1999 | Gerace |
| 6,009,415 A | 12/1999 | Shurling et al. |
| 6,014,688 A | 1/2000 | Venkatraman et al. |
| 6,018,723 A | 1/2000 | Siegel et al. |
| 6,026,368 A | 2/2000 | Brown et al. |
| 6,029,139 A | 2/2000 | Cunningham et al. |
| 6,044,357 A | 3/2000 | Garg |
| 6,055,573 A | 4/2000 | Gardenswartz et al. |
| 6,061,658 A | 5/2000 | Chou et al. |
| 6,061,691 A | 5/2000 | Fox |

(56) References Cited

U.S. PATENT DOCUMENTS

| | | |
|---|---|---|
| 6,064,973 A | 5/2000 | Smith et al. |
| 6,064,990 A | 5/2000 | Goldsmith |
| 6,070,142 A | 5/2000 | McDonough et al. |
| 6,070,147 A | 5/2000 | Harms et al. |
| 6,073,140 A | 6/2000 | Morgan et al. |
| 6,073,241 A | 6/2000 | Rosenberg et al. |
| 6,078,892 A | 6/2000 | Anderson et al. |
| 6,085,169 A | 7/2000 | Walker et al. |
| 6,098,052 A | 8/2000 | Kosiba et al. |
| 6,101,486 A | 8/2000 | Roberts et al. |
| 6,115,693 A | 9/2000 | McDonough et al. |
| 6,119,103 A | 9/2000 | Basch et al. |
| 6,121,901 A | 9/2000 | Welch et al. |
| 6,128,602 A | 10/2000 | Northington et al. |
| 6,128,624 A | 10/2000 | Papierniak et al. |
| 6,144,948 A | 11/2000 | Walker et al. |
| 6,144,957 A | 11/2000 | Cohen et al. |
| 6,151,601 A | 11/2000 | Papierniak et al. |
| 6,154,729 A | 11/2000 | Cannon et al. |
| 6,178,442 B1 | 1/2001 | Yamazaki |
| 6,182,060 B1 | 1/2001 | Hedgcock et al. |
| 6,202,053 B1 | 3/2001 | Christiansen et al. |
| 6,208,979 B1 | 3/2001 | Sinclair |
| 6,209,033 B1 | 3/2001 | Datta et al. |
| 6,223,171 B1 | 4/2001 | Chaudhuri et al. |
| 6,233,566 B1 | 5/2001 | Levine et al. |
| 6,236,977 B1 | 5/2001 | Verba et al. |
| 6,256,630 B1 | 7/2001 | Gilai et al. |
| 6,263,334 B1 | 7/2001 | Fayyad et al. |
| 6,263,337 B1 | 7/2001 | Fayyad et al. |
| 6,266,649 B1 | 7/2001 | Linden et al. |
| 6,269,343 B1 | 7/2001 | Pallakoff |
| 6,289,318 B1 | 9/2001 | Barber |
| 6,298,330 B1 | 10/2001 | Gardenswartz et al. |
| 6,304,860 B1 | 10/2001 | Martin et al. |
| 6,304,869 B1 | 10/2001 | Moore et al. |
| 6,308,210 B1 | 10/2001 | Fields et al. |
| 6,317,752 B1 | 11/2001 | Lee et al. |
| 6,324,566 B1 | 11/2001 | Himmel et al. |
| 6,330,546 B1 | 12/2001 | Gopinathan et al. |
| 6,334,110 B1 | 12/2001 | Walter et al. |
| 6,339,769 B1 | 1/2002 | Cochrane et al. |
| 6,366,903 B1 | 4/2002 | Agrawal et al. |
| 6,385,592 B1 | 5/2002 | Angles et al. |
| 6,385,594 B1 | 5/2002 | Lebda et al. |
| 6,397,197 B1 | 5/2002 | Gindlesperger |
| 6,412,012 B1 | 6/2002 | Bieganski et al. |
| 6,424,956 B1 | 7/2002 | Werbos |
| 6,430,539 B1 | 8/2002 | Lazarus et al. |
| 6,442,577 B1 | 8/2002 | Britton et al. |
| 6,445,975 B1 | 9/2002 | Ramsey |
| 6,456,979 B1 | 9/2002 | Flagg |
| 6,460,036 B1 | 10/2002 | Herz |
| 6,477,509 B1 | 11/2002 | Hammons et al. |
| 6,496,819 B1 | 12/2002 | Bello et al. |
| 6,505,168 B1 | 1/2003 | Rothman et al. |
| 6,505,176 B2 | 1/2003 | DeFrancesco, Jr. et al. |
| 6,513,018 B1 | 1/2003 | Culhane |
| 6,523,022 B1 | 2/2003 | Hobbs |
| 6,523,041 B1 | 2/2003 | Morgan et al. |
| 6,532,450 B1 | 3/2003 | Brown et al. |
| 6,543,683 B2 | 4/2003 | Hoffman |
| 6,546,257 B1 | 4/2003 | Stewart et al. |
| 6,549,919 B2 | 4/2003 | Lambert et al. |
| 6,549,944 B1 | 4/2003 | Weinberg et al. |
| 6,574,623 B1 | 6/2003 | Laung et al. |
| 6,598,030 B1 | 7/2003 | Siegel et al. |
| 6,604,089 B1 | 8/2003 | Van Horn et al. |
| 6,606,744 B1 | 8/2003 | Mikurak |
| 6,611,816 B2 | 8/2003 | Lebda et al. |
| 6,615,247 B1 | 9/2003 | Murphy |
| 6,622,266 B1 | 9/2003 | Goddard et al. |
| 6,623,529 B1 | 9/2003 | Lakritz |
| 6,631,356 B1 | 10/2003 | Van Horn et al. |
| 6,631,496 B1 | 10/2003 | Li et al. |
| 6,640,215 B1 | 10/2003 | Galperin et al. |
| 6,651,220 B1 | 11/2003 | Penteroudakis et al. |
| 6,658,393 B1 | 12/2003 | Basch et al. |
| 6,665,715 B1 | 12/2003 | Houri |
| 6,671,818 B1 | 12/2003 | Mikurak |
| 6,698,020 B1 | 2/2004 | Zigmond et al. |
| 6,748,426 B1 | 6/2004 | Shaffer et al. |
| 6,757,740 B1 | 6/2004 | Parekh et al. |
| 6,766,327 B2 | 7/2004 | Morgan, Jr. et al. |
| 6,801,909 B2 | 10/2004 | Delgado et al. |
| 6,804,701 B2 | 10/2004 | Muret et al. |
| 6,807,533 B1 | 10/2004 | Land et al. |
| 6,810,356 B1 | 10/2004 | Garcia-Franco et al. |
| 6,839,682 B1 | 1/2005 | Blume et al. |
| 6,847,934 B1 | 1/2005 | Lin et al. |
| 6,873,972 B1 | 3/2005 | Marcial et al. |
| 6,873,979 B2 | 3/2005 | Fishman et al. |
| 6,901,406 B2 | 5/2005 | Nabe et al. |
| 6,915,269 B1 | 7/2005 | Shapiro et al. |
| 6,925,441 B1 | 8/2005 | Jones, III et al. |
| 6,959,281 B1 | 10/2005 | Freeling et al. |
| 6,970,830 B1 | 11/2005 | Samra et al. |
| 6,983,379 B1 | 1/2006 | Spalink et al. |
| 6,983,478 B1 | 1/2006 | Grauch et al. |
| 6,985,882 B1 | 1/2006 | Del Sesto |
| 6,993,493 B1 | 1/2006 | Galperin et al. |
| 6,999,941 B1 | 2/2006 | Agarwal |
| 7,003,504 B1 | 2/2006 | Angus et al. |
| 7,003,792 B1 | 2/2006 | Yuen |
| 7,013,285 B1 | 3/2006 | Rebane |
| 7,023,980 B2 | 4/2006 | Lenard |
| 7,028,052 B2 | 4/2006 | Chapman et al. |
| 7,031,945 B1 | 4/2006 | Donner |
| 7,033,792 B2 | 4/2006 | Zhong et al. |
| 7,039,607 B2 | 5/2006 | Watarai et al. |
| 7,047,251 B2 | 5/2006 | Reed et al. |
| 7,050,982 B2 | 5/2006 | Sheinson et al. |
| 7,050,989 B1 | 5/2006 | Hurt et al. |
| 7,054,828 B2 | 5/2006 | Heching et al. |
| 7,069,240 B2 | 6/2006 | Spero et al. |
| 7,072,853 B2 | 7/2006 | Shkedi |
| 7,072,963 B2 | 7/2006 | Anderson et al. |
| 7,076,442 B2 | 7/2006 | Lin et al. |
| 7,080,027 B2 | 7/2006 | Luby et al. |
| 7,082,435 B1 | 7/2006 | Guzman et al. |
| 7,085,734 B2 | 8/2006 | Grant et al. |
| 7,092,898 B1 | 8/2006 | Mattick et al. |
| 7,117,172 B1 | 10/2006 | Black |
| 7,136,448 B1 | 11/2006 | Venkataperumal et al. |
| 7,139,734 B2 | 11/2006 | Nathans et al. |
| 7,150,030 B1 | 12/2006 | Eldering et al. |
| 7,152,018 B2 | 12/2006 | Wicks |
| 7,152,237 B2 | 12/2006 | Flickinger et al. |
| 7,155,508 B2 | 12/2006 | Sankuratripati et al. |
| 7,165,037 B2 | 1/2007 | Lazarus et al. |
| 7,184,974 B2 | 2/2007 | Shishido |
| 7,185,016 B1 | 2/2007 | Rasmussen |
| 7,185,353 B2 | 2/2007 | Schlack |
| 7,191,144 B2 | 3/2007 | White |
| 7,194,420 B2 | 3/2007 | Ikezawa et al. |
| 7,200,602 B2 | 4/2007 | Jonas |
| 7,206,768 B1 | 4/2007 | deGroeve et al. |
| 7,212,979 B1 | 5/2007 | Matz et al. |
| 7,222,101 B2 | 5/2007 | Bishop et al. |
| 7,236,950 B2 | 6/2007 | Savage et al. |
| 7,240,059 B2 | 7/2007 | Bayliss et al. |
| 7,249,048 B1 | 7/2007 | O'Flaherty |
| 7,275,083 B1 | 9/2007 | Seibel et al. |
| 7,277,869 B2 | 10/2007 | Starkman |
| 7,277,900 B1 | 10/2007 | Ganesh et al. |
| 7,296,734 B2 | 11/2007 | Pliha |
| 7,305,364 B2 | 12/2007 | Nabe et al. |
| 7,308,418 B2 | 12/2007 | Malek et al. |
| 7,310,617 B1 | 12/2007 | Cunningham |
| 7,313,538 B2 | 12/2007 | Wilmes et al. |
| 7,313,622 B2 | 12/2007 | Lee et al. |
| 7,314,166 B2 | 1/2008 | Anderson et al. |
| 7,328,169 B2 | 2/2008 | Temares et al. |
| 7,343,294 B1 | 3/2008 | Sandholm et al. |

(56) References Cited

U.S. PATENT DOCUMENTS

| | | |
|---|---|---|
| 7,346,540 B2 | 3/2008 | Lin et al. |
| 7,360,251 B2 | 4/2008 | Spalink et al. |
| 7,363,308 B2 | 4/2008 | Dillon et al. |
| 7,366,694 B2 | 4/2008 | Lazerson |
| 7,367,011 B2 | 4/2008 | Ramsey et al. |
| 7,370,044 B2 | 5/2008 | Mulhern et al. |
| 7,370,057 B2 | 5/2008 | Burdick et al. |
| 7,376,603 B1 | 5/2008 | Mayr et al. |
| 7,376,714 B1 | 5/2008 | Gerken |
| 7,383,227 B2 | 6/2008 | Weinflash et al. |
| 7,386,786 B2 | 6/2008 | Davis et al. |
| 7,392,203 B2 | 6/2008 | Edison et al. |
| 7,392,216 B1 | 6/2008 | Palmgren et al. |
| 7,395,273 B2 | 7/2008 | Khan et al. |
| 7,398,225 B2 | 7/2008 | Voltmer et al. |
| 7,398,226 B2 | 7/2008 | Haines et al. |
| 7,403,923 B2 | 7/2008 | Elliott et al. |
| 7,403,942 B1 | 7/2008 | Bayliss |
| 7,421,322 B1 | 9/2008 | Silversmith et al. |
| 7,424,439 B1 | 9/2008 | Fayyad et al. |
| 7,428,498 B2 | 9/2008 | Voltmer et al. |
| 7,428,509 B2 | 9/2008 | Klebanoff |
| 7,428,526 B2 | 9/2008 | Miller et al. |
| 7,444,302 B2 | 10/2008 | Hu et al. |
| 7,451,095 B1 | 11/2008 | Bradley et al. |
| 7,458,508 B1 | 12/2008 | Shao et al. |
| 7,467,096 B2 | 12/2008 | Antonucci et al. |
| 7,467,106 B1 | 12/2008 | Levine et al. |
| 7,467,127 B1 | 12/2008 | Baccash et al. |
| 7,472,088 B2 | 12/2008 | Taylor et al. |
| 7,496,524 B2 | 2/2009 | Voltmer et al. |
| 7,499,868 B2 | 3/2009 | Galperin et al. |
| 7,505,938 B2 | 3/2009 | Lang et al. |
| 7,529,689 B2 | 5/2009 | Rowan |
| 7,536,329 B2 | 5/2009 | Goldberg et al. |
| 7,536,346 B2 | 5/2009 | Aliffi et al. |
| 7,536,348 B2 | 5/2009 | Shao et al. |
| 7,546,266 B2 | 6/2009 | Beirne et al. |
| 7,546,619 B2 | 6/2009 | Anderson et al. |
| 7,556,192 B2 | 7/2009 | Wokaty, Jr. |
| 7,562,184 B2 | 7/2009 | Henmi et al. |
| 7,565,153 B2 | 7/2009 | Alcock et al. |
| 7,571,139 B1 | 8/2009 | Giordano et al. |
| 7,580,856 B1 | 8/2009 | Pliha |
| 7,584,126 B1 | 9/2009 | White |
| 7,584,149 B1 | 9/2009 | Bishop et al. |
| 7,590,589 B2 | 9/2009 | Hoffberg |
| 7,593,893 B1 | 9/2009 | Ladd et al. |
| 7,596,512 B1 | 9/2009 | Raines et al. |
| 7,596,716 B2 | 9/2009 | Frost et al. |
| 7,606,778 B2 | 10/2009 | Dewar |
| 7,610,243 B2 | 10/2009 | Haggerty et al. |
| 7,610,257 B1 | 10/2009 | Abrahams |
| 7,613,628 B2 | 11/2009 | Ariff et al. |
| 7,613,629 B2 | 11/2009 | Antonucci et al. |
| 7,617,136 B1 | 11/2009 | Lessing et al. |
| 7,617,160 B1 | 11/2009 | Grove et al. |
| 7,636,941 B2 | 12/2009 | Blinn et al. |
| 7,653,592 B1 | 1/2010 | Flaxman et al. |
| 7,653,593 B2 | 1/2010 | Zarikian et al. |
| 7,668,769 B2 | 2/2010 | Baker et al. |
| 7,668,840 B2 | 2/2010 | Bayliss et al. |
| 7,672,865 B2 | 3/2010 | Kumar et al. |
| 7,672,870 B2 | 3/2010 | Haines et al. |
| 7,672,897 B2 | 3/2010 | Chung et al. |
| 7,676,410 B2 | 3/2010 | Petralia |
| 7,685,021 B2 | 3/2010 | Kumar et al. |
| 7,686,214 B1 | 3/2010 | Shao et al. |
| 7,689,494 B2 | 3/2010 | Torre et al. |
| 7,689,506 B2 | 3/2010 | Fei et al. |
| 7,689,528 B2 | 3/2010 | Zheng |
| 7,693,787 B2 | 4/2010 | Provinse |
| 7,698,163 B2 | 4/2010 | Reed et al. |
| 7,698,236 B2 | 4/2010 | Cox et al. |
| 7,707,059 B2 | 4/2010 | Reed et al. |
| 7,707,102 B2 | 4/2010 | Rothstein |
| 7,711,635 B2 | 5/2010 | Steele et al. |
| 7,711,636 B2 | 5/2010 | Robida et al. |
| 7,715,546 B2 | 5/2010 | Pagel et al. |
| 7,720,750 B2 | 5/2010 | Brody |
| 7,725,300 B2 | 5/2010 | Pinto et al. |
| 7,730,509 B2 | 6/2010 | Boulet et al. |
| 7,734,523 B1 | 6/2010 | Cui et al. |
| 7,734,570 B2 | 6/2010 | Bachman et al. |
| 7,739,142 B2 | 6/2010 | Chand et al. |
| 7,742,982 B2 | 6/2010 | Chaudhuri et al. |
| 7,747,480 B1 | 6/2010 | Agresta et al. |
| 7,747,559 B2 | 6/2010 | Leitner et al. |
| 7,752,236 B2 | 7/2010 | Williams et al. |
| 7,761,379 B2 | 7/2010 | Zoldi et al. |
| 7,769,998 B2 | 8/2010 | Lynch et al. |
| 7,783,515 B1 | 8/2010 | Kumar et al. |
| 7,783,534 B2 | 8/2010 | Armstrong et al. |
| 7,783,562 B1 | 8/2010 | Ellis |
| 7,788,147 B2 | 8/2010 | Haggerty et al. |
| 7,792,702 B1 | 9/2010 | Katz et al. |
| 7,793,835 B1 | 9/2010 | Coggeshall et al. |
| 7,797,252 B2 | 9/2010 | Rosskamm et al. |
| 7,801,843 B2 | 9/2010 | Kumar et al. |
| 7,805,345 B2 | 9/2010 | Abrahams et al. |
| 7,813,955 B2 | 10/2010 | Ariff et al. |
| 7,814,004 B2 | 10/2010 | Haggerty et al. |
| 7,835,940 B2 | 11/2010 | Kowalchuk |
| 7,848,972 B1 | 12/2010 | Sharma |
| 7,848,978 B2 | 12/2010 | Imrey et al. |
| 7,848,987 B2 | 12/2010 | Haig |
| 7,849,004 B2 | 12/2010 | Choudhuri et al. |
| 7,853,518 B2 | 12/2010 | Cagan |
| 7,853,700 B2 | 12/2010 | Lee et al. |
| 7,853,998 B2 | 12/2010 | Blaisdell et al. |
| 7,856,386 B2 | 12/2010 | Hazlehurst et al. |
| 7,856,397 B2 | 12/2010 | Whipple et al. |
| 7,860,786 B2 | 12/2010 | Blackburn et al. |
| 7,877,320 B1 | 1/2011 | Downey |
| 7,877,322 B2 | 1/2011 | Nathans et al. |
| 7,890,367 B2 | 2/2011 | Senghore et al. |
| 7,899,750 B1 | 3/2011 | Klieman et al. |
| 7,904,366 B2 | 3/2011 | Pogust |
| 7,912,865 B2 | 3/2011 | Akerman et al. |
| 7,925,549 B2 | 4/2011 | Looney et al. |
| 7,925,917 B1 | 4/2011 | Roy |
| 7,930,242 B2 | 4/2011 | Morris et al. |
| 7,937,286 B2 | 5/2011 | Newman |
| 7,945,516 B2 | 5/2011 | Bishop et al. |
| 7,954,698 B1 | 6/2011 | Pliha |
| 7,957,991 B2 | 6/2011 | Mikurak |
| 7,962,368 B2 | 6/2011 | Kumar et al. |
| 7,962,404 B1 | 6/2011 | Metzger, II et al. |
| 7,962,501 B1 | 6/2011 | Semprevivo et al. |
| 7,970,701 B2 | 6/2011 | Lewis et al. |
| 7,974,860 B1 | 7/2011 | Travis |
| 7,983,976 B2 | 7/2011 | Nafeh et al. |
| RE42,663 E | 8/2011 | Lazarus et al. |
| 7,991,666 B2 | 8/2011 | Haggerty et al. |
| 7,991,688 B2 | 8/2011 | Phelan et al. |
| 7,991,689 B1 | 8/2011 | Brunzell et al. |
| 7,996,320 B2 | 8/2011 | Bishop et al. |
| 7,996,521 B2 | 8/2011 | Chamberlain et al. |
| 8,001,042 B1 | 8/2011 | Brunzell et al. |
| 8,005,712 B2 | 8/2011 | von Davier et al. |
| 8,005,759 B2 | 8/2011 | Hirtenstein et al. |
| 8,006,261 B1 | 8/2011 | Haberman et al. |
| 8,015,045 B2 | 9/2011 | Galperin et al. |
| 8,015,140 B2 | 9/2011 | Kumar et al. |
| 8,024,220 B2 | 9/2011 | Ariff et al. |
| 8,024,263 B2 | 9/2011 | Zarikian et al. |
| 8,024,264 B2 | 9/2011 | Chaudhuri et al. |
| 8,027,871 B2 | 9/2011 | Wiliams et al. |
| 8,027,888 B2 | 9/2011 | Chandran et al. |
| 8,032,409 B1 | 10/2011 | Mikurak |
| 8,036,979 B1 | 10/2011 | Torrez et al. |
| 8,050,968 B2 | 11/2011 | Antonucci et al. |
| 8,064,586 B2 | 11/2011 | Shaffer et al. |
| 8,065,182 B2 | 11/2011 | Voltmer et al. |

(56) References Cited

U.S. PATENT DOCUMENTS

| | | |
|---|---|---|
| 8,065,233 B2 | 11/2011 | Lee et al. |
| 8,065,234 B2 | 11/2011 | Liao et al. |
| 8,078,453 B2 | 12/2011 | Shaw |
| 8,078,524 B2 | 12/2011 | Crawford et al. |
| 8,078,528 B1 | 12/2011 | Vicente et al. |
| 8,082,202 B2 | 12/2011 | Weiss |
| 8,086,524 B1 | 12/2011 | Craig et al. |
| 8,095,443 B2 | 1/2012 | DeBie |
| 8,099,356 B2 | 1/2012 | Feinstein et al. |
| 8,104,671 B2 | 1/2012 | Besecker et al. |
| 8,104,679 B2 | 1/2012 | Brown |
| 8,126,805 B2 | 2/2012 | Sulkowski et al. |
| 8,127,982 B1 | 3/2012 | Casey et al. |
| 8,135,607 B2 | 3/2012 | Wiliams et al. |
| 8,135,642 B1 | 3/2012 | Krause |
| 8,145,754 B2 | 3/2012 | Chamberlain et al. |
| 8,155,999 B2 | 4/2012 | de Boer et al. |
| 8,161,104 B2 | 4/2012 | Tomkow |
| 8,170,958 B1 | 5/2012 | Gremett et al. |
| 8,190,470 B2 | 5/2012 | Srivastava et al. |
| 8,195,550 B2 | 6/2012 | Haggerty et al. |
| 8,204,774 B2 | 6/2012 | Chwast et al. |
| 8,214,238 B1 | 7/2012 | Fairfield et al. |
| 8,219,464 B2 | 7/2012 | Inghelbrecht et al. |
| 8,219,535 B1 | 7/2012 | Kobori et al. |
| 8,234,498 B2 | 7/2012 | Britti et al. |
| 8,239,130 B1 | 8/2012 | Upstill et al. |
| 8,255,268 B2 | 8/2012 | Rane et al. |
| 8,271,313 B2 | 9/2012 | Williams et al. |
| 8,271,378 B2 | 9/2012 | Chaudhuri et al. |
| 8,280,805 B1 | 10/2012 | Abrahams et al. |
| 8,281,180 B1 | 10/2012 | Roy |
| 8,285,577 B1 | 10/2012 | Galperin et al. |
| 8,285,656 B1 | 10/2012 | Chang et al. |
| 8,290,840 B2 | 10/2012 | Kasower |
| 8,296,213 B2 | 10/2012 | Haggerty et al. |
| 8,296,229 B1 | 10/2012 | Yellin et al. |
| 8,301,574 B2 | 10/2012 | Kilger et al. |
| 8,306,890 B2 | 11/2012 | Haggerty et al. |
| 8,315,895 B1 | 11/2012 | Kilat et al. |
| 8,315,933 B2 | 11/2012 | Haggerty et al. |
| 8,315,943 B2 | 11/2012 | Torrez et al. |
| 8,321,335 B1 | 11/2012 | Bramlage et al. |
| 8,326,672 B2 | 12/2012 | Haggerty et al. |
| 8,340,685 B2 | 12/2012 | Cochran et al. |
| 8,341,073 B1 | 12/2012 | Bramlage et al. |
| 8,346,593 B2 | 1/2013 | Fanelli |
| 8,364,518 B1 | 1/2013 | Blake et al. |
| 8,364,582 B2 | 1/2013 | Haggerty et al. |
| 8,364,588 B2 | 1/2013 | Celka et al. |
| 8,365,212 B1 | 1/2013 | Orlowski |
| 8,386,377 B1 | 2/2013 | Xiong et al. |
| 8,392,334 B2 | 3/2013 | Hirtenstein et al. |
| 8,401,889 B2 | 3/2013 | Chwast et al. |
| 8,407,137 B2 | 3/2013 | Thomas |
| 8,412,593 B1 | 4/2013 | Song et al. |
| 8,417,559 B2 | 4/2013 | Joshi et al. |
| 8,417,612 B2 | 4/2013 | Chatterji et al. |
| 8,433,512 B1 | 4/2013 | Lopatenko et al. |
| 8,438,105 B2 | 5/2013 | Haggerty et al. |
| 8,438,170 B2 | 5/2013 | Koran et al. |
| 8,458,026 B2 | 6/2013 | Voltmer et al. |
| 8,458,052 B2 | 6/2013 | Libman |
| 8,458,062 B2 | 6/2013 | Dutt et al. |
| 8,463,595 B1 | 6/2013 | Rehling et al. |
| 8,468,198 B2 | 6/2013 | Tomkow |
| 8,473,354 B2 | 6/2013 | Psota et al. |
| 8,473,380 B2 | 6/2013 | Thomas et al. |
| 8,489,482 B2 | 7/2013 | Haggerty et al. |
| 8,494,855 B1 | 7/2013 | Khosla et al. |
| 8,515,828 B1 | 8/2013 | Wolf et al. |
| 8,515,862 B2 | 8/2013 | Zhang et al. |
| 8,533,038 B2 | 9/2013 | Bergh et al. |
| 8,533,322 B2 | 9/2013 | Chamberlain et al. |
| 8,560,434 B2 | 10/2013 | Morris et al. |
| 8,560,666 B2 | 10/2013 | Low |
| 8,566,029 B1 | 10/2013 | Lopatenko et al. |
| 8,566,167 B2 | 10/2013 | Munjal |
| 8,571,919 B2 | 10/2013 | Rane et al. |
| 8,571,929 B2 | 10/2013 | Srivastava et al. |
| 8,589,069 B1 | 11/2013 | Lehman |
| 8,589,208 B2 | 11/2013 | Kruger et al. |
| 8,606,626 B1 | 12/2013 | DeSoto et al. |
| 8,606,632 B2 | 12/2013 | Libman |
| 8,606,695 B1 | 12/2013 | Arora et al. |
| 8,620,579 B1 | 12/2013 | Upstill et al. |
| 8,620,740 B2 | 12/2013 | Bergh et al. |
| 8,626,560 B1 | 1/2014 | Anderson |
| 8,626,563 B2 | 1/2014 | Williams et al. |
| 8,626,582 B2 | 1/2014 | Ariff et al. |
| 8,626,618 B2 | 1/2014 | Psota et al. |
| 8,626,646 B2 | 1/2014 | Torrez et al. |
| 8,630,929 B2 | 1/2014 | Haggerty et al. |
| 8,639,568 B2 | 1/2014 | de Boer et al. |
| 8,639,920 B2 | 1/2014 | Stack et al. |
| 8,666,885 B1 | 3/2014 | Bramlage et al. |
| 8,682,770 B2 | 3/2014 | Haggerty et al. |
| 8,694,361 B2 | 4/2014 | Durvasula et al. |
| 8,694,403 B2 | 4/2014 | Haggerty et al. |
| 8,719,114 B2 | 5/2014 | Libman |
| 8,732,004 B1 | 5/2014 | Ramos et al. |
| 8,732,013 B2 | 5/2014 | Senghore et al. |
| 8,732,073 B2 | 5/2014 | Thomas |
| 8,738,435 B2 | 5/2014 | Libman |
| 8,738,515 B2 | 5/2014 | Chaudhuri et al. |
| 8,738,532 B2 | 5/2014 | Ariff et al. |
| 8,744,944 B2 | 6/2014 | Haggerty et al. |
| 8,762,053 B1 | 6/2014 | Lehman |
| 8,768,743 B2 | 7/2014 | Kumar et al. |
| 8,775,290 B2 | 7/2014 | Haggerty et al. |
| 8,775,301 B2 | 7/2014 | Haggerty et al. |
| 8,781,877 B2 | 7/2014 | Kruger et al. |
| 8,781,933 B2 | 7/2014 | Haggerty et al. |
| 8,781,951 B2 | 7/2014 | Lewis et al. |
| 8,788,388 B2 | 7/2014 | Chatterji et al. |
| 8,805,805 B1 | 8/2014 | Kobori et al. |
| 8,843,780 B1 | 9/2014 | Roy |
| 8,930,251 B2 | 1/2015 | DeBie |
| 8,938,432 B2 | 1/2015 | Rossmark et al. |
| 8,943,060 B2 | 1/2015 | Krishnan et al. |
| 8,966,649 B2 | 2/2015 | Stack et al. |
| 9,026,088 B1 | 5/2015 | Groenjes |
| 9,057,616 B1 | 6/2015 | Lopatenko et al. |
| 9,057,617 B1 | 6/2015 | Lopatenko et al. |
| 9,058,340 B1 | 6/2015 | Chamberlain et al. |
| 9,063,226 B2 | 6/2015 | Zheng et al. |
| 9,105,048 B2 | 8/2015 | Koran et al. |
| 9,143,541 B1 | 9/2015 | Szamonek et al. |
| 9,147,042 B1 | 9/2015 | Haller et al. |
| 9,147,152 B2 | 9/2015 | Nack et al. |
| 9,152,727 B1 | 10/2015 | Balducci et al. |
| 9,213,646 B1 | 12/2015 | LaPanse et al. |
| 9,251,541 B2 | 2/2016 | Celka et al. |
| 9,256,866 B2 | 2/2016 | Pontious |
| 9,318,105 B1 | 4/2016 | Khosla |
| 9,329,715 B2* | 5/2016 | Schwarz ............... G06F 3/0416 |
| 9,471,928 B2 | 10/2016 | Fanelli et al. |
| 9,483,606 B1 | 11/2016 | Dean et al. |
| 9,489,614 B2 | 11/2016 | Nack et al. |
| 9,501,781 B2 | 11/2016 | Singh et al. |
| 9,547,870 B1 | 1/2017 | Bradford |
| 9,553,936 B2 | 1/2017 | Dijk et al. |
| 9,576,030 B1 | 2/2017 | Kapczynski et al. |
| 9,595,051 B2 | 3/2017 | Stack et al. |
| 9,704,192 B2 | 7/2017 | Ainsworth et al. |
| 9,710,841 B2 | 7/2017 | Ainsworth, III et al. |
| 9,767,309 B2 | 9/2017 | Patel et al. |
| 9,785,890 B2 | 10/2017 | Sowani et al. |
| 9,842,345 B2 | 12/2017 | Ariff et al. |
| 9,846,884 B2 | 12/2017 | Milana et al. |
| 10,019,508 B1 | 7/2018 | Kapczynski |
| 10,019,593 B1 | 7/2018 | Patel et al. |
| 10,089,664 B2 | 10/2018 | Hamdi et al. |
| 10,102,536 B1 | 10/2018 | Hickman et al. |

(56) References Cited

U.S. PATENT DOCUMENTS

| | | |
|---|---|---|
| 10,140,193 B1 | 11/2018 | Roy |
| 10,169,775 B2 | 1/2019 | Koltnow et al. |
| 10,242,019 B1 | 3/2019 | Shan et al. |
| 10,292,008 B2 | 5/2019 | Nack et al. |
| 10,304,075 B2 | 5/2019 | Walz et al. |
| 10,354,311 B2 | 7/2019 | Ainsworth, III et al. |
| 10,380,619 B2 | 8/2019 | Pontious |
| 10,380,654 B2 | 8/2019 | Hirtenstein et al. |
| 10,423,976 B2 | 9/2019 | Walz |
| 10,445,152 B1 | 10/2019 | Zhang et al. |
| 10,460,335 B2 | 10/2019 | West |
| 10,467,672 B2 | 11/2019 | Ainsworth, III et al. |
| 10,482,531 B2 | 11/2019 | Drotos et al. |
| 10,572,891 B2 | 2/2020 | Walz |
| 10,580,025 B2 | 3/2020 | Hickman et al. |
| 10,657,229 B2 | 5/2020 | Zoldi et al. |
| 10,664,759 B2 | 5/2020 | Naik |
| 10,678,894 B2 | 6/2020 | Yin et al. |
| 10,685,133 B1 | 6/2020 | Patel et al. |
| 2001/0014868 A1 | 8/2001 | Herz et al. |
| 2001/0014878 A1 | 8/2001 | Mitra et al. |
| 2001/0029470 A1 | 10/2001 | Schultz et al. |
| 2001/0034631 A1 | 10/2001 | Kiselik |
| 2001/0037332 A1 | 11/2001 | Miller et al. |
| 2001/0039523 A1 | 11/2001 | Iwamoto |
| 2001/0049620 A1 | 12/2001 | Blasko |
| 2002/0004754 A1 | 1/2002 | Gardenswartz et al. |
| 2002/0023051 A1 | 2/2002 | Kunzle et al. |
| 2002/0026411 A1 | 2/2002 | Nathans et al. |
| 2002/0029162 A1 | 3/2002 | Mascarenhas |
| 2002/0046099 A1 | 4/2002 | Frengut et al. |
| 2002/0046105 A1 | 4/2002 | Gardenswartz et al. |
| 2002/0049968 A1 | 4/2002 | Wilson et al. |
| 2002/0051020 A1 | 5/2002 | Ferrari et al. |
| 2002/0052841 A1 | 5/2002 | Guthrie et al. |
| 2002/0055869 A1 | 5/2002 | Hegg |
| 2002/0055906 A1 | 5/2002 | Katz et al. |
| 2002/0065716 A1 | 5/2002 | Kuschill |
| 2002/0069203 A1 | 6/2002 | Dar et al. |
| 2002/0077890 A1 | 6/2002 | LaPointe et al. |
| 2002/0077964 A1 | 6/2002 | Brody et al. |
| 2002/0082892 A1 | 6/2002 | Raffel et al. |
| 2002/0083043 A1 | 6/2002 | Hoshi et al. |
| 2002/0091706 A1 | 7/2002 | Anderson et al. |
| 2002/0099628 A1 | 7/2002 | Takaoka et al. |
| 2002/0099641 A1 | 7/2002 | Mills et al. |
| 2002/0099824 A1 | 7/2002 | Bender et al. |
| 2002/0099936 A1 | 7/2002 | Kou et al. |
| 2002/0116253 A1 | 8/2002 | Coyne et al. |
| 2002/0119824 A1 | 8/2002 | Allen |
| 2002/0120504 A1 | 8/2002 | Gould et al. |
| 2002/0123904 A1 | 9/2002 | Amengual et al. |
| 2002/0123928 A1 | 9/2002 | Eldering et al. |
| 2002/0128960 A1 | 9/2002 | Lambiotte et al. |
| 2002/0129368 A1 | 9/2002 | Schlack et al. |
| 2002/0133404 A1 | 9/2002 | Pedersen |
| 2002/0138297 A1 | 9/2002 | Lee |
| 2002/0138331 A1 | 9/2002 | Hosea et al. |
| 2002/0138333 A1 | 9/2002 | DeCotiis et al. |
| 2002/0138334 A1 | 9/2002 | DeCotiis et al. |
| 2002/0138417 A1 | 9/2002 | Lawrence |
| 2002/0147669 A1 | 10/2002 | Taylor et al. |
| 2002/0147695 A1 | 10/2002 | Khedkar et al. |
| 2002/0156676 A1 | 10/2002 | Ahrens et al. |
| 2002/0161496 A1 | 10/2002 | Yamaki |
| 2002/0161664 A1 | 10/2002 | Shaya et al. |
| 2002/0169655 A1 | 11/2002 | Beyer et al. |
| 2002/0173984 A1 | 11/2002 | Robertson et al. |
| 2002/0173994 A1 | 11/2002 | Ferguson, III |
| 2002/0184255 A1 | 12/2002 | Edd et al. |
| 2002/0194103 A1 | 12/2002 | Nabe |
| 2003/0018549 A1 | 1/2003 | Fei et al. |
| 2003/0018578 A1 | 1/2003 | Schultz |
| 2003/0018769 A1 | 1/2003 | Foulger et al. |
| 2003/0023489 A1 | 1/2003 | McGuire et al. |
| 2003/0033242 A1 | 2/2003 | Lynch et al. |
| 2003/0041031 A1 | 2/2003 | Hedy |
| 2003/0041050 A1 | 2/2003 | Smith et al. |
| 2003/0046222 A1 | 3/2003 | Bard et al. |
| 2003/0060284 A1 | 3/2003 | Hamalainen et al. |
| 2003/0061233 A1 | 3/2003 | Manasse et al. |
| 2003/0065563 A1 | 4/2003 | Elliott et al. |
| 2003/0069839 A1 | 4/2003 | Whittington et al. |
| 2003/0078877 A1 | 4/2003 | Beirne et al. |
| 2003/0093289 A1 | 5/2003 | Thornley et al. |
| 2003/0093311 A1 | 5/2003 | Knowlson |
| 2003/0097342 A1 | 5/2003 | Whittingtom |
| 2003/0097380 A1 | 5/2003 | Mulhern et al. |
| 2003/0101111 A1 | 5/2003 | Dang et al. |
| 2003/0105728 A1 | 6/2003 | Yano et al. |
| 2003/0110111 A1 | 6/2003 | Nalebuff et al. |
| 2003/0110293 A1 | 6/2003 | Friedman et al. |
| 2003/0120591 A1 | 6/2003 | Birkhead et al. |
| 2003/0144950 A1 | 7/2003 | O'Brien et al. |
| 2003/0158776 A1 | 8/2003 | Landesmann |
| 2003/0163708 A1 | 8/2003 | Tang |
| 2003/0167222 A1 | 9/2003 | Mehrotra et al. |
| 2003/0171942 A1 | 9/2003 | Gaito |
| 2003/0200135 A1 | 10/2003 | Wright |
| 2003/0200151 A1 | 10/2003 | Ellenson et al. |
| 2003/0208362 A1 | 11/2003 | Enthoven et al. |
| 2003/0212654 A1 | 11/2003 | Harper et al. |
| 2003/0216965 A1 | 11/2003 | Libman |
| 2003/0219709 A1 | 11/2003 | Olenick et al. |
| 2003/0225742 A1 | 12/2003 | Tenner et al. |
| 2003/0229507 A1 | 12/2003 | Perge |
| 2003/0229892 A1 | 12/2003 | Sardera |
| 2003/0233278 A1 | 12/2003 | Marshall |
| 2003/0233323 A1 | 12/2003 | Bilski et al. |
| 2003/0233655 A1 | 12/2003 | Gutta et al. |
| 2004/0006536 A1 | 1/2004 | Kawashima et al. |
| 2004/0010443 A1 | 1/2004 | May et al. |
| 2004/0024848 A1 | 2/2004 | Smith |
| 2004/0030649 A1 | 2/2004 | Nelson et al. |
| 2004/0030667 A1 | 2/2004 | Xu et al. |
| 2004/0039688 A1 | 2/2004 | Sulkowski et al. |
| 2004/0049729 A1 | 3/2004 | Penfield |
| 2004/0059626 A1 | 3/2004 | Smallwood |
| 2004/0062213 A1 | 4/2004 | Koss |
| 2004/0078324 A1 | 4/2004 | Lonnberg et al. |
| 2004/0078809 A1 | 4/2004 | Drazin |
| 2004/0083215 A1 | 4/2004 | de Jong |
| 2004/0098625 A1 | 5/2004 | Lagadec et al. |
| 2004/0102197 A1 | 5/2004 | Dietz |
| 2004/0107125 A1 | 6/2004 | Guheen et al. |
| 2004/0111305 A1 | 6/2004 | Gavan et al. |
| 2004/0117235 A1 | 6/2004 | Shacham |
| 2004/0117358 A1 | 6/2004 | Von Kaenel et al. |
| 2004/0122730 A1 | 6/2004 | Tucciarone et al. |
| 2004/0122735 A1 | 6/2004 | Meshkin |
| 2004/0128150 A1 | 7/2004 | Lundegren |
| 2004/0128193 A1 | 7/2004 | Brice et al. |
| 2004/0128230 A1 | 7/2004 | Oppenheimer et al. |
| 2004/0128236 A1 | 7/2004 | Brown et al. |
| 2004/0138932 A1 | 7/2004 | Johnson et al. |
| 2004/0139025 A1 | 7/2004 | Coleman |
| 2004/0143546 A1 | 7/2004 | Wood et al. |
| 2004/0153448 A1 | 8/2004 | Cheng et al. |
| 2004/0153509 A1 | 8/2004 | Alcorn et al. |
| 2004/0158520 A1 | 8/2004 | Noh |
| 2004/0158523 A1 | 8/2004 | Dort |
| 2004/0163101 A1 | 8/2004 | Swix |
| 2004/0176995 A1 | 9/2004 | Fusz |
| 2004/0186807 A1 | 9/2004 | Nathans et al. |
| 2004/0193487 A1 | 9/2004 | Purcell et al. |
| 2004/0193538 A1 | 9/2004 | Raines |
| 2004/0199456 A1 | 10/2004 | Flint et al. |
| 2004/0199458 A1 | 10/2004 | Ho |
| 2004/0199462 A1 | 10/2004 | Starrs |
| 2004/0199584 A1 | 10/2004 | Kirshenbaum et al. |
| 2004/0199789 A1 | 10/2004 | Shaw et al. |
| 2004/0205157 A1 | 10/2004 | Bibelnieks et al. |
| 2004/0220896 A1 | 11/2004 | Finlay et al. |
| 2004/0225545 A1 | 11/2004 | Turner et al. |

(56) References Cited

U.S. PATENT DOCUMENTS

| | | |
|---|---|---|
| 2004/0225596 A1 | 11/2004 | Kemper et al. |
| 2004/0230534 A1 | 11/2004 | McGough |
| 2004/0230820 A1 | 11/2004 | Hui Hsu et al. |
| 2004/0243588 A1 | 12/2004 | Tanner et al. |
| 2004/0261116 A1 | 12/2004 | Mckeown et al. |
| 2005/0004805 A1 | 1/2005 | Srinivasan |
| 2005/0021397 A1 | 1/2005 | Cui et al. |
| 2005/0027633 A1 | 2/2005 | Fortuna et al. |
| 2005/0038726 A1 | 2/2005 | Salomon et al. |
| 2005/0050027 A1 | 3/2005 | Yeh et al. |
| 2005/0065809 A1 | 3/2005 | Henze |
| 2005/0091077 A1 | 4/2005 | Reynolds |
| 2005/0097039 A1 | 5/2005 | Kulcsar et al. |
| 2005/0102206 A1 | 5/2005 | Savasoglu et al. |
| 2005/0113991 A1 | 5/2005 | Rogers et al. |
| 2005/0120045 A1 | 6/2005 | Klawon |
| 2005/0120249 A1* | 6/2005 | Shuster ............... H04L 63/126 726/4 |
| 2005/0137899 A1 | 6/2005 | Davies et al. |
| 2005/0137963 A1 | 6/2005 | Ricketts et al. |
| 2005/0144067 A1 | 6/2005 | Farahat et al. |
| 2005/0144452 A1 | 6/2005 | Lynch et al. |
| 2005/0144641 A1 | 6/2005 | Lewis |
| 2005/0154664 A1 | 7/2005 | Guy et al. |
| 2005/0177442 A1 | 8/2005 | Sullivan et al. |
| 2005/0177489 A1 | 8/2005 | Neff et al. |
| 2005/0189414 A1 | 9/2005 | Fano et al. |
| 2005/0192008 A1 | 9/2005 | Desai et al. |
| 2005/0197953 A1 | 9/2005 | Broadbent et al. |
| 2005/0197954 A1 | 9/2005 | Maitland et al. |
| 2005/0201272 A1 | 9/2005 | Wang et al. |
| 2005/0204381 A1 | 9/2005 | Ludvig et al. |
| 2005/0209892 A1 | 9/2005 | Miller |
| 2005/0209922 A1 | 9/2005 | Hofmeister |
| 2005/0222900 A1 | 10/2005 | Fuloria et al. |
| 2005/0222906 A1 | 10/2005 | Chen |
| 2005/0233742 A1 | 10/2005 | Karaoguz et al. |
| 2005/0234969 A1 | 10/2005 | Mamou et al. |
| 2005/0246256 A1 | 11/2005 | Gastineau et al. |
| 2005/0251408 A1 | 11/2005 | Swaminathan et al. |
| 2005/0251474 A1 | 11/2005 | Shinn et al. |
| 2005/0251820 A1 | 11/2005 | Stefanik et al. |
| 2005/0256780 A1 | 11/2005 | Eldred |
| 2005/0257250 A1 | 11/2005 | Mitchell et al. |
| 2005/0261959 A1 | 11/2005 | Moyer |
| 2005/0267774 A1 | 12/2005 | Merritt et al. |
| 2005/0273849 A1 | 12/2005 | Araujo et al. |
| 2005/0278246 A1 | 12/2005 | Friedman et al. |
| 2005/0278743 A1 | 12/2005 | Flickinger et al. |
| 2005/0279827 A1 | 12/2005 | Mascavage et al. |
| 2005/0288954 A1 | 12/2005 | McCarthy et al. |
| 2006/0004626 A1 | 1/2006 | Holmen et al. |
| 2006/0004731 A1 | 1/2006 | Seibel et al. |
| 2006/0004753 A1 | 1/2006 | Coifman et al. |
| 2006/0014129 A1 | 1/2006 | Coleman et al. |
| 2006/0015425 A1 | 1/2006 | Brooks |
| 2006/0020611 A1 | 1/2006 | Gilbert et al. |
| 2006/0041443 A1 | 2/2006 | Horvath |
| 2006/0041500 A1 | 2/2006 | Diana et al. |
| 2006/0053047 A1 | 3/2006 | Garcia et al. |
| 2006/0059073 A1 | 3/2006 | Walzak |
| 2006/0080233 A1 | 4/2006 | Mendelevich et al. |
| 2006/0080251 A1 | 4/2006 | Fried et al. |
| 2006/0085334 A1 | 4/2006 | Murphy |
| 2006/0089842 A1 | 4/2006 | Medawar |
| 2006/0089914 A1 | 4/2006 | Shiel et al. |
| 2006/0095363 A1 | 5/2006 | May |
| 2006/0100954 A1 | 5/2006 | Schoen |
| 2006/0122921 A1 | 6/2006 | Comerford et al. |
| 2006/0129428 A1 | 6/2006 | Wennberg |
| 2006/0144927 A1* | 7/2006 | Love ............... G06Q 20/382 235/380 |
| 2006/0155639 A1 | 7/2006 | Lynch et al. |
| 2006/0168068 A1 | 7/2006 | Ziegert |
| 2006/0173772 A1 | 8/2006 | Hayes et al. |
| 2006/0177226 A1 | 8/2006 | Ellis, III |
| 2006/0178189 A1 | 8/2006 | Walker et al. |
| 2006/0178971 A1 | 8/2006 | Owen et al. |
| 2006/0178983 A1 | 8/2006 | Nice et al. |
| 2006/0184440 A1 | 8/2006 | Britti et al. |
| 2006/0195866 A1 | 8/2006 | Thukral |
| 2006/0202012 A1 | 9/2006 | Grano et al. |
| 2006/0206379 A1 | 9/2006 | Rosenberg |
| 2006/0206416 A1 | 9/2006 | Farias |
| 2006/0212350 A1 | 9/2006 | Ellis et al. |
| 2006/0212353 A1 | 9/2006 | Roslov et al. |
| 2006/0218079 A1 | 9/2006 | Goldblatt et al. |
| 2006/0224696 A1 | 10/2006 | King et al. |
| 2006/0229943 A1 | 10/2006 | Mathias et al. |
| 2006/0229961 A1 | 10/2006 | Lyftogt et al. |
| 2006/0229996 A1 | 10/2006 | Keithley et al. |
| 2006/0230415 A1 | 10/2006 | Roeding |
| 2006/0241923 A1 | 10/2006 | Xu et al. |
| 2006/0242046 A1 | 10/2006 | Haggerty et al. |
| 2006/0242048 A1 | 10/2006 | Haggerty et al. |
| 2006/0242050 A1 | 10/2006 | Haggerty et al. |
| 2006/0247991 A1 | 11/2006 | Jin et al. |
| 2006/0253323 A1 | 11/2006 | Phan et al. |
| 2006/0259364 A1 | 11/2006 | Strock et al. |
| 2006/0271457 A1 | 11/2006 | Romain et al. |
| 2006/0276171 A1 | 12/2006 | Pousti |
| 2006/0277102 A1 | 12/2006 | Agliozzo |
| 2006/0282327 A1 | 12/2006 | Neal et al. |
| 2006/0282328 A1 | 12/2006 | Gerace et al. |
| 2006/0282856 A1 | 12/2006 | Errico et al. |
| 2006/0287915 A1 | 12/2006 | Boulet et al. |
| 2006/0287919 A1 | 12/2006 | Rubens et al. |
| 2006/0293921 A1 | 12/2006 | McCarthy et al. |
| 2006/0293954 A1 | 12/2006 | Anderson et al. |
| 2006/0293955 A1 | 12/2006 | Wilson et al. |
| 2006/0294199 A1 | 12/2006 | Bertholf |
| 2007/0011020 A1 | 1/2007 | Martin |
| 2007/0011039 A1 | 1/2007 | Oddo |
| 2007/0011099 A1 | 1/2007 | Sheehan |
| 2007/0016500 A1 | 1/2007 | Chatterji et al. |
| 2007/0016518 A1 | 1/2007 | Atkinson et al. |
| 2007/0022032 A1 | 1/2007 | Anderson et al. |
| 2007/0022297 A1 | 1/2007 | Britti et al. |
| 2007/0027791 A1 | 2/2007 | Young et al. |
| 2007/0033227 A1 | 2/2007 | Gaito et al. |
| 2007/0038497 A1 | 2/2007 | Britti et al. |
| 2007/0038516 A1 | 2/2007 | Apple et al. |
| 2007/0043654 A1 | 2/2007 | Libman |
| 2007/0055618 A1 | 3/2007 | Pogust |
| 2007/0055621 A1 | 3/2007 | Tischler et al. |
| 2007/0061195 A1 | 3/2007 | Liu et al. |
| 2007/0061243 A1 | 3/2007 | Ramer et al. |
| 2007/0067207 A1 | 3/2007 | Haggerty et al. |
| 2007/0067235 A1 | 3/2007 | Nathans et al. |
| 2007/0067297 A1 | 3/2007 | Kublickis |
| 2007/0067437 A1 | 3/2007 | Sindambiwe |
| 2007/0078835 A1 | 4/2007 | Donnelli |
| 2007/0083460 A1 | 4/2007 | Bachenheimer |
| 2007/0094137 A1 | 4/2007 | Phillips et al. |
| 2007/0106582 A1 | 5/2007 | Baker et al. |
| 2007/0112579 A1 | 5/2007 | Ratnakaran et al. |
| 2007/0112668 A1 | 5/2007 | Celano et al. |
| 2007/0121843 A1 | 5/2007 | Atazky et al. |
| 2007/0124235 A1 | 5/2007 | Chakraborty et al. |
| 2007/0129993 A1 | 6/2007 | Alvin |
| 2007/0156515 A1 | 7/2007 | Hasselback et al. |
| 2007/0156589 A1 | 7/2007 | Zimler et al. |
| 2007/0157110 A1 | 7/2007 | Gandhi et al. |
| 2007/0168246 A1 | 7/2007 | Haggerty et al. |
| 2007/0169189 A1 | 7/2007 | Crespo et al. |
| 2007/0174122 A1 | 7/2007 | Howard et al. |
| 2007/0175986 A1 | 8/2007 | Petrone et al. |
| 2007/0179860 A1 | 8/2007 | Romero |
| 2007/0192165 A1 | 8/2007 | Haggerty et al. |
| 2007/0192409 A1 | 8/2007 | Kleinstern et al. |
| 2007/0208619 A1 | 9/2007 | Branam et al. |
| 2007/0208729 A1 | 9/2007 | Martino |
| 2007/0220553 A1 | 9/2007 | Branam et al. |
| 2007/0220611 A1 | 9/2007 | Socolow et al. |

(56) References Cited

U.S. PATENT DOCUMENTS

| | | |
|---|---|---|
| 2007/0226093 A1 | 9/2007 | Chan et al. |
| 2007/0233857 A1 | 10/2007 | Cheng et al. |
| 2007/0244732 A1 | 10/2007 | Chatterji et al. |
| 2007/0250327 A1 | 10/2007 | Hedy |
| 2007/0265958 A1 | 11/2007 | Petralia |
| 2007/0271178 A1 | 11/2007 | Davis et al. |
| 2007/0271582 A1 | 11/2007 | Ellis et al. |
| 2007/0282684 A1 | 12/2007 | Prosser et al. |
| 2007/0282736 A1 | 12/2007 | Conlin et al. |
| 2007/0288271 A1 | 12/2007 | Klinkhammer |
| 2007/0288360 A1 | 12/2007 | Seeklus |
| 2007/0288950 A1 | 12/2007 | Downey et al. |
| 2007/0288953 A1 | 12/2007 | Sheeman et al. |
| 2007/0294126 A1 | 12/2007 | Maggio |
| 2007/0294163 A1 | 12/2007 | Harmon et al. |
| 2007/0299771 A1 | 12/2007 | Brody |
| 2008/0004957 A1 | 1/2008 | Hildreth et al. |
| 2008/0005313 A1 | 1/2008 | Flake et al. |
| 2008/0010206 A1 | 1/2008 | Coleman |
| 2008/0015938 A1 | 1/2008 | Haddad et al. |
| 2008/0021802 A1 | 1/2008 | Pendleton |
| 2008/0027859 A1 | 1/2008 | Nathans et al. |
| 2008/0028067 A1 | 1/2008 | Berkhin et al. |
| 2008/0040216 A1 | 2/2008 | Dellovo |
| 2008/0052182 A1 | 2/2008 | Marshall |
| 2008/0059224 A1 | 3/2008 | Schechter |
| 2008/0059317 A1 | 3/2008 | Chandran et al. |
| 2008/0059352 A1 | 3/2008 | Chandran |
| 2008/0059364 A1 | 3/2008 | Tidwell et al. |
| 2008/0065774 A1 | 3/2008 | Keeler |
| 2008/0086368 A1 | 4/2008 | Bauman et al. |
| 2008/0091535 A1 | 4/2008 | Heiser et al. |
| 2008/0097768 A1 | 4/2008 | Godshalk |
| 2008/0097928 A1 | 4/2008 | Paulson |
| 2008/0103972 A1 | 5/2008 | Lanc |
| 2008/0110973 A1 | 5/2008 | Nathans et al. |
| 2008/0120155 A1 | 5/2008 | Pliha |
| 2008/0126476 A1 | 5/2008 | Nicholas et al. |
| 2008/0133273 A1 | 6/2008 | Marshall |
| 2008/0133325 A1 | 6/2008 | De et al. |
| 2008/0134042 A1 | 6/2008 | Jankovich |
| 2008/0140476 A1 | 6/2008 | Anand et al. |
| 2008/0140576 A1 | 6/2008 | Lewis et al. |
| 2008/0147425 A1 | 6/2008 | Durvasula |
| 2008/0147523 A1 | 6/2008 | Mulry et al. |
| 2008/0167956 A1 | 7/2008 | Keithley |
| 2008/0172324 A1 | 7/2008 | Johnson |
| 2008/0177655 A1 | 7/2008 | Zalik |
| 2008/0177836 A1 | 7/2008 | Bennett |
| 2008/0183564 A1 | 7/2008 | Tien et al. |
| 2008/0184289 A1 | 7/2008 | Cristofalo et al. |
| 2008/0208548 A1 | 8/2008 | Metzger et al. |
| 2008/0208610 A1 | 8/2008 | Thomas et al. |
| 2008/0215470 A1 | 9/2008 | Sengupta et al. |
| 2008/0221970 A1 | 9/2008 | Megdal et al. |
| 2008/0221971 A1 | 9/2008 | Megdal et al. |
| 2008/0221972 A1 | 9/2008 | Megdal et al. |
| 2008/0221990 A1 | 9/2008 | Megdal et al. |
| 2008/0222027 A1 | 9/2008 | Megdal et al. |
| 2008/0222127 A1 | 9/2008 | Bergin |
| 2008/0228540 A1 | 9/2008 | Megdal et al. |
| 2008/0228556 A1 | 9/2008 | Megdal et al. |
| 2008/0228578 A1 | 9/2008 | Mashinsky |
| 2008/0228606 A1 | 9/2008 | Megdal et al. |
| 2008/0228635 A1 | 9/2008 | Megdal et al. |
| 2008/0243680 A1 | 10/2008 | Megdal et al. |
| 2008/0255897 A1 | 10/2008 | Megdal et al. |
| 2008/0262925 A1 | 10/2008 | Kim et al. |
| 2008/0263638 A1 | 10/2008 | McMurtry et al. |
| 2008/0270245 A1 | 10/2008 | Boukadoum et al. |
| 2008/0294540 A1 | 11/2008 | Celka et al. |
| 2008/0294546 A1 | 11/2008 | Flannery |
| 2008/0300977 A1 | 12/2008 | Gerakos et al. |
| 2008/0301016 A1 | 12/2008 | Durvasula et al. |
| 2008/0301188 A1 | 12/2008 | O'Hara |
| 2008/0301727 A1 | 12/2008 | Cristofalo et al. |
| 2008/0312963 A1 | 12/2008 | Reiner |
| 2008/0312969 A1 | 12/2008 | Raines et al. |
| 2009/0006185 A1 | 1/2009 | Stinson |
| 2009/0006475 A1 | 1/2009 | Udezue et al. |
| 2009/0012889 A1 | 1/2009 | Finch |
| 2009/0018996 A1 | 1/2009 | Hunt et al. |
| 2009/0019027 A1 | 1/2009 | Ju et al. |
| 2009/0024462 A1 | 1/2009 | Lin |
| 2009/0024505 A1 | 1/2009 | Patel et al. |
| 2009/0030776 A1 | 1/2009 | Walker et al. |
| 2009/0043637 A1 | 2/2009 | Eder |
| 2009/0044246 A1 | 2/2009 | Sheehan et al. |
| 2009/0048877 A1 | 2/2009 | Binns et al. |
| 2009/0064326 A1 | 3/2009 | Goldstein |
| 2009/0076883 A1 | 3/2009 | Kilger et al. |
| 2009/0089190 A1 | 4/2009 | Girulat |
| 2009/0089205 A1 | 4/2009 | Bayne |
| 2009/0094640 A1 | 4/2009 | Anderson et al. |
| 2009/0094675 A1 | 4/2009 | Powers |
| 2009/0099914 A1 | 4/2009 | Lang et al. |
| 2009/0113532 A1 | 4/2009 | Lapidous |
| 2009/0119169 A1 | 5/2009 | Chandratillake et al. |
| 2009/0119199 A1 | 5/2009 | Salahi |
| 2009/0132347 A1 | 5/2009 | Anderson et al. |
| 2009/0132559 A1 | 5/2009 | Chamberlain et al. |
| 2009/0132691 A1 | 5/2009 | Daurensan et al. |
| 2009/0133058 A1 | 5/2009 | Kouritzin et al. |
| 2009/0144102 A1 | 6/2009 | Lopez |
| 2009/0144201 A1 | 6/2009 | Gierkink et al. |
| 2009/0164293 A1 | 6/2009 | Coley |
| 2009/0171755 A1 | 7/2009 | Kane et al. |
| 2009/0172035 A1 | 7/2009 | Lessing et al. |
| 2009/0172815 A1 | 7/2009 | Gu et al. |
| 2009/0177480 A1 | 7/2009 | Chen et al. |
| 2009/0198557 A1 | 8/2009 | Wang et al. |
| 2009/0198602 A1 | 8/2009 | Wang et al. |
| 2009/0198612 A1 | 8/2009 | Meimes et al. |
| 2009/0210886 A1 | 8/2009 | Bhojwani et al. |
| 2009/0215479 A1 | 8/2009 | Karmarkar |
| 2009/0222308 A1 | 9/2009 | Zoldi et al. |
| 2009/0222373 A1 | 9/2009 | Choudhuri et al. |
| 2009/0222374 A1 | 9/2009 | Choudhuri et al. |
| 2009/0222375 A1 | 9/2009 | Choudhuri et al. |
| 2009/0222376 A1 | 9/2009 | Choudhuri et al. |
| 2009/0222377 A1 | 9/2009 | Choudhuri et al. |
| 2009/0222378 A1 | 9/2009 | Choudhuri et al. |
| 2009/0222379 A1 | 9/2009 | Choudhuri et al. |
| 2009/0222380 A1 | 9/2009 | Choudhuri et al. |
| 2009/0228918 A1 | 9/2009 | Rolff et al. |
| 2009/0234665 A1 | 9/2009 | Conkel |
| 2009/0234708 A1 | 9/2009 | Heiser, II et al. |
| 2009/0234715 A1 | 9/2009 | Heiser, II et al. |
| 2009/0234775 A1 | 9/2009 | Whitney et al. |
| 2009/0248567 A1 | 10/2009 | Haggerty et al. |
| 2009/0248568 A1 | 10/2009 | Haggerty et al. |
| 2009/0248569 A1 | 10/2009 | Haggerty et al. |
| 2009/0248570 A1 | 10/2009 | Haggerty et al. |
| 2009/0248571 A1 | 10/2009 | Haggerty et al. |
| 2009/0248572 A1 | 10/2009 | Haggerty et al. |
| 2009/0248573 A1 | 10/2009 | Haggerty et al. |
| 2009/0249440 A1 | 10/2009 | Platt et al. |
| 2009/0254971 A1 | 10/2009 | Herz et al. |
| 2009/0265326 A1 | 10/2009 | Lehrman et al. |
| 2009/0271248 A1 | 10/2009 | Sherman et al. |
| 2009/0271265 A1 | 10/2009 | Lay et al. |
| 2009/0276233 A1 | 11/2009 | Brimhall et al. |
| 2009/0276368 A1 | 11/2009 | Martin et al. |
| 2009/0288109 A1 | 11/2009 | Downey et al. |
| 2009/0300066 A1 | 12/2009 | Guo et al. |
| 2009/0313163 A1 | 12/2009 | Wang et al. |
| 2009/0319648 A1 | 12/2009 | Dutta et al. |
| 2009/0327120 A1 | 12/2009 | Eze et al. |
| 2010/0010935 A1 | 1/2010 | Shelton |
| 2010/0017300 A1 | 1/2010 | Bramlage et al. |
| 2010/0030649 A1 | 2/2010 | Ubelhor |
| 2010/0037255 A1 | 2/2010 | Sheehan et al. |
| 2010/0049651 A1 | 2/2010 | Lang et al. |
| 2010/0094704 A1 | 4/2010 | Subramanian et al. |

(56) References Cited

U.S. PATENT DOCUMENTS

| | | |
|---|---|---|
| 2010/0094758 A1 | 4/2010 | Chamberlain et al. |
| 2010/0094774 A1 | 4/2010 | Jackowitz et al. |
| 2010/0106568 A1 | 4/2010 | Grimes |
| 2010/0114646 A1 | 5/2010 | McIlwain et al. |
| 2010/0114663 A1 | 5/2010 | Casas et al. |
| 2010/0114724 A1 | 5/2010 | Ghosh et al. |
| 2010/0138290 A1 | 6/2010 | Zschocke et al. |
| 2010/0142698 A1 | 6/2010 | Spottiswoode et al. |
| 2010/0145836 A1 | 6/2010 | Baker et al. |
| 2010/0169159 A1 | 7/2010 | Rose et al. |
| 2010/0169264 A1 | 7/2010 | O'Sullivan |
| 2010/0185453 A1 | 7/2010 | Satyavolu et al. |
| 2010/0191598 A1 | 7/2010 | Toennis et al. |
| 2010/0198629 A1 | 8/2010 | Wesileder et al. |
| 2010/0211445 A1 | 8/2010 | Bodington |
| 2010/0228657 A1 | 9/2010 | Kagarlis |
| 2010/0250434 A1 | 9/2010 | Megdal et al. |
| 2010/0268557 A1 | 10/2010 | Faith et al. |
| 2010/0268660 A1 | 10/2010 | Ekdahl |
| 2010/0293114 A1 | 11/2010 | Khan et al. |
| 2010/0332292 A1 | 12/2010 | Anderson |
| 2011/0016042 A1 | 1/2011 | Cho et al. |
| 2011/0023115 A1 | 1/2011 | Wright |
| 2011/0029388 A1 | 2/2011 | Kendall et al. |
| 2011/0047071 A1 | 2/2011 | Choudhuri et al. |
| 2011/0047072 A1 | 2/2011 | Ciurea |
| 2011/0054981 A1 | 3/2011 | Faith et al. |
| 2011/0066495 A1 | 3/2011 | Ayloo et al. |
| 2011/0071950 A1 | 3/2011 | Ivanovic |
| 2011/0076663 A1 | 3/2011 | Krallman et al. |
| 2011/0078018 A1 | 3/2011 | Chunilal |
| 2011/0078073 A1 | 3/2011 | Annappindi et al. |
| 2011/0093327 A1 | 4/2011 | Fordyce, III et al. |
| 2011/0093383 A1 | 4/2011 | Haggerty et al. |
| 2011/0112958 A1 | 5/2011 | Haggerty et al. |
| 2011/0125595 A1 | 5/2011 | Neal et al. |
| 2011/0137789 A1 | 6/2011 | Kortina et al. |
| 2011/0145122 A1 | 6/2011 | Haggerty et al. |
| 2011/0161323 A1 | 6/2011 | Hagiwara |
| 2011/0164746 A1 | 7/2011 | Nice et al. |
| 2011/0173116 A1 | 7/2011 | Yan et al. |
| 2011/0178843 A1 | 7/2011 | Rane et al. |
| 2011/0178844 A1 | 7/2011 | Rane et al. |
| 2011/0178845 A1 | 7/2011 | Rane et al. |
| 2011/0178846 A1 | 7/2011 | Rane et al. |
| 2011/0178847 A1 | 7/2011 | Rane et al. |
| 2011/0178848 A1 | 7/2011 | Rane et al. |
| 2011/0178855 A1 | 7/2011 | Rane et al. |
| 2011/0178899 A1 | 7/2011 | Huszar |
| 2011/0184838 A1 | 7/2011 | Winters et al. |
| 2011/0196791 A1 | 8/2011 | Dominguez |
| 2011/0202407 A1 | 8/2011 | Buhrmann et al. |
| 2011/0208578 A1 | 8/2011 | Bergh et al. |
| 2011/0211445 A1 | 9/2011 | Chen |
| 2011/0212717 A1 | 9/2011 | Rhoads et al. |
| 2011/0213641 A1 | 9/2011 | Metzger, II et al. |
| 2011/0218826 A1 | 9/2011 | Birtel et al. |
| 2011/0219421 A1 | 9/2011 | Ullman et al. |
| 2011/0238566 A1 | 9/2011 | Santos |
| 2011/0251946 A1 | 10/2011 | Haggerty et al. |
| 2011/0258050 A1 | 10/2011 | Chan et al. |
| 2011/0264581 A1 | 10/2011 | Clyne |
| 2011/0270618 A1 | 11/2011 | Banerjee et al. |
| 2011/0270661 A1 | 11/2011 | Heiser, II et al. |
| 2011/0270779 A1 | 11/2011 | Showalter |
| 2011/0276396 A1 | 11/2011 | Rathod |
| 2011/0282739 A1 | 11/2011 | Mashinsky et al. |
| 2011/0307397 A1 | 12/2011 | Benmbarek |
| 2011/0320307 A1 | 12/2011 | Mehta et al. |
| 2012/0011056 A1 | 1/2012 | Ward et al. |
| 2012/0011068 A1 | 1/2012 | Dearing et al. |
| 2012/0011158 A1 | 1/2012 | Avner et al. |
| 2012/0016733 A1 | 1/2012 | Belvin et al. |
| 2012/0016948 A1 | 1/2012 | Sinha |
| 2012/0029956 A1 | 2/2012 | Ghosh et al. |
| 2012/0029996 A1 | 2/2012 | Lang et al. |
| 2012/0047219 A1 | 2/2012 | Feng et al. |
| 2012/0054592 A1 | 3/2012 | Jaffe et al. |
| 2012/0060207 A1 | 3/2012 | Mardikar et al. |
| 2012/0066065 A1 | 3/2012 | Switzer |
| 2012/0101892 A1 | 4/2012 | LeFebvre |
| 2012/0101939 A1 | 4/2012 | Kasower |
| 2012/0110677 A1 | 5/2012 | Abendroth et al. |
| 2012/0143921 A1 | 6/2012 | Wilson |
| 2012/0158460 A1 | 6/2012 | Kruger et al. |
| 2012/0158574 A1 | 6/2012 | Brunzell et al. |
| 2012/0158654 A1 | 6/2012 | Behren et al. |
| 2012/0179536 A1 | 7/2012 | Kalb et al. |
| 2012/0203639 A1 | 8/2012 | Webster et al. |
| 2012/0209586 A1 | 8/2012 | Mieritz et al. |
| 2012/0215682 A1 | 8/2012 | Lent et al. |
| 2012/0216125 A1 | 8/2012 | Pierce |
| 2012/0232958 A1 | 9/2012 | Silbert |
| 2012/0239497 A1 | 9/2012 | Nuzzi |
| 2012/0239515 A1 | 9/2012 | Batra et al. |
| 2012/0284118 A1 | 11/2012 | Mamich, Jr. et al. |
| 2012/0317016 A1 | 12/2012 | Hughes |
| 2012/0323954 A1 | 12/2012 | Bonalle et al. |
| 2013/0080242 A1 | 3/2013 | Alhadeff et al. |
| 2013/0080467 A1 | 3/2013 | Carson et al. |
| 2013/0085804 A1 | 4/2013 | Left et al. |
| 2013/0085902 A1 | 4/2013 | Chew |
| 2013/0117832 A1 | 5/2013 | Gandhi |
| 2013/0124263 A1 | 5/2013 | Amaro et al. |
| 2013/0132151 A1 | 5/2013 | Stibel et al. |
| 2013/0137464 A1 | 5/2013 | Kramer et al. |
| 2013/0151388 A1 | 6/2013 | Falkenborg et al. |
| 2013/0159411 A1 | 6/2013 | Bowen |
| 2013/0173481 A1 | 7/2013 | Hirtenstein et al. |
| 2013/0218638 A1 | 8/2013 | Kilger et al. |
| 2013/0226787 A1 | 8/2013 | Haggerty et al. |
| 2013/0226820 A1 | 8/2013 | Sedota, Jr. et al. |
| 2013/0238413 A1 | 9/2013 | Carlson et al. |
| 2013/0252638 A1 | 9/2013 | Yang et al. |
| 2013/0262226 A1 | 10/2013 | LaChapelle et al. |
| 2013/0293363 A1 | 11/2013 | Plymouth |
| 2013/0332230 A1 | 12/2013 | Fanelli et al. |
| 2013/0339087 A1 | 12/2013 | Fanelli et al. |
| 2013/0339143 A1 | 12/2013 | Drozd et al. |
| 2013/0347059 A1 | 12/2013 | Fong et al. |
| 2014/0025489 A1 | 1/2014 | Srivastava et al. |
| 2014/0025815 A1 | 1/2014 | Low |
| 2014/0032265 A1 | 1/2014 | Paprocki et al. |
| 2014/0046887 A1 | 2/2014 | Lessin |
| 2014/0058818 A1 | 2/2014 | Drozd et al. |
| 2014/0095251 A1 | 4/2014 | Huovilainen |
| 2014/0096249 A1 | 4/2014 | Dupont et al. |
| 2014/0149179 A1 | 5/2014 | Haggerty et al. |
| 2014/0164112 A1 | 6/2014 | Kala |
| 2014/0164398 A1 | 6/2014 | Smith et al. |
| 2014/0172686 A1 | 6/2014 | Haggerty et al. |
| 2014/0181285 A1 | 6/2014 | Stevens et al. |
| 2014/0188555 A1 | 7/2014 | Durvasula |
| 2014/0214482 A1 | 7/2014 | Williams et al. |
| 2014/0222908 A1 | 8/2014 | Park et al. |
| 2014/0244353 A1 | 8/2014 | Winters |
| 2014/0278774 A1 | 9/2014 | Cai et al. |
| 2014/0279197 A1 | 9/2014 | Ainsworth, III et al. |
| 2014/0279420 A1 | 9/2014 | Okerlund et al. |
| 2014/0310157 A1 | 10/2014 | Haggerty et al. |
| 2014/0316852 A1 | 10/2014 | Chatterji et al. |
| 2014/0316855 A1 | 10/2014 | Haggerty et al. |
| 2014/0317022 A1 | 10/2014 | Haggerty et al. |
| 2014/0324538 A1 | 10/2014 | Haggerty et al. |
| 2014/0330670 A1 | 11/2014 | Ainsworth, III et al. |
| 2014/0344069 A1 | 11/2014 | Haggerty et al. |
| 2015/0026039 A1 | 1/2015 | Annappindi |
| 2015/0058957 A1 | 2/2015 | Halliday et al. |
| 2015/0095104 A1 | 4/2015 | Goldberg |
| 2015/0095184 A1 | 4/2015 | Ainsworth et al. |
| 2015/0095187 A1 | 4/2015 | Ainsworth et al. |
| 2015/0106192 A1 | 4/2015 | Guo et al. |
| 2015/0106270 A1 | 4/2015 | Burrell et al. |
| 2015/0108227 A1 | 4/2015 | Nack et al. |

(56) References Cited

U.S. PATENT DOCUMENTS

| | | |
|---|---|---|
| 2015/0120391 A1 | 4/2015 | Jodice et al. |
| 2015/0120755 A1 | 4/2015 | Burger et al. |
| 2015/0128240 A1 | 5/2015 | Richards et al. |
| 2015/0128287 A1 | 5/2015 | LaFever |
| 2015/0193821 A1 | 7/2015 | Izumori et al. |
| 2015/0235230 A1 | 8/2015 | Ainsworth, III et al. |
| 2015/0248661 A1 | 9/2015 | Pontious |
| 2015/0248665 A1 | 9/2015 | Walz |
| 2015/0248691 A1 | 9/2015 | Pontious |
| 2015/0248716 A1 | 9/2015 | Ainsworth, III et al. |
| 2015/0262109 A1 | 9/2015 | Ainsworth, III et al. |
| 2015/0262248 A1 | 9/2015 | Chaouki et al. |
| 2015/0262291 A1 | 9/2015 | West et al. |
| 2015/0278225 A1* | 10/2015 | Weiss ............... H04M 1/72457 705/14.58 |
| 2015/0295906 A1 | 10/2015 | Ufford et al. |
| 2015/0310543 A1 | 10/2015 | DeBie |
| 2015/0332391 A1 | 11/2015 | Srivastava et al. |
| 2015/0332414 A1 | 11/2015 | Unser |
| 2015/0348200 A1 | 12/2015 | Fair et al. |
| 2016/0005114 A1 | 1/2016 | Donovan et al. |
| 2016/0055487 A1 | 2/2016 | Votaw et al. |
| 2016/0071175 A1 | 3/2016 | Reuss et al. |
| 2016/0092997 A1 | 3/2016 | Shen et al. |
| 2016/0098775 A1 | 4/2016 | Ainsworth, III et al. |
| 2016/0098776 A1 | 4/2016 | Ainsworth, III et al. |
| 2016/0098784 A1 | 4/2016 | Ainsworth, III et al. |
| 2016/0110694 A1 | 4/2016 | Walz et al. |
| 2016/0110707 A1 | 4/2016 | Nack et al. |
| 2016/0140639 A1 | 5/2016 | Ainsworth, III et al. |
| 2016/0155160 A1 | 6/2016 | Walz et al. |
| 2016/0155191 A1 | 6/2016 | Walz et al. |
| 2016/0171542 A1 | 6/2016 | Fanous et al. |
| 2016/0180258 A1 | 6/2016 | Walz |
| 2016/0180349 A1 | 6/2016 | Korra et al. |
| 2016/0183051 A1 | 6/2016 | Nack et al. |
| 2016/0189152 A1 | 6/2016 | Walz |
| 2016/0189192 A1 | 6/2016 | Walz |
| 2016/0210224 A1 | 7/2016 | Cohen et al. |
| 2016/0267485 A1 | 9/2016 | Walz et al. |
| 2016/0267508 A1 | 9/2016 | West |
| 2016/0267513 A1 | 9/2016 | Walz et al. |
| 2016/0267514 A1 | 9/2016 | Walz et al. |
| 2016/0267515 A1 | 9/2016 | Walz et al. |
| 2016/0267516 A1 | 9/2016 | Walz et al. |
| 2016/0350851 A1 | 12/2016 | Ainsworth, III et al. |
| 2016/0371740 A1 | 12/2016 | Heiser, II et al. |
| 2017/0032393 A1 | 2/2017 | Fanelli et al. |
| 2017/0039588 A1 | 2/2017 | Koltnow et al. |
| 2017/0039616 A1 | 2/2017 | Korra et al. |
| 2017/0061511 A1 | 3/2017 | Korra et al. |
| 2017/0061532 A1 | 3/2017 | Koltnow et al. |
| 2017/0161780 A1 | 6/2017 | Michalek |
| 2017/0186297 A1 | 6/2017 | Brenner |
| 2017/0193315 A1* | 7/2017 | El-Khamy ............... G08G 1/054 |
| 2018/0053172 A1 | 2/2018 | Nack et al. |
| 2018/0053252 A1 | 2/2018 | Koltnow et al. |
| 2018/0060954 A1 | 3/2018 | Yin |
| 2018/0101889 A1 | 4/2018 | Nack et al. |
| 2018/0121940 A1 | 5/2018 | Fanelli et al. |
| 2018/0308151 A1 | 10/2018 | Ainsworth, III et al. |
| 2018/0330383 A1 | 11/2018 | Pontious et al. |
| 2018/0330415 A1 | 11/2018 | Billman et al. |
| 2019/0005498 A1 | 1/2019 | Roca et al. |
| 2019/0026354 A1 | 1/2019 | Kapczynski |
| 2019/0043126 A1 | 2/2019 | Billman et al. |
| 2019/0087848 A1 | 3/2019 | Koltnow et al. |
| 2019/0095939 A1 | 3/2019 | Hickman et al. |
| 2019/0147519 A1 | 5/2019 | Ainsworth, III et al. |
| 2019/0164184 A1 | 5/2019 | Walz |
| 2019/0180327 A1 | 6/2019 | Balagopalan et al. |
| 2019/0230464 A1 | 7/2019 | Nack et al. |
| 2019/0244237 A1 | 8/2019 | Magnuson, Jr. et al. |
| 2019/0311427 A1 | 10/2019 | Quinn et al. |
| 2020/0043103 A1 | 2/2020 | Sheptunov |
| 2020/0126040 A1 | 4/2020 | Chilaka et al. |

FOREIGN PATENT DOCUMENTS

| | | |
|---|---|---|
| CA | 2 901 057 | 4/2016 |
| CA | 2 909 392 | 6/2016 |
| CA | 2 915 375 | 6/2016 |
| CA | 2 923 334 | 9/2016 |
| CA | 2 942 328 | 4/2020 |
| CN | 1290372 | 5/2001 |
| DE | 91 08 341 | 10/1991 |
| EP | 0 419 889 | 4/1991 |
| EP | 0 458 698 | 11/1991 |
| EP | 0 554 083 | 8/1993 |
| EP | 0 559 358 | 9/1993 |
| EP | 0 749 081 | 12/1996 |
| EP | 0 919 942 | 6/1999 |
| EP | 0 977 128 | 2/2000 |
| EP | 1 028 401 | 8/2000 |
| EP | 1 077 419 | 2/2001 |
| EP | 1 122 664 | 8/2001 |
| EP | 0 772 836 B1 | 12/2001 |
| EP | 2 088 743 | 8/2009 |
| EP | 2 151 793 | 2/2010 |
| JP | 10-222559 | 8/1998 |
| JP | 10-261009 | 9/1998 |
| JP | 10-293732 | 11/1998 |
| JP | 11-068828 | 3/1999 |
| JP | 2000-331068 | 11/2000 |
| JP | 2001-297141 | 10/2001 |
| JP | 2001-344463 | 12/2001 |
| JP | 2001-357256 | 12/2001 |
| JP | 2002-149778 | 5/2002 |
| JP | 2002-163498 | 6/2002 |
| JP | 2002-259753 | 9/2002 |
| JP | 2003-271851 | 9/2003 |
| JP | 2003-316881 | 11/2003 |
| JP | 2009-122880 | 6/2009 |
| KR | 10-2000-0036594 | 7/2000 |
| KR | 10-2000-0063995 | 11/2000 |
| KR | 10-2001-0016349 | 3/2001 |
| KR | 10-2001-0035145 | 5/2001 |
| KR | 10-2002-0007132 | 1/2002 |
| KR | 10-2013-0107394 | 10/2013 |
| TW | I256569 | 6/2006 |
| WO | WO 91/003789 | 3/1991 |
| WO | WO 94/006103 | 3/1994 |
| WO | WO 95/016971 | 6/1995 |
| WO | WO 95/034155 | 12/1995 |
| WO | WO 96/000945 | 1/1996 |
| WO | WO 96/042041 | 12/1996 |
| WO | WO 97/023838 | 7/1997 |
| WO | WO 98/041913 | 9/1998 |
| WO | WO 98/041931 | 9/1998 |
| WO | WO 98/041932 | 9/1998 |
| WO | WO 98/041933 | 9/1998 |
| WO | WO 98/049643 | 11/1998 |
| WO | WO 98/057285 | 12/1998 |
| WO | WO 99/004350 | 1/1999 |
| WO | WO 99/017225 | 4/1999 |
| WO | WO 99/017226 | 4/1999 |
| WO | WO 99/022328 | 5/1999 |
| WO | WO 99/032985 | 7/1999 |
| WO | WO 99/033012 | 7/1999 |
| WO | WO 99/037066 | 7/1999 |
| WO | WO 99/038094 | 7/1999 |
| WO | WO 99/059375 | 11/1999 |
| WO | WO 99/067731 | 12/1999 |
| WO | WO 00/004465 | 1/2000 |
| WO | WO 00/028441 | 5/2000 |
| WO | WO 00/055778 | 9/2000 |
| WO | WO 00/055789 | 9/2000 |
| WO | WO 00/055790 | 9/2000 |
| WO | WO 00/068862 | 11/2000 |
| WO | WO 01/010090 | 2/2001 |
| WO | WO 01/011522 | 2/2001 |
| WO | WO 01/075754 | 10/2001 |

(56) References Cited

FOREIGN PATENT DOCUMENTS

| WO | WO 02/013025 | 2/2002 |
|---|---|---|
| WO | WO 03/101123 | 12/2003 |
| WO | WO 2004/051436 | 6/2004 |
| WO | WO 2005/124619 | 12/2005 |
| WO | WO 2006/110873 | 10/2006 |
| WO | WO 2007/004158 | 1/2007 |
| WO | WO 2007/014271 | 2/2007 |
| WO | WO 2007/106393 | 9/2007 |
| WO | WO 2007/149941 | 12/2007 |
| WO | WO 2008/022289 | 2/2008 |
| WO | WO 2008/057853 | 5/2008 |
| WO | WO 2008/076343 | 6/2008 |
| WO | WO 2008/127288 | 10/2008 |
| WO | WO 2008/147918 | 12/2008 |
| WO | WO 2009/061342 | 5/2009 |
| WO | WO 2009/132114 | 10/2009 |
| WO | WO 2010/045160 | 4/2010 |
| WO | WO 2010/062537 | 6/2010 |
| WO | WO 2010/132492 | 11/2010 |
| WO | WO 2010/150251 | 12/2010 |
| WO | WO 2011/005876 | 1/2011 |
| WO | WO 2014/018900 | 1/2014 |
| WO | WO 2015/162681 | 10/2015 |
| WO | WO 2018/039377 | 3/2018 |
| ZA | 2009/03243 | 3/2010 |

OTHER PUBLICATIONS

U.S. Appl. No. 12/705,511, filed Feb. 12, 2010, Bargoli et al.
"A New Approach to Fraud Solutions", BasePoint Science Solving Fraud, pp. 8, 2006.
"Accenture Launches Media Audit and Optimization Service to Help U.S. Companies Measure Return on Investment in Advertising," Business Wire, May 22, 2006, 2 pages, http://findarticles.com/p/articles/mi_m0EIN/is_2006_May_22/ai_n16374159.
"Accenture Newsroom: Accenture Completes Acquisition of Media Audits: Acquisition Expands Company's Marketing Sciences and Data Services Capabilities," accenture.com, Dec. 12, 2005, 2 pages, http://accenture.tekgroup.com/article_display.cfm?article_id=428.
"Aggregate and Analyze Social Media Content: Gain Faster and Broader Insight to Market Sentiment," SAP Partner, Mantis Technology Group, Apr. 2011, pp. 4.
Akl, Selim G., "Digital Signatures: A Tutorial Survey," Computer, Feb. 1983, pp. 15-24.
"Atlas On Demand, Concurrent, and Everstream Strike Video-On-Demand Advertising Alliance", www.atlassolutions.com, Jul. 13, 2006, 3 pages.
"Auto Market StatisticsSM:Drive Response with Aggregated Motor Vehicle Information", Experian, Apr. 2007, http://www.experian.com/assets/marketing-services/product-sheets/auto-market-statistics.pdf, pp. 2.
"Arbitron 2006 Black Consumers," Arbitron Inc., lvtsg.com, Jul. 8, 2006, 2 pages, http://www.lvtsg.com/news/publish/Factoids/article_3648.shtml.
"Atlas On Demand and C-COR Join Forces to Offer Advertising Management Solution for On Demand TV: Global Provider of On Demand Systems Partners with Atlas to Develop and Market Comprehensive VOD Advertising Solution," www.atlassolutions.com, Jul. 25, 2005, 3 pages.
"Atlas On Demand and Tandberg Television Join Forces to Enhance Dynamic Ad Placement for On-Demand Television: Combined End-to End Solution to Provide Media Buying and Selling Communities with New Tools for Dynamic Advertising that Eliminate Technical Bar" Jun. 22, 2006—3 pages, http://www.atlassolutions.com/news_20060622.aspx.
Adzilla, Press Release, "Zillacasting Technology Approved and Patent Pending," http://www.adzilla.com/newsroom/pdf/patent_051605.pdf, May 16, 2005, pp. 2.
AFX New Limited—AFX International Focus, "Nielsen moving to measure off-TV viewing," Jun. 14, 2006, 1 page.

Alexander, Walter, "What's the Score", ABA Banking Journal, vol. 81, 1989. [Journal Article Excerpt].
Amo, Tina, "How to Find Out Who Has Lived in Your House Before You", https://web.archive.org/web/20130327090532/http://homeguides.sfgate.com/out-lived-house-before-50576.html as archived Mar. 27, 2013, pp. 2.
Applied Geographic Solutions, "What is MOSAIC™", as captured Feb. 15, 2004 from http://web.archive.org/web/20040215224329/http://www.appliedgeographic.com/mosaic.html in 2 pages.
Axiom, "Capabilites", http://www.axiomcom.com/capabilities/, printed May 7, 2015 in 2 pages.
Babcock, Gwen, "Aggregation Without Aggravation: Determining Spatial Contiguity and Joining Geographic Areas Using Hashing", SAS Global Forum 2010, Reporting and Information Visualization, Paper 223-2010, pp. 17.
Bachman, Katy, "Arbitron, VNU Launch Apollo Project," mediaweek.com Jan. 17, 2006, 3 pages, http://www.mediaweek.com/mw/search/article_display.jsp?schema=&vnu_content_id=1001847353.
BackupBox, http://mybackupbox.com printed Feb. 8, 2013 in 2 pages.
Bagozzi et al., "On the Evaluation of Structural Equation Models", JAMS, 1988, pp. 74-94.
"Bank of America Direct Web-Based Network Adds Core Functionality To Meet Day-To-Day Treasury Needs", Business Wire, Oct. 25, 1999. pp. 2.
"Bank of America Launches Total Security Protection™; Features Address Cardholders' Financial Safety Concerns; Supported by $26 Million National Advertising Campaign; Free Educational Materials", PR Newswire, Oct. 9, 2002, pp. 2.
BBC Green Home, "My Action Plan", as printed from The Wayback Machine at http://web.archive.org/web/20080513014731/http://www.bbcgreen.com/actionplan, May 13, 2008, pp. 50.
BERR: Department for Business Enterprise & Regulatory Reform, "Regional Energy Consumption Statistics", Jun. 10, 2008, http://webarchive.nationalarchives.gov.uk/20080610182444/http://www.berr.gov.uk/energy/statistics/regional/index.html.
"Beverly Hills Man Convicted of Operating 'Bust-Out' Schemes that Caused More than $8 Million in Losses", Department of Justice, Jul. 25, 2006, 2 Pgs.
Bitran et al., "Mailing Decisions in Catalog Sales Industry", Management Science (JSTOR), vol. 42, No. 9, pp. 1364-1381, Sep. 1996.
Blackbaud.com, www.blackbaud.com, various pages, retrieved Jan. 22, 2009 from www.archive.org, 23 pages.
Brown et al., "ALCOD IDSS:Assisting the Australian Stock Market Surveillance Team's Review Process," Applied Artificial Intelligence Journal, Dec. 1, 1996, pp. 625-641.
Bult et al., "Optimal Selection for Direct Mail," Marketing Science, 1995, vol. 14, No. 4, pp. 378-394.
Burr Ph.D., et al., "Utility Payments as Alternative Credit Data: A Reality Check", Asset Builders of America, Inc., Oct. 5, 2006, pp. 1-18, Washington, D.C.
Burr Ph.D., et al., "Payment Aggregation and Information Dissemination (Paid): Annotated Literature Search", Asset Builders of America, Inc., Sep. 2005.
"Bust-Out Schemes", Visual Analytics Inc. Technical Product Support, Newsletter vol. 4, Issue 1, Jan. 2005, pp. 7.
"Cable Solution Now, The Industry Standard For Information Management: Strata's tim.net Crosses Important Threshold Dominant Solution for All Top 20 TV Markets," stratag.com, Apr. 28, 2006, 1 page, http://stratag.com/news/cablepress042806.html.
Caliendo, et al., "Some Practical Guidance for the Implementation of Propensity Score Matching", IZA:Discussion Paper Series, No. 1588, Germany, May 2005, pp. 32.
"Carbon Calculator—Calculation Explanation," Warwick University Carbon Footprint Project Group, 2005, pp. 5, http://www.carboncalculator.co.uk/explanation.php.
Card Marketing, Use the Latest CRM Tools and Techniques, www.CardForum.com, vol. 5 No. 10, Dec. 2001.
"Case Study: Expanding to Non-Traditional Prescreen Marketing Channels Reduces Company's Cost Per Account Booked", FairIsaac, https://web.archive.org/web/20060428115326/http://www.fairisaac.

(56) References Cited

OTHER PUBLICATIONS com/NR/rdonlyres/048FAE87-14B5-4732-970D-BDF20F09EB2D/0/MSDSRealTimeCS.pdf, Apr. 2003, pp. 2.
Chandler et al., "The Benefit to Consumers from Generic Scoring Models Based on Credit Reports", The MDS Group Atlanta, Georgia, Jul. 1, 1991, Abstract.
ChannelWave.com, PRM Central—About PRM, http://web.archive.org/web/20000510214859/http://www.channelwave.com as printed on Jun. 21, 2006, May 2000 Archive.
"Chase Gets Positive," Bank Technology News, May 6, 2000, vol. 14, No. 5, pp. 33.
Chung, Charles; Internet Retailer, "Multi-channel retailing requires the cleanest data—but don't expect it from the customer", Jan./Feb. 2002.
"Claritas Forms Life Insurance Consortium with Worldwide Financial Services Association: Initiative with LIMRA International is First of its Kind to Provide Actual Sales Information at Small Geographic Areas," Feb. 9, 2006, 3 pages, http://www.claritas.com/claritas/Default/jsp?ci=5&si=1&pn=limra.
"Claritas Introduces PRIZM NE Consumer Electronic Monitor Profiles: New Information Product Provides Insight Into The Public's Purchasing Behaviors of Consumer Electronics," May 30, 2006, 3 pages.
"Cole Taylor Bank Chooses Integrated E-Banking/E-Payments/Reconciliation Solution From Fundtech", Business Wire, Oct. 21, 1999, pp. 2.
"Consumer Reports Finds American-Made Vehicles Close Reliability Gap with European-Made Vehicle—As Japanese Continue to Set New Benchmarks for the Industry", Consumer Reports: Consumers Union, Yonkers, NY, Apr. 2003, pp. 2.
CreditKarma, http://www.creditkarma.com printed Feb. 8, 2013 in 2 pages.
CreditSesame, http://www.creditsesame.com/how-it-works/our-technology/ printed Feb. 5, 2013 in 2 pages.
Click Z, "ISPs Collect User Data for Behavioral Ad Targeting," dated Jan. 3, 2008, printed from http://www.clickz.com/showPage.html?page=clickz Apr. 16, 2008.
CNET news.com, "Target me with your ads, please," dated Dec. 5, 2007, printed from http://www.news.com/2102-1024_3-6221241.html?tag+st.util.print Mar. 18, 2008.
Creamer, Matthew; Consulting in marketing; Accenture, Others Playing Role in Firms' Processes, Crain's Chicago Business, Jun. 12, 2006, 2 pages.
Culhane, Patrick, "Data: Powerfully Linking Service and Profitability," Jul./Aug. 1996, Bank Management, vol. 72, No. 4, pp. 8-12.
Dankar et al., "Efficient Private Information Retrieval for Geographical Aggregation", Procedia Computer Science, 2014, vol. 37, pp. 497-502.
"Database Marketing: A new Approach to the Old Relationships," Chain Storage Executive Edition, Dialogue, Sep. 1991, pp. 2.
Davies, Donald W., "Applying the RSA Digital Signature to Electronic Mail," Computer, Feb. 1983, pp. 55-62.
Davis et al., "User Acceptance of Computer Technology: A Comparison of Two Theoretical Models", Management Science, Aug. 1989, vol. 35, No. 8, pp. 982-1003.
DeGruchy, et al., "Geodemographic Profiling Benefits Stop-Smoking Service;" The British Journal of Healthcare Computing & Information Management; Feb. 2007; 24, 7; pp. 29-31.
Delany et al., "Firm Mines Offline Data To Target Online", http://web.archive.org/web/20071117140456/http://www.commercialalert.org/news/archive/2007/10/firm-mines-offline-data-to-target-online-ads, Commercial Alert, Oct. 17, 2007, pp. 3.
demographicsnow.com, sample reports, "Age Rank Report", Jul. 17, 2006, 3 pages.
demographicsnow.com, sample reports, "Consumer Expenditure Summary Report", Jul. 17, 2006, 3 pages.
demographicsnow.com, sample reports, "Income Comparison Report", Jul. 17, 2006, 4 pages.
Dolnicar, Sara, "Using Cluster Analysis For Market Segmentation—Typical Misconceptions, Established Methodological Weaknesses And Some Recommendations For Improvement," Australasian Journal of Market Research, 2003, vol. 11, No. 2, pp. 5-12.
Downey, Sarah A., "Smile, you're on Spokeo.com! Concerned? (here's what to do)", https://www.abine.com/blog/2011/how-to-remove-yourself-from-spokeo/, as posted Jan. 13, 2011 in 7 pages.
Drawbridge, "Customer Success", http://www.drawbrid.ge/customer-success, printed May 7, 2015 in 17 pages.
Drawbridge, "Solutions", http://www.drawbrid.ge/solutions, printed May 7, 2015 in 5 pages.
Drawbridge, "Technology", http://www.drawbrid.ge/technology, printed May 7, 2015 in 3 pages.
Dstillery, "Products", http://dstillery.com/how-we-do-it/products/, printed May 7, 2015 in 2 pages.
Dstillery, "What We Do", http://dstillery.com/what-we-do/, printed May 7, 2015 in 2 pages.
Dstillery, "Who We Are", http://dstillery.com/who-we-are/, printed May 7, 2015 in 2 pages.
Dymi, Amilda, Need for Leads Spurs Some Upgrades, Origination News-Special Report, May 1, 2008, vol. vol. 17, Issue No. 8, pp. p. 24, Atlanta, Copyright 2008 SourceMedia, Inc.
Egol, Len; "What's New in Database Marketing Software," Direct, Aug. 1994, vol. 6, No. 8, pp. 39.
Elmasri et al., "Fundamentals of Database Systems, Third Edition (Excerpts)", Jun. 2000, pp. 253, 261, 268-70, 278-80, 585, 595.
Energy Saving Trust™, "HEED Online User Manual (1.7)", Jul. 24, 2008, pp. 18, www.energysavingtrust.org.uk, Jul. 24, 2008.
"Epsilon Leads Discussion on Paradigm Shift in TV Advertising," epsilon.com, Jun. 24, 2004, 2 pages, http://www.epsilon.com/who-pr_tvad040624.html.
Experian and AGS Select SRC to Deliver Complete Marketing Solutions; Partnership First to Marketplace with Census2000 Data. PR Newswire. New York: Mar. 21, 2001. p. 1.
"Experian Launches Portfolio Monitor—Owner NoticesSM", News Release, Feb. 2003, Costa Mesa, CA.
Experian-Scorex Announces New Credit Simulation Tool, PR Newswire, Costa Mesa, CA, Jun. 13, 2005.
Experian Global Press Office, "Experian Announces Innovative e-Commerce Technology Enhancement", 2001 [online] [retrieved on Aug. 11, 2005] Retrieved from the Internet http://press.experian.com/popup/sd.cfm?f=280.htm.
Experian Global Press Office, "Experian Enables Profitable e-Business", 2000 [online] [retrieved on Aug. 11, 2005] Retrieved from the Internet http://press.experian.com/popup/sd.cfm?f=43.htm.
Experian: Improve Outcomes Through Applied Customer Insight, Brochure, Nov. 2009, pp. 20.
Experian: Mosaic Geodemographic Lifestyle Segmentation on ConsumerView [Data Card], as printed from http://datacards.experian.com/market?page=research/datacard_print&prin, Apr. 6, 2012, pp. 4.
Experian: Mosaic Public Sector 2009 Launch, 2009, pp. 164.
Experian: Mosaic United Kingdom, Brochure, Jun. 2009, pp. 24.
Experian: Mosaic UK—Optimise the Value of Your Customers and Locations, Now and in the Future, Brochure, 2010, pp. 24.
Experian: Mosaic UK—Unique Consumer Classification Based on In-Depth Demographic Data, as printed from http://www.experian.co.uk/business-strategies/mosaic-uk.html, Jul. 30, 2012, pp. 2.
Experian: Mosaic USA, Brochure, May 2009, pp. 14.
Experian: Mosaic USA—Consumer Lifestyle Segmentation [Data Card], Dec. 2009, pp. 2.
Experian: Public Sector, as printed form http://publicsector.experian.co.uk/Products/Mosaicpublicsector.aspx, 2012, pp. 2.
"Fair Isaac Introduces Falcon One System to Combat Fraud at Every Customer Interaction", Business Wire, May 5, 2005, pp. 3.
"Fair Isaac Offers New Fraud Tool", National Mortgage News & Source Media, Inc., Jun. 13, 2005, pp. 2.
Fanelli, Marc, "Building a Holistic Customer View", MultiChannel Merchant, Jun. 26, 2006, pp. 2.
"Fighting the New Face of Fraud", FinanceTech, http://www.financetech.com/showArticle.jhtml?articleID=167100405, Aug. 2, 2005.

(56) References Cited

OTHER PUBLICATIONS

Findermind, "PeopleFinders Review", as archived Jun. 1, 2012 in 4 pages. http://web.archive.org/web/20120601010134/http://www.findermind.com/tag/peoplefinders-review/.
Frontporch, "Ad Networks—Partner with Front Porch!," www.frontporch.com printed Apr. 2008 in 2 pages.
Frontporch, "New Free Revenue for Broadband ISPs!", http://www.frontporch.com/html/bt/FPBroadbandISPs.pdf printed May 28, 2008 in 2 pages.
"FTC Testifies: Identity Theft on the Rise", FTC News Release, Mar. 7, 2000, pp. 3.
Gao et al., "Exploring Temporal Effects for Location Recommendation on Location-Based Social Networks", RecSys'13, Oct. 12-16, 2013, Hong Kong, China, pp. 93-100.
Garcia-Molina et al., "Database Systems: The Complete Book", Prentice Hall, Inc., Ch. 15, 2002, pp. 713-715.
"Geographic Aggregation Tool SAS Beta Version 4.1", Environmental Health Surveillance Section, New York State Dept. in Health, Troy, NY, Mar. 24, 2015, pp. 10.
Georges, et al., "KDD'99 Competition: Knowledge Discovery Contest", SAS Institute, 1999, 6 pages.
Gilje, Shelby, "Keeping Tabs On Businesses That Keep Tabs On US", NewsRoom, The Seattle Times, Section: SCENE, Apr. 19, 1995, pp. 4.
Gonul, et al., "Optimal Mailing of Catalogs: A New Methodology Using Estimable Structural Dynamic Programming Models", 14 pages, Management Science, vol. 44, No. 9, Sep. 1998.
Halliday, Jean, "Ford Recruits Accenture for Marketing Plan," Automotive News Feb. 13, 2006, 2 pages, Crain Communications.
Hampton et al., "Mapping Health Data: Improved Privacy Protection With Donut Method Geomasking", American Journal of Epidemiology, Sep. 3, 2010, vol. 172, No. 9, pp. 8.
Hartfeil, Guenther, "Bank One Measures Profitability of Customers, Not Just Products," Journal of Retail Banking Services, Aug. 1996, vol. 18, No. 2, pp. 23-29.
Haughton et al., "Direct Marketing Modeling with CART and CHAID", Journal of Direct Marketing, Fall 1997, vol. 11, No. 4, pp. 42-52.
Helm, Burt, "Nielsen's New Ratings Yardstick," businessweek.com, Jun. 20, 2006, 3 pages, http://www.businessweek.com/technology/content/jun2006/tc20060620_054223.htm.
Hill, Kerry, "Identity Theft Your Social Security Number Provides Avenue For Thieves", NewsRoom, Wisconsin State Journal, Sep. 13, 1998, pp. 4.
Hojoki, http://hojoki.com printed Feb. 8, 2013 in 5 pages.
Hinman, Donald P., "The Perfect Storm: Response Metrics and Digital TV," chiefmarketer.com, May 17, 2006, 2 pages, http://www.chiefmarketer.com/crm_loop/roi/perfect-storm-051706/index.html.
IFTTT, "About IFTTT," http://ifttt.com/wtf printed Feb. 18, 2013 in 4 pages.
Information Resources, Inc. and Navic Networks Form Joint Relationship to Support Next Generation of Technology for Advertising Testing, IRI Expands BehaviorScan® Solution to Meet Digital and On-demand Needs, Feb. 27, 2006, http://us.infores.com/page/news/pr/pr_archive?mode=single&pr_id=117, printed Oct. 4, 2007 in 2 pages.
Instant Access to Credit Reports Now Available Online with DMS' CreditBrowser-based system also Simplifies Credit Decisioning and Offers a Central Point of Control, Business Wire, Dallas, May 23, 2000, p. 0264.
"Intelligent Miner Applications Guide", IBM Corp., Apr. 2, 1999, Chapters 4-7, pp. 33-132.
"IRI and Acxiom Introduce More Efficient and Actionable Approach To Consumer Segmentation and Targeted Marketing," eu-marketingportal.de, Jan. 26, 2006, 2 pages, http://www.eu-marketingportal.de.
"Japan's JAAI System Appraises Used Cars Over Internet", Asia Pulse, Mar. 3, 2000, p. 1.
Jost, Allen; Neural Networks, Credit World, Mar./Apr. 1993, vol. 81, No. 4, pp. 26-33.

Jowit, Juliette, "Ever wondered how big your own carbon footprint might be?", Nov. 4, 2007, pp. 4, http://www.guardian.co.uk/money/2007/nov/04/cash.carbonfootprints/print.
Karlan et al., "Observing Unobservables:Identifying Information Asymmetries with a Consumer Credit Field Experiment", Jun. 17, 2006, pp. 58, http://aida.econ.yale.edu/karlan/papers/ObservingUnobservables.KarlanZinman.pdf.
Kessler, Josh "How to Reach the Growing 'Thin File' Market: Huge Immigration Market and Other Groups with Little or No Credit History May Be Creditworthy. There are Several Ways to Tap This Well of Business", ABA Banking Journal, vol. 97, 2005.
King et al., Local and Regional CO2 Emissions Estimates for 2004 for the Uk, AEA Energy & Environment, Report for Department for Environment, Food and Rural Affairs, Nov. 2006, London, UK, pp. 73.
Klein, et al., "A Constant-Utility Index of the Cost of Living", The Review of Economic Studies, pp. 84-87, vol. XV-XVI, Kraus Reprint Corporation, New York, 1960.
Klein, et al., "An Econometric Model of the United States: 1929-1952", North-Holland Publishing Company, Amsterdam, 1955, pp. 4-41.
Klein, Lawrence R., "The Keynesian Revolution", New York, The MacMillan Company, 1947, pp. 56-189.
Kohavi, Ron, "A Study of Cross-Validation and Bootstrap for Accuracy Estimation and Model Selection", International Joint Conference on Artificial Intelligence, 1995,pp. 7.
Kwan et al., "Protection of Geoprivacy and Accuracy of Spatial Information: How Effective Are Geographical Masks?" Carographica, Summer 2004, vol. 39, No. 2, pp. 15-27.
Lamons, Bob, "Be Smart: Offer Inquiry Qualification Services," Marketing News, ABI/Inform Global, Nov. 6, 1995, vol. 29, No. 23, pp. 13.
LeadVerifier: Why Should You Use LeadVerifier?, downloaded from www.leadverifier.com/LeadVerifier_Why.asp, dated Feb. 7, 2006 on www.archive.org.
Leskovec, Jure, "Social Media Analytics: Tracking, Modeling and Predicting the Flow of Information through Networks", WWW 2011—Tutorial, Mar. 28-Apr. 1, 2011, Hyderabad, India, pp. 277-278.
LifeLock, http://web.archive.org/web/20110724011010/http://www.lifelock.com/? as archived Jul. 24, 2011 in 1 page.
Littwin, Angela, "Beyond Usury: A Study of Credit-Card Use and Preference Among Low-Income Consumers", Texas Law Review, vol. 86, No. 3, pp. 451-506; Feb. 2008.
Longo, Tracey, "Managing Money: Your Family Finances", Kiplinger's Personal Finance Magazine, Jun. 1, 1995, vol. 49, No. 6, pp. 4.
Loshin, Intelligent Enterprise: Better Insight for Business Decisions, "Value-Added Data: Merge Ahead", Feb. 9, 2000, vol. 3, No. 3, 5 pages.
Lovelace, Robin, "IPFinR: An Implementation of Spatial Microsimulation in R", RL's Powerstar, Jun. 12, 2013, pp. 9, https://robinlovelace.wordpress.com/2013/06/12/ipfinr-an-implementation-of-spatial-microsimulation-in-r/.
Maciejewski et al., "Understanding Syndromic Hotspots—A Visual Analytics Approach", Conference Paper, IEEE Symposium on Visual Analytics Science and Technology, Oct. 21-23, 2017, pp. 35-42.
McManus et al.; "Street Wiser," American Demographics; ABI/Inform Global; Jul./Aug. 2003; 25, 6; pp. 32-35.
McNamara, Paul, "Start-up's pitch: The Envelope, please," Network World, Apr. 28, 1997, vol. 14, No. 17, p. 33.
"Mediamark Research Inc. Releases Findings From Mobile Marketing Consumer Study; Outback Steakhouse and Royal Caribbean Cruise Lines Among Brands Participating in Mobile Marketing Research," www.thefreelibrary.com, May 9, 2006, 4 pages.
Merugu, et al.; "Wallet Estimation Models," NYU workshop on CRM and Data Mining, 2005.
Miller, Joe, "NADA Used-Car Prices Go Online", Automotive News, Jun. 14, 1999, p. 36.
Mint.com, http://www.mint.com/how-it-works/ printed Feb. 5, 2013 in 2 pages.

(56) References Cited

OTHER PUBLICATIONS

Morrissey, Brian, "Aim High: Ad Targeting Moves to the Next Level", ADWEEK, dated Jan. 21, 2008 as downloaded from http://www.adweek.com/aw/magazine/article_display.isp?vnu on Apr. 16, 2008.
"Mosaic" (geodemography), available from http://en.wikipedia.org/wiki/Mosaic_(geodemography), as last modified Jul. 13, 2012. pp. 4.
Mover, "One API for the Cloud," http://mover.io printed Feb. 6, 2013 in 3 pages.
Muus, et al., "A Decision Theoretic Framework for Profit Maximization in Direct Marketing", Sep. 1996, pp. 20.
MyReceipts, http://www.myreceipts.com/, printed Oct. 16, 2012 in 1 page.
MyReceipts—How it Works, http://www.myreceipts.com/howItWorks.do, printed Oct. 16, 2012 in 1 page.
NebuAd, "Venture Capital: What's New—The Latest On Technology Deals From Dow Jones VentureWire", Press Release, http://www.nebuad.com/company/media_coverage/media_10_22_07.php, Oct. 22, 2007, pp. 2.
"New FICO score extends lenders' reach to credit—underserved millions", Viewpoints: News, Ideas and Solutions from Fair Isaac, Sep./Oct. 2004 as downloaded from http://www.fairisaac.com/NR/exeres/F178D009-B47A-444F-BD11-8B4D7D8B3532,frame . . . in 6 pages.
"New Privista Product Provides Early Warning System to Combat Identity Theft", PR Newswire, Oct. 24, 2000, PR Newswire Association, Inc., New York.
Organizing Maniac's Blog—Online Receipts Provided by MyQuickReceipts.com, http://organizingmaniacs.wordpress.com/2011/01/12/online-receipts-provided-by-myquickreceipts.com/ dated Jan. 12, 2011 printed Oct. 16, 2012 in 3 pages.
Otixo, "Your Dashboard for the Cloud," http://Otixo.com/product printed Feb. 6, 2013 in 3 pages.
Otter, et al., "Direct Mail Selection by Joint Modeling of the Probability and Quantity of Response", Jun. 1997, pp. 14.
Padgett et al., "A Comparison of Carbon Calculators", Environmental Impact Assessment Review 28, pp. 106-115, Jun. 7, 2007.
Perry et al., "Integrating Waste and Renewable Energy to Reduce the Carbon Footprint of Locally Integrated Energy Sectors", Energy 33, Feb. 15, 2008, pp. 1489-1497.
Phorm, "BT PLC TalkTalk and Virgin Media Inc. confirm exclusive agreements with Phorm", Press Release, http://www.phorm.com/about/launch_agreement.php, Feb. 14, 2008, pp. 2.
Phorm, "The Open Internet Exchange, 'Introducing the OIX'", http://www.phorm.com/oix/ printed May 29, 2008 in 1 page.
Pipes, http://pipes.yahoo.com/pipes printed Feb. 18, 2013 in 1 page.
Planet Receipt—Home, http://www.planetreceipt.com/home printed Oct. 16, 2012 in 1 page.
Planet Receipt—Solutions & Features, http://www.planetreceipt.com/solutions-features printed Oct. 16, 2012 in 2 pages.
Planwise, http://planwise.com printed Feb. 8, 2013 in 5 pages.
Polatoglu et al., "Theory and Methodology, Probability Distributions of Cost, Revenue and Profit over a Warranty Cycle", European Journal of Operational Research, Jul. 1998, vol. 108, Issue 1, pp. 170-183.
"PostX to Present at Internet Showcase", PR Newswire, Apr. 28, 1997, pp. 2.
PostX, "PostX® Envelope and ActiveView", http://web.archive.org/web/19970714203719/http://www.postx.com/priducts_fm.html, Jul. 14, 1997 (retrieved Nov. 7, 2013) in 2 pages.
PR Web: Press Release Newswire, Anchor Launches LeadVerifier to Verify, Correct and Enhance Internet Leads, Jul. 19, 2005, pp. 2 pages, Farmingdale, NY.
Predictive Behavioral Targeting http://www.predictive-behavioral-targeting.com/index.php.Main_Page as printed Mar. 28, 2008 in 4 pages.
"PremierGuide Announces Release 3.0 of Local Search Platform", Business Wire, Mar. 4, 2004, Palo Alto, CA, p. 5574.
Primadesk, http://primadesk.com printed Feb. 8, 2013 in 1 page.

PrivacyGuard, http://web.archive.org/web/20110728114049/http://www.privacyguard.com/ as archived Jul. 28, 2011 in 1 page.
Punj et al., "Cluster Analysis in Marketing Research: Review and Suggestions for Application," Journal of Marketing Research, May 1983, vol. 20, No. 2, pp. 134-148.
RapUP, Attribute Management & Report Systems:Absolute Advantage!, Magnum Communications Brochure, Copyright 2004, pp. 5.
Reinartz et al., "On the Profitability of Long-Life Customers in a Noncontractual Setting: An Empirical Investigation and Implications for Marketing" Journal of Marketing, Oct. 2000, vol. 64, pp. 17-35.
Reinbach, Andrew, "MCIF Aids Banks in CRA Compliance", Bank Systems & Technology, Aug. 1995, vol. 32, No. 8, p. 27.
Rodgers, Zachary, "ISPs Collect User Data for Behavioral Ad Targeting", ClickZ, www.clickz.com/showPage.html?page=clickz, Jan. 3, 2008, pp. 3.
Rosset et al., "Wallet Estimation Models", IBM TJ Watson Research Center, 2005, Yorktown Heights, NY, pp. 12.
Rossi et al.; "The Value of Purchasing History Data in Target Marketing"; Marketing Science, Apr. 1996, vol. 15, No. 4, pp. 321-340.
Sakia, R.M., "The Box-Cox Transformation Technique: a Review", The Statistician, 41, 1992, pp. 169-178.
SalesLogix.net, SalesLogix Sales Tour, Apr. 11, 2001, http:///www.saleslogix.com, pp. 19.
Sawyers, Arlena, "NADA to Offer Residual Guide", Automotive News, May 22, 2000, p. 1.
Schmittlein et al., "Customer Base Analysis: An Industrial Purchase Process Application", Marketing Science, vol. 13, No. 1, Winter 1994, pp. 41-67.
ServiceObjects, "DOTS Web Services—Product Directory", http://www.serviceobjects.com/products/directory_of_web_services.asp printed Aug. 17, 2006 in 4 pages.
ShoeBoxed, https://www.shoeboxed.com/sbx-home/ printed Oct. 16, 2012 in 4 pages.
Smith, Richard M., "The Web Bug FAQ", Nov. 11, 1999, Version 1.0, pp. 4.
Smith, Wendell R., "Product Differentiation and Market Segmentation as Alternative Marketing Strategies", The Journal of Marketing, The American Marketing Association, Brattleboro, Vermont, Jul. 1956, vol. XXI, pp. 3-8.
"SRC Announces Free Dashups to Mashups Adding Geographic Business Intelligence at Web Speed to the Enterprise on www.FreeDemographics.com/API," directionsmag.com, Jun. 12, 2006, 3 pages, http://www.directionsmag.com/press.releases/index.php?duty=Show&id=1.
"SRC Delivers Industry's First Drive Time Engine Developed to Follow Actual Road Networks," thomasnet.com, May 21, 2006, 4 pages, http://news.thomasnet.com/companystory/485722.
Stein, Benchmarking Default Prediction Models: Pitfalls and Remedies in Model Validation, Moody's KMV, Revised Jun. 13, 2002, Technical Report #020305; New York.
Stone, "Linear Expenditure Systems and Demand Analysis: An Application to the Pattern of British Demand", The Economic Journal: The Journal of The Royal Economic Society, Sep. 1954, pp. 511-527, vol. LXIV, Macmillan & Co., London.
Storage Made Easy(SME), http://storagemadeeasy.com printed Feb. 6, 2013 in 1 page.
Sumner, Anthony, "Tackling The Issue of Bust-Out Fraud", Retail Banker International, Jul. 24, 2007, pp. 4.
Sumner, Anthony, "Tackling The Issue of Bust-Out Fraud", Experian: Decision Analytics, Dec. 18, 2007, pp. 24.
Sumner, Anthony, "Tackling The Issue of Bust-Out Fraud", e-News, Experian: Decision Analytics, pp. 4, [Originally Published in Retail Banker International Magazine Jul. 24, 2007].
Sweat, Jeff; "Know Your Customers," Information Week, Nov. 30, 1998, pp. 20.
Tao, Lixin, "Shifting Paradigms with the Application Service Provider Model"; Concordia University, IEEE, Oct. 2001, Canada.
TARGUSinfo: Lead Verification, Verify Your Leads With Unique Accuracy And Ease, downloaded from www.targusinfo.com/solutions/verify/Default.asp, as printed Aug. 1, 2006.

(56) References Cited

OTHER PUBLICATIONS

TARGUSinfo: Solutions: Services: Verify Express—Verify, Correct and Enhance Customer Provided Data, downloaded from http://web.archive.org/web/20051028122545/http://www.targusinfo.com/solutions/services/verify/, Oct. 28, 2005, as printed Apr. 30, 2011, 27 pgs.

Thoemmes, Felix, "Propensity Score Matching in SPSS", Center for Educational Science and Psychology, University of Tübingen, Jan. 2012.

UPI, "Nielsen Media Research goes electronic," Jun. 14, 2006, 1 page.

"VOD Integration Now Available In Strata: Buyers / Sellers Benefit from VOD Component on Popular Platform," stratag.com, Feb. 21, 2006, 1 page, http://www.stratag.com/news/mediapress022106.html.

Warshaw, Paul R., "A New Model for Predicting Behavioral Intentions: An Alternative to Fishbein", Journal of Marketing Research, May 1980, vol. XVII, pp. 153-172.

"WashingtonPost.com and Cars.com Launch Comprehensive Automotive Web Site For the Washington Area", PR Newswire, Oct. 22, 1998. pp. 2.

Webber, Richard, "The Relative Power of Geodemographics vis a vis Person and Household Level Demographic Variables as Discriminators of Consumer Behavior," CASA:Working Paper Series, http://www.casa.ucl.ac.uk/working_papers/paper84.pdf, Oct. 2004, pp. 17.

White, Ron, "How Computers Work", Millennium Edition, Que Corporation, Indianapolis, IN, Sep. 1999, pp. 284.

Whitney, Daisy; Atlas Positioning to Shoulder VOD Ads; Campaign Management Tools Optimize Inventory, TelevisionWeek, May 23, 2005, 3 pages.

Wiedmann, et al., "Report No. 2: The use of input-output analysis in REAP to allocate Ecological Footprints and material flows to final consumption categories", Resources and Energy Analysis Programme, Stockholm Environment Institute—York, Feb. 2005, York, UK, pp. 33.

Wilson, Andrea, "Escaping the Alcatraz of Collections and Charge-Offs", http://www.transactionworld.net/articles/2003/october/riskMgmt1.asp, Oct. 2003.

Working, Holbrook, "Statistical Laws of Family Expenditure", Journal of the American Statistical Association, pp. 43-56, vol. 38, American Statistical Association, Washington, D.C., Mar. 1943.

Wyner, "Customer valuation: Linking behavior and economics", Aug. 1996, Marketing Research: A Magazine of Management & Applications vol. 8, No. 2 pp. 36-38.

Yoon, Chang Woo; "Vicarious Certification and Billing Agent for Web Information Service", High Spped Network Access Section, Electronics and Telecommunications Research Institute, Jan. 21-23, 1998, pp. 344-349.

Yuan et al., "Time-Aware Point-of-Interest Recommendation", SIGIR'13, Jul. 28-Aug. 1, 2013, Dublin, Ireland, pp. 363-372.

Yun et al., "An Efficient Clustering Algorithm for Market Basket Data Based on Small Large Ratios," Computer Software and Applications Conference, Oct. 2001, pp. 505-510.

Zandbergen, Paul A., "Ensuring Confidentiality of Geocoded Health Data: Assessing Geographic Masking Strategies for Individual-Level Data", Review Article, Hindawi Publishing Corporation, Advances in Medicine, VI. 2014, pp. 14.

Zapier, "Integrate Your Web Services," http://www.Zapier.com printed Feb. 18, 2013 in 3 pages.

Zen et al., "Value-Added Internet: a Pragmatic TINA-Based Path to the Internet and PSTN Integration", Global Convergence of Telecommunications and Distribute Object Computing, Nov. 17-20, 1997, pp. 10.

Declaration of Paul Clark, DSc. for Inter Partes Review of U.S. Pat. No. 8,504,628 (Symantec Corporation, Petitioner), dated Jan. 15, 2014 in 76 pages.

Exhibit D to Joint Claim Construction Statement, filed in Epsilon Data Management, LLC, No. 2:12-cv-00511-JRG (E.D. Tex.) (combined for pretrial purposes with *RPost Holdings. Inc., et al.* v. *Experian Marketing Solutions. Inc.*, No. 2:12-cv-00513-JRG (E.D. Tex.)) Filed Jan. 14, 2014 in 9 pages.

First Amended Complaint in Civil Action No. 2:12-cv-511-JRG (*Rpost Holdings, Inc. And Rpost Communications Limited* V. *Constant Contact, Inc.; et al.*) filed Feb. 11, 2013 in 14 pages.

First Amended Complaint in Civil Action No. 2:12-cv-511-JRG (*Rpost Holdings, Inc. And Rpost Communications Limited* V. *Epsilon Data Management, LLC.*) filed Sep. 13, 2013 in 9 pages.

First Amended Complaint in Civil Action No. 2:12-cv-513-JRG (*Rpost Holdings, Inc. And Rpost Communications Limited* V. *Experian Marketing Solutions, Inc.*) filed Aug. 30, 2013 in 9 pages.

Petition for Covered Business Method Patent Review in U.S. Pat. No. 8,161,104 (*Experian Marketing Solutions, Inc., Epsilon Data Management, LLC, and Constant Contact, Inc.*, v. *Rpost Communications Limited*) dated Jan. 29, 2014 in 90 pages.

Source Code Appendix attached to U.S. Appl. No. 08/845,722 by Venkatraman et al., Exhibit A, Part 1 & 2, pp. 32.

Official Communication in Canadian Patent Application No. 2,381,349, dated May 17, 2013.

Official Communication in Canadian Patent Application No. 2,381,349, dated Jul. 31, 2014.

International Preliminary Examination Report in International Application No. PCT/US00/21453 dated, Jun. 26, 2001.

International Search Report and Written Opinion in PCT Application No. PCT/US07/76152, dated Mar. 20, 2009.

International Search Report and Written Opinion for Application No. PCT/US2007/021815, dated Sep. 5, 2008.

International Search Report and Written Opinion for Application No. PCT/US2008/064594, dated Oct. 30, 2008.

International Preliminary Report and Written Opinion in PCT/US2008/064594, dated Dec. 10, 2009.

International Search Report and Written Opinion in PCT/US08/083939, dated Jan. 29, 2009.

International Search Report and Written Opinion for Application No. PCT/US09/60393, dated Dec. 23, 2009.

International Search Report and Written Opinion for Application No. PCT/US2010/034434, dated Jun. 23, 2010.

International Preliminary Report on Patentability for Application No. PCT/US2010/034434, dated Feb. 4, 2014.

International Search Report and Written Opinion for Application No. PCT/US2013/052342, dated Nov. 21, 2013.

International Preliminary Report on Patentability for Application No. PCT/US2013/052342, dated Feb. 5, 2015.

International Search Report and Written Opinion for Application No. PCT/US2017/048265, dated Dec. 5, 2017.

International Preliminary Report on Patentability in Application No. PCT/US2017/048265, dated Mar. 7, 2019.

CuneXus, "CuneXus Unveils Click-to-Accept Mobile Lending Platform at Finovate (VIDEO)", https://cunexusonline.com/cunexus-finovatespring-video-released/, May 2, 2014, pp. 2.

TransUnion, "DecisionEdge | MobileCredit", https://www.transunion.co.za/resources/transunion-za/doc/product/resources/product-decisionedge-acquisition-mobilecredit-as.pdf, 2015, pp. 2.

\* cited by examiner

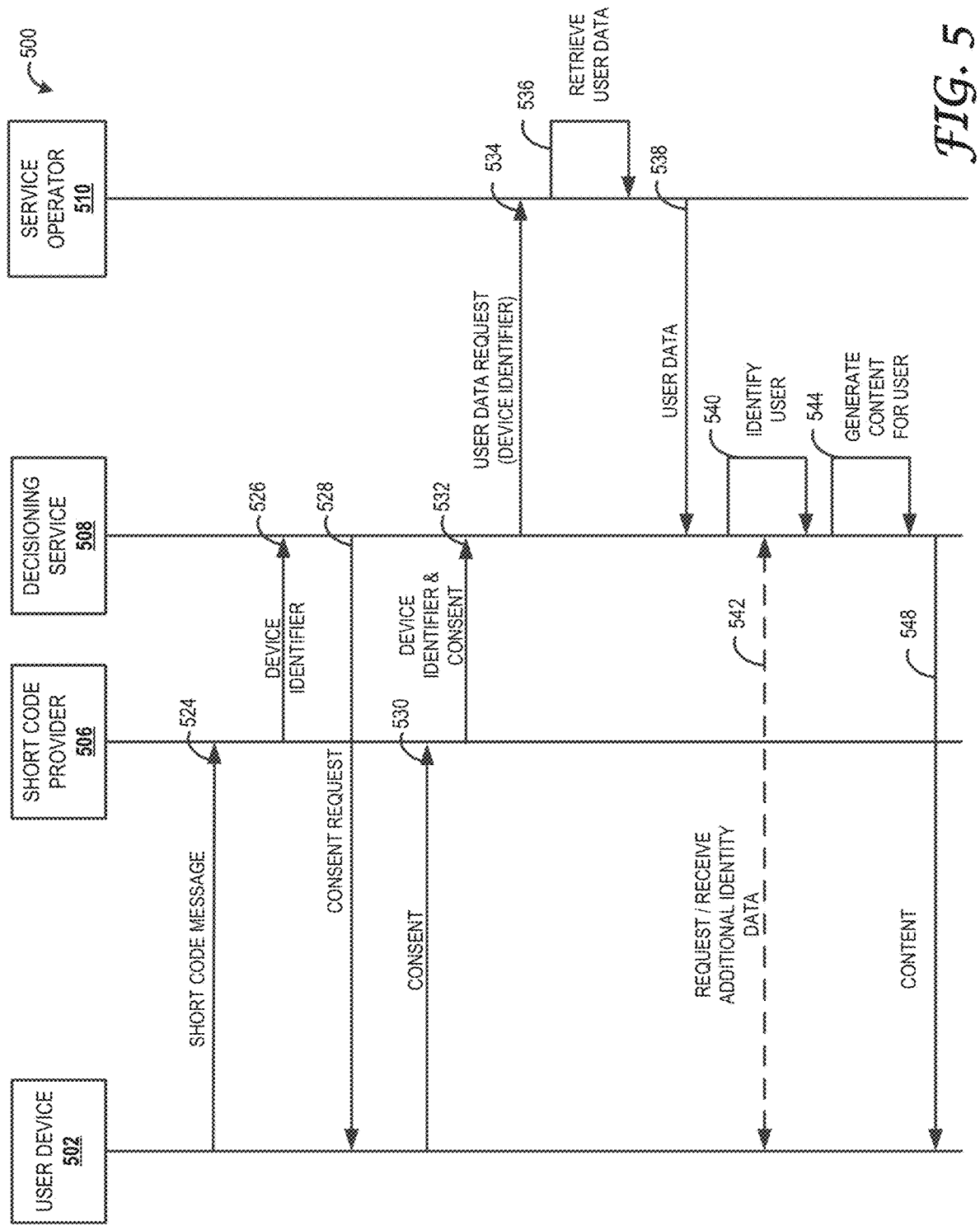

DISAMBIGUATION AND AUTHENTICATION OF DEVICE USERS

CROSS-REFERENCE TO RELATED APPLICATIONS

This application is a continuation of U.S. application Ser. No. 15/684,590, filed 23 Aug. 2017 and entitled "Disambiguation and Authentication of Device Users," which is hereby incorporated in its entirety herein. This application claims a priority benefit to U.S. Provisional Application No. 62/379,019, filed 24 Aug. 2016 and entitled "System and Method of Providing Mobile Location Based Content." This application also claims a priority benefit to U.S. Provisional Application No. 62/459,919, filed 16 Feb. 2017 and entitled "System and Method of Providing Mobile Location Based Content." Each of the foregoing applications and appendices thereto are hereby expressly incorporated by reference in their entirety. Furthermore, any and all priority claims identified in the Application Data Sheet, or any correction thereto, are hereby incorporated by reference under 37 C.F.R. § 1.57.

BACKGROUND

Field

The present application relates generally to identifying and providing content to specifically and dynamically identified mobile devices.

Background

Systems often require substantial inputs to accurately identify a user and content to provide to the user. In many cases, the users may access such systems using portable communication devices, which have limited resources. For example, the device may be a smartphone, which may have a small screen and limited input mechanisms as compared to, for example, a desktop computer. Such devices may also have power, bandwidth, processor time, or other limitations on the ability to process data. Each additional element to be processed by a mobile device may be accompanied by an incremental drain on such resources.

As more services are deployed and seek to interface with mobile devices, improvements in how users and content are identified are desirable.

SUMMARY

The methods and devices described herein may include one or more of several aspects, no single one of which is solely responsible for the desirable attributes of a particular embodiment. Without limiting the scope of this disclosure, some features will now be discussed briefly. After considering this discussion, and particularly after reading the section entitled "Detailed Description" one will understand how the features described provide advantages that include identifying and providing content to specifically and dynamically identified mobile devices, among other advantages.

Various embodiments of the present disclosure provide improvements to various technologies and technological fields. For example, existing authentication systems require significant personally identifiable information ("PII") from a user to uniquely verify the identity of the user. Among other things, the present disclosure describes improvements to, and useful applications of, various computer systems and software that does not require collection, transmission, and processing of as much personal information of the user as in current identification and/or content provisioning systems.

Additionally, various embodiments of the present disclosure are inextricably tied to computer technology. In particular, various systems and methods discussed herein provide monitoring of electronic databases, processing of large volumes of data items, generation and transmission of electronic notifications, and the like. Such features and others are intimately tied to, and enabled by, computer technology, and would not exist except for computer technology. Further, the implementation of the various embodiments of the present disclosure via computer technology enables many of the advantages described herein, including more efficient processing of various types of electronic data.

BRIEF DESCRIPTIONS OF THE DRAWINGS

FIG. 5 is a messaging diagram showing example communications for providing personalized content to a mobile device.

DETAILED DESCIPTION

Figure 1:
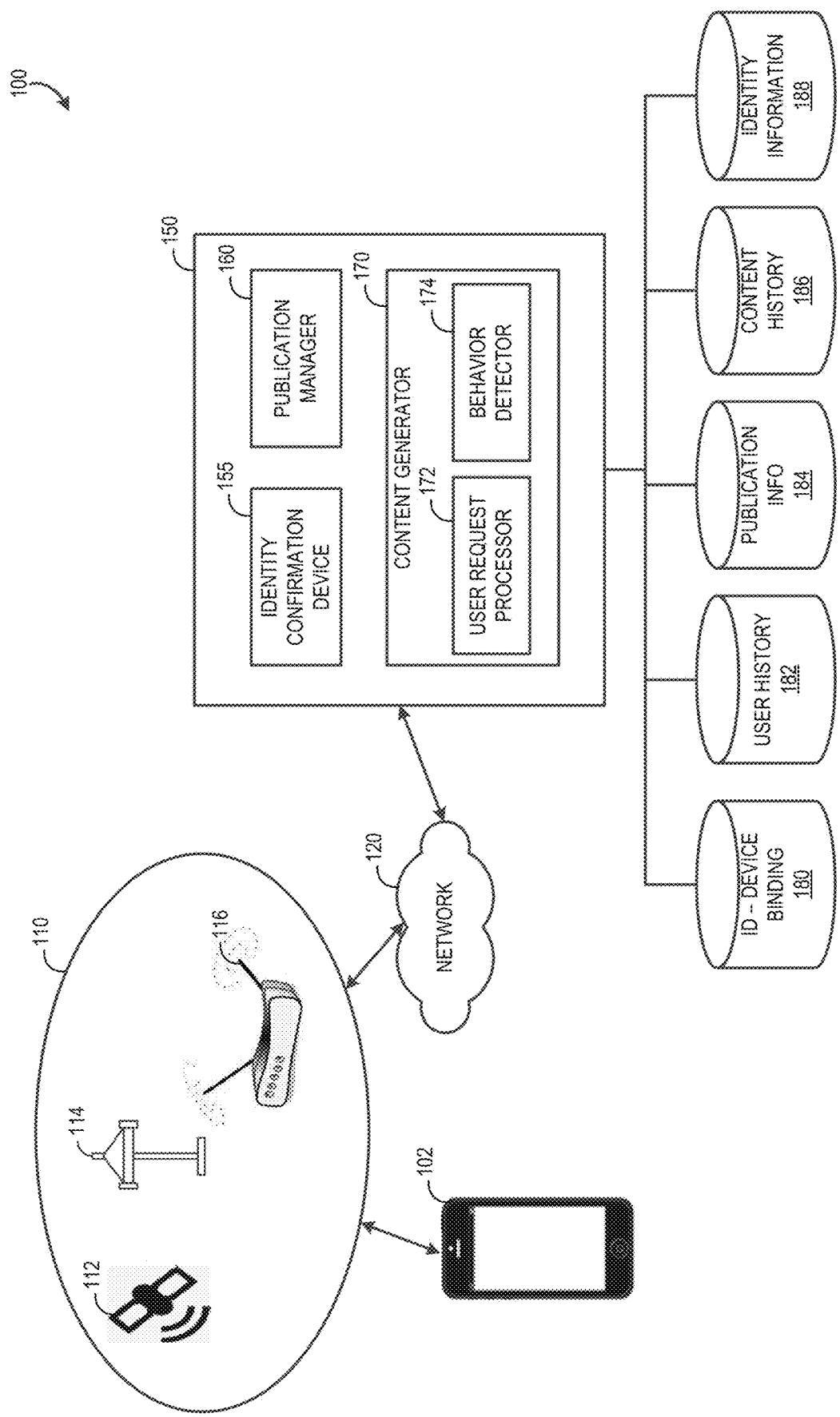
FIG. 1 is a block diagram showing an example environment for providing personalized content to a mobile device.

Features are described for using mobile device location history to identify an individual and provide content such as an offer of credit to the identified individual. In some embodiments, this includes predicting the identity of the user based at least in part on the location history for the user. Once a user is uniquely identified, the system and methods described may also collect personal information that may be used to determine whether an offer for credit should be provided to the user, such as from credit data of the user, and generate the offer of credit for transmission to the user, such as in real-time while the user is at a location where the credit may be used. Various embodiments may also pre-populate an online application for credit, initiate review of the credit application, and/or provide the user with information regarding the approved credit request. In certain embodiments discussed herein, additional features are included for confirming the predicted identity by asking a dynamically identified, limited set of questions that can solicit responses usable to uniquely identify the user.

Terms

To facilitate an understanding of the systems and methods discussed herein, certain terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

User: An entity, such as an individual or a group of individuals associated with some device, such as a computing device. For example, the various systems and methods discussed herein often refer to a user that is typically an individual consumer (e.g., a first consumer is John Doe) that operates a particular computing device (e.g., John Doe has an iPhone). In other embodiments, however, users may be groups of persons (e.g., a household of individuals, a married couple, etc.) associated with other computing devices or groups of computing devices (e.g., an entire household of mobile and stationary computing devices).

A content provisioning entity (also referred to herein as a "content provisioning system", or simply "the system") is generally an entity and/or associated computing systems that maintain and/or have access to regulated user data that is usable to identify users that qualify for a particular product or service. The content provisioning entity manages a computing systems and/or modules that receive publication criteria indicating user attributes that qualify users for an offer for a product or service from the offer provider.

Depending on the embodiment, the regulated user data may include credit data regulated by the Fair Credit Reporting Act (FCRA), which restricts sharing of the credit data from the content provisioning entity. Thus, in some embodiments the content provisioning entity is a credit bureau, a business unit of a credit bureau that maintains the credit data and enforces the FCRA access regulations, and/or another entity that is authorized to access the credit data. In other embodiments, the regulated user data may include other types of data, such as healthcare data regulated by the Health Insurance Portability and Accountability Act (HIPAA) or other data that is subject to external regulations (such as set by a government agency) that restrict access to user data that is useful in screening users for certain goods or services.

In the examples discussed herein, the content provisioning entity is configured to limit dissemination of any regulated and/or non-regulated user data, such as to reduce the risk that the regulated user data is used in a manner that may not meet the relevant regulations. For example, credit data (regulated user data) is subject to access restrictions of the FORA that restrict use of user credit data in a different manner than regulations and/or sharing restrictions that may be imposed on marketing data of a content provisioning entity. Thus, even if the content provisioning entity is authorized to use the regulated user data, the pre-validation system may limit regulated user data provided to the content provisioning entity to reduce risks associate with data loss (whether intentional or fraudulent) at the content provisioning entity (which may not have the same level of data protection as the content provisioning entity). Depending on the embodiment, pre-validation processes discussed herein may include one or more prescreen and/or pre-qualification processes.

An offer provider (also referred to as an "offer provider entity", "offer computing system", or "offer system") is generally an organization that offers goods or services to users (e.g., users), such as goods or services that introduce some risk of loss to the offer provider if the user fails to comply with terms of the agreement between the offer provider and the user. For example, the offer provider may be a credit card issuer that offers and issues credit cards to individuals. Prior to offering such financial services to users, the credit card issuer typically analyzes (or receives information from another entity regarding) financial information of the user to determine risk associated with offering a credit card to the user. For example, a risk score, such as a credit score, may be used as an indicator of risk that the user defaults on the credit card. In other embodiments, the offer provider may be an insurance provider, a mortgage broker, a product or service supplier/manufacturer/distributer, an intermediary for services and products, a marketing or public relations firm, or any other entity that offers products or services. In some embodiments, the offer provider identifies publication criteria that must be met for the offer provider to approve providing product or service offers to users. For example, a credit card issuer offer provider may determine publication criteria (associated with providing a firm offer of credit to consumers) indicating a minimum credit score (e.g., above 700) that is required for the credit card issuer to offer a particular credit card to a user.

A user device (also referred to herein as a "user device") generally includes any device of a user, such as an electronic device through which an offer from an offer provider may be displayed (e.g., via software and/or a site of a digital display entity). User devices may include, for example, desktop computer workstation, a smart phone such as an Apple iPhone or an Android phone, a computer laptop, a tablet such as an iPad, Kindle, or Android tablet, a video game console, other handheld computing devices, smart watch, another wearable device, etc. In many embodiments discussed herein, the user device is a mobile device, such as a smart phone; however, other user devices (e.g., laptops, kiosks, etc.,) may be used.

Regulated user data generally includes information regarding users that is stored by an entity (e.g., a content provisioning entity) and is subject to external regulations (such as set by a government agency) that restrict how the user information may be used (e.g., accessed, updated, shared, etc.) outside of the storing entity. Regulated user data generally is useful in validating users to receive offers for certain goods or services, but may include sensitive user data that should be protected to a greater degree than publicly available user information. Thus, in some embodiments, dissemination, sharing, and/or any other access to regulated user data may be controlled closely by the storing entity to reduce risks associated with improper use of the regulated data, such as any sharing of regulated user data that violates the relevant regulations. Accordingly, while regulated user data may be optimal for determining certain characteristics or propensities of users, such as determining risks associated with issuing a credit account to users, sharing of regulated user data with offer providers, digital display entities, and/or others that might be involved in related marketing or communications to the user may be limited to include only the minimum required regulated user data or no regulated user data.

In one embodiment, regulated user data is credit data that is regulated by the Fair Credit Reporting Act (FCRA), which restricts use of the credit data, such as by limiting how credit data of users may be shared with marketing entities. Thus, in some embodiments the content provisioning entity is a credit bureau, a business unit of a credit bureau that maintains the credit data and enforces the FCRA access regulations, and/or another entity that is authorized to access the credit data. Accordingly, in such an embodiment, the content provisioning entity may limit the use or sharing of user credit data to reduce risk of disclosure or other use of the credit data outside of FCRA regulations, whether intentionally, inadvertently, or fraudulently. Regulated user data may include various regulated user attributes, such as information regarding lines of credit, debt, bankruptcy indicators, judgments, suits, liens, wages, collection items, mortgage loans, other loans, retail accounts, checking/savings/transaction data, late or missed payment data, other credit attributes, and/or derivatives/scores/ratings based on at least the credit information.

Personally identifiable information (also referred to herein as "PII") includes any information regarding a user that alone may be used to uniquely identify a particular user to third parties. Depending on the embodiment, and on the combination of user data that might be provided to a third party, PII may include first and/or last name, middle name, address, email address, social security number, IP address, passport number, vehicle registration plate number, credit card numbers, date of birth, telephone number for home/work/mobile. User identifiers that are used to identify a user within a particular database, but that are not usable by third parties (e.g., other entities) to uniquely identify the user may not be considered PII. However, in some embodiments even user IDs that would be very difficult to associate with particular users might be considered PII, such as if the IDs are unique to corresponding users. For example, Facebook's digital IDs of users may be considered PII to Facebook and to third parties.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, mySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

User Input (also referred to herein simply as "input"): Any type of input provided by a user that is intended to be received and/or stored by the system, to cause an update to data that is displayed and/or stored by the system, to cause an update to the way that data is displayed and/or stored by the system, and/or the like. Non-limiting examples of such user inputs include keyboard inputs, mouse inputs, digital pen inputs, voice inputs, finger touch inputs (e.g., via touch sensitive display), gesture inputs (e.g., hand movements, finger movements, arm movements, movements of any other appendage, and/or body movements), and/or the like. Additionally, user inputs to the system may include inputs via tools and/or other objects manipulated by the user. For example, the user may move an object, such as a tool, stylus, or wand, to provide inputs. Further, user inputs may include motion, position, rotation, angle, alignment, orientation, configuration (e.g., fist, hand flat, one finger extended, etc.), and/or the like. For example, user inputs may comprise a position, orientation, and/or motion of a hand and/or a 3D mouse.

Application Programming Interface (API): A set of routines, protocols, and/or tools for building a software application. Generally, an API defines a standardized set of operations, inputs, outputs, and underlying types, such that functionality is accessible via the API in an efficient way. A system provides an API by which a third party may access functionality of the system. Accordingly, the system advantageously abstracts away (from the third party's perspective), much of the complexity that may be involved in the functionality of the system, and enables the third party to quickly and efficiently leverage functionality of the system to build other systems and services.

Location Based Content Offerings

Ensuring the proper content is presented to the right person at the right time can often mean the difference between getting a message to the person and being ignored in the avalanche of data received by the person. Examples of technologies for identifying the location of an electronic device include global positioning service (GPS), beacon, or access point location (e.g., WiFi presence detection; cellular tower connectivity; etc.). Geofencing allows provisioning of content based on proximity to a location. As a device enters a geofenced area, an information exchange may be performed whereby the device provides location information to the geofencing system and the geofencing system may provide information to the device if the location is associated with a geofenced area. The area may be defined by one or more identified geospatial points. The points may be identified using positioning technologies such as global positioning service (GPS), beacon, or access point location (e.g., WiFi presence detection; cellular tower connectivity; etc.).

GIMBAL™ is a commercially available beacon system that may be user in certain embodiments discussed herein to provide location based content offerings. In other embodiments, other proximity sensors may be used to provide information regarding location of a user (or, more particularly, a user's mobile device) in relation to a designated area associated with a publication rule. For example, Bluetooth communication may detect a near range proximity of a user device and, accordingly, trigger processing of publication rules for a user of the device. In another example, geolocation information, such as from global positioning system (GPS) sensors of a mobile device, triangulation of data associated with cellular towers accessible by a user device, and/or location information determined based on proximity of the user device to one or more Wi-Fi nodes, may be used to determine location of a user, which may then be compared to a mapping of geofenced areas.

Currently, there are several methods of processing user information in order to determine risk of lending to the user. For example, a pre-screening process may occur in real-time without the user necessarily knowing that their credit is being accessed (without authorizing access to the user's credit data from one or more credit bureaus), while a pre-qualification process may be performed in response to a user request for information regarding qualification for one or more credit products (and authorizing access to the user's credit data from one or more credit bureaus). Such pre-screening and pre-qualification processes are generally referred to herein as pre-validation processes or prescreening processes. For instance, an entity may request pre-validation of a specific user for one or more credit products. A credit file for the specific user may be pulled, the credit data assessed based on publication criteria (or factors) and the requesting entity notified if the specific user met the publication criteria. Such pre-validation processes work well for providing offers (e.g., credit card offers) to known individuals. However, in the world of mobile devices and rapid movement of mobile device users, opportunities to provide offers to users via their mobile devices, such as at the time/location where the user really wants to receive a credit offer (e.g., for purchase of an automobile) are limited largely because of the technical difficulties in uniquely identifying (e.g., to the user level) particular users with enough certainty to provide pre-validated offers while the user is still at the desired location.

For example, if a user enters a geofenced area associated with a brick-and-mortar store, a wireless beacon may transmit a message identifying the beacon to the user's mobile device (or the beacon may be continuously transmitting a broadcast signal requesting responses from devices within the geofenced area). The message may be a probe message alerting the mobile device to the presence of the beacon or an identifier for the beacon that can be used to look up a location and/or content associated therewith. The mobile device may respond to the beacon or another system with a message including the beacon identifier, an identifier of the mobile device, the user, and/or an application executing on the mobile device such as a standalone application or a context based application such as a web-browser or network content viewing application or a native application in the operating system of the device such as a payment application or wallet application. The content provisioning system may in turn identify content to provide to the mobile device. The particular content may be identified (from a collection of a plurality—thousands or millions—of available content items) and customized for the user based on attributes associated with the user that are determined based on the initial communication with a geofencing system or the content provisioning system. The user attributes may include attributes such as information from a mobile carrier (e.g., Verizon, Sprint, AT&T, etc.) regarding the user, information known to the offer provider (e.g., a financial institution that wants to provide credit offers to qualifying users) about the user, and/or information guarding the user that is accessed from one or more third party systems (e.g., credit data of the user that is received from a credit bureau). The content may include content which only prequalified users may receive. For example, a credit providing entity may transmit a credit offer specific to the user. In one embodiment, credit offers may be stored in a data storage medium accessible by the content provisioning system until the user is detected within a geofence. Once the user is detected by the geofencing system, the offer may be quickly transmitted to the user's mobile device so that the user may, in some embodiments, immediately complete the credit application process and receive credit approval that may be used to complete a purchase at the location of the geofence (e.g., within a retail establishment).

As another example, a credit providing entity may transmit publication criteria indicating requirements for various types of credit that may be available to pre-validated users (e.g., users that meet the publication criteria). The publication criteria may be stored in a data storage medium accessible by the content provisioning system for application to user attributes of a user when the user is detected within an indicated geofence area (such as may also be included in the publication criteria provided by the offer entity). Once the user is detected by the geofencing system, the publication criteria may be re-applied to the user data (e.g., based on a fresh pull of credit data of the user) to determine whether an offer should be transmitted to the user's mobile device.

As another example, the geofencing system or the content provisioning system may provide a message to the mobile device to invite a specific interaction. For example, the geofencing system may provide a message to cause the mobile device to execute an application on the mobile device. The application may provide a more secure and controlled environment to communicate with the user of the mobile device. The publication criteria may also include timing requirements for provision of offers to users. For example, a user that enters one or more particular geofenced areas (e.g., similar retail establishments) for a third time within one week may be provided a content offer (if the user also needs any other publication criteria), whereas the user may not be provided the content offer the first and second times the user entered the particular geofenced areas. As another example, the geofencing system may detect a mobile device circling a specific car in an auto dealership, which triggers transmission of a message to the user's mobile device to initiate interactions with the user that may result in an offer of credit to the user for purchase of an automobile. For example, the geofencing system or the content provisioning system may provide a message such as "You'd look great in that car. Text 12345 for a top tier credit offer," to the user device.

The content provisioning system may store content in conjunction with publication criteria. The publication criteria may include time periods when the content may be presented, specific users or groups of users to whom the content can be presented, preconditions for presenting the content (e.g., contact with a different beacon within the geofencing system; specific application on the mobile device; specific mobile device type; etc.), or other conditional logic to afford control over when, where, and to who the content is provided.

Intelligent User Identification

To identify the proper content to present to a user, the particular user should be identified. For example, a content provider may provide publication criteria indicating that users with a credit score of above 750, income level above $80,000, and are currently within a geofence of a particular car dealership and have visited that particular car dealership previously within the last 72 hours, are to be offered an automobile line of credit with certain terms. In one aspect, a predictive system can be included to accept location information for the target and predict the identity of the target. For example, a mobile device of a target may provide geo-location information identifying an address of an office, an address of a school, and an address of a grocery store. A historical record of location information may determine that these three locations are regularly visited by a target and, perhaps, in a specific sequence. The predictive system may identify the locations for the mobile device that correspond to the historical record and thus infer the identity of the target. For example, a reference data store may be included that stores locations for a device and durations of time at respective locations. A pattern of locations may be identified such as extended durations during evening hours at a first location (e.g., home) and extended durations during daytime hours at a second location on weekdays (e.g., work). These two locations may help identify a user of the device who works at the second location and resides at the first location.

As discussed elsewhere herein, the content provisioning system advantageously optimizes communications with user devices that are needed to reach a required authentication confidence level for a user of the user device (e.g., to be able to determine that the user of the device really is who they say they are). For example, the types and/or quantity of PII requested of a user may be reduced by the content provisioning system, when compared to conventional similar authentication requirements for offers of credit. Such optimizations may reduce the communication bandwidth and/or reduce the quantity of communications with the user device, while making the user experience less intrusive, such as by asking for less PII from the user than would normally be required to authenticate the user for a credit application, and also reducing risk of PII exposure to undesirable entities (e.g., hackers that monitor and intercept communications with mobile devices).

In some implementations, an optimized user identification and authentication process may be performed in substantially real-time by the content provisioning system in response to communication with a mobile user device. For example, a user may initially see a billboard encouraging the user to initiate communication with the content provisioning system, such as one that reads "text CARLOAN to 12345 to find out if you qualify for 0% financing of your dream car." In another embodiment, the user may initially be contacted based on the content provisioning system detecting a mobile device entering a geo-fenced area. In other embodiments, communication between a user and the content provisioning system may be initiated in other ways such as through addressable media. For example, a communication device may be configured to present streaming media content. During streaming of the media content, it may be desirable to present personalized content to the specific communication device and/or user of the communication device. However, the content provisioning system may need to perform some authentication or identification of the user, such as by requesting PII from the user and/or requesting additional information associated with the user or user device from one or more internal or external databases, before the user can be considered for content offers (e.g., credit offers) or before content can be selected for the user.

In one embodiment, authentication of a user is performed by first determining an initial, narrow, set of potential users associated with the detected user device. In such instances, the system may be configured to identify a minimal set of questions to present via the mobile device of a target to accurately confirm the user's identity. For example, if the location information (e.g., postal code) narrows the potential users to person A and person B, the system may then look for specific differences in attributes of person A and person B, such as may be stored in records for person A and person B (e.g., credit records of the two users). For example, if person A and Person B reside in different states, the system may determine that obtaining the state of residence from the user is sufficient to uniquely identify the user.

The level of authentication, and the corresponding types of user attributes that may be used to authenticate a user, may be based on the content being provided. For example, if the content is informational, security may not be as high of a priority and gender may be used to distinguish person A from person B. As another example, if the content is a credit offer having a predetermined maximum line of credit, more secure identification may be needed to ensure that any credit offers provided are to the intended user. In such situations, a more secure and personally attributable user attribute, e.g., the holder of the user's mortgage, may be identified as a distinguishing attribute to request from the user.

The intelligent identification of user attribute(s) to request for authentication of a user can be particularly useful in limited resource environments. For example, without the features described, a user may be asked to provide responses to many questions to positively identify the user (before application of credit prequalification rules based on the user's credit data). Each question requires the user device to expend valuable resources such as power, processing, memory, bandwidth, and the like, to receive, present, and respond to the question. Additionally, the requesting and collection of increased amounts of information may introduce user friction and increase the potential for an error in the requesting or collecting process. In contrast, the systems and methods described herein determine an optimized (e.g., minimal) set of questions that may be used to positively distinguish the actual user of a user device from other possible users of the user device. As discussed, the minimal set may be generated based on the content to be provided and/or a desired level of security.

Thus, one challenge in the mobile environment is to accurately identify an individual user without requiring significant data entry by the user. To accomplish this, an interactive technology that takes first/last name as its primary input may be provided. Analysis of the half billion identities, such as stored in a credit header file, indicates that virtually all identities in the US can be accurately determined by triangulating ZIP code, date of birth, and last four digits of a Social Security number (SSN). Moreover, the vast majority of individuals can be identified based on 1 or 2 of those elements.

The real-time, interactive process may begin by parsing the name to identify user records matching or fuzzy matching the name and establishing a minimum question set required to uniquely identify a user if more than one candidate is identified. The minimum question set may then be presented to the user, such as via a specifically designed and secure application or interactive messaging such as text messaging or interactive voice recognition, to collect user responses. Predicated on the responses, the identity may be verified and specific user information about the identified user may be retrieved using the identity. For example, the user information may be included as criteria to request additional information about the user, such from a $3^{rd}$ party aggregator that queries the mobile network user data store in real time (e.g., at the time of determining the identity).

In an example embodiment, a user initiated text message from a user's mobile device allows the system to obtain user attributes such as name, address, and/or ZIP code, from a service provider associated with the user device. For example, these user attributes may be automatically retrieved from a service provider, such as a mobile carrier, Internet service provider, social media provider, etc., based on the mobile device number from which the text message was received (e.g., caller ID information) and/or other device identifying information associated with the transmitted text message. Using these limited, but authoritative user attributes, the system may search a database which indexes the credit header file (CHF) of credit files for any users who match by name and zip code (or other combinations of user attributes in other embodiments). For example, if a user texts a specific term to a specified number associated with a content provisioning system, the system can receive the input information shown in Table 1 from the mobile carrier (such as via a data sharing arrangement that the content provisioning entity has with the mobile carrier).

TABLE 1

| Data Field | Value |
|---|---|
| First Name | James |
| Last Name | McCoy |
| Billing ZIP Code | 92110 |

In some implementations, the user may initiate the application of publication criteria, including an initial user authentication process, by transmitting a multimedia message (MMS) that includes media such as audio, an image, or video. In the case of audio input, the system may include audio processing (e.g., speech recognition) to convert the audio into text for further processing. In the case of image input, the system may include image processing such as object recognition to recognize an item shown in the image or facial recognition to identify the person shown in the image. When image data includes an item, the item information may be used to drive offers, terms, rewards, or other content relevant to not only the individual who transmitted the image, but to the image itself. For example, if the image includes a car, the system may identify the specific car shown, a license plate shown, or other vehicle identification information (e.g., vehicle identification number (VIN)) and tailor the offer terms based on the specific car and, in some instances, provide additional information about the car such as mileage, condition, location, model year, trim level, accessories, etc. In some implementations, the terms may be based on an existing financing option for the item shown (e.g., an existing mortgage on a home shown in an image, an existing lease or auto loan for a car shown in an image). In the case of video input, the audio and/or images included in the video input may be processed to obtain additional information about the user and/or item or service of interest. The image may include an identifier for the item such as a vehicle identification number, Universal Product Code, text, etc. that can be used as a key to identify additional details about the item.

Media files may include metadata such as time recorded, author, person who recorded the media, location where the media was recorded, and the like. Such metadata may be extracted from an input media element and used to further distinguish the identity of the user and/or the offer, content, reward, etc. they are interested in. Such metadata may be used to determine a device fingerprint, which may then be matched against a database of device fingerprints associated with fraud to predict fraudulent intentions of the user and take appropriate action.

While the implementations discussed thus far rely on SMS or MMS or other messaging, in some implementations, the user may initiate the process by scanning an identifier. For example, if the user is browsing a car dealership, a QR code or other scannable identifier (e.g., barcode, radio frequency identification tag, near field communication tag, beacon, etc.) may be scanned or otherwise detected using the user's mobile device Upon detection, the mobile device may initiate a software application which thereby transmits information to the content provisioning system for application of publication criteria of one or more offer providers, such as a credit pre-qualification process that initially requires user authentication. For example, when a QR code is scanned by a mobile device, the QR code may include information to initiate the SMS feature of the mobile device. The decoded QR code information may include a "TO" number and a message to send. In some embodiments, the message is automatically sent by the user device to the content provisioning system, while in other embodiments the message may be automatically generated and the user only needs to send the pre-populated message (e.g., my pushing a "send" button on the user device). In implementations including beacons, a beacon signal may enable an automated (e.g., push) type notification to the mobile device. In the case of a beacon, the system may previously know some information about the user of the mobile device by virtue of the presence information (e.g., current location, previous location, duration at a given location, etc.) presented during the interaction between the beacon and the mobile device. In some implementations, the QR code may launch a web browser and direct it to a specific web address. In some implementations, the QR code may activate an application installed on the mobile device. The features described may be applied using SMS, web browser, installed application, operating system function/application, or other initiation mechanisms that allow the mobile device to transmit at least an identifier for a service accessed by the mobile device of a user thereof.

Returning to the example shown in TABLE 1, using these three data fields, the system may query the database of indexed CHFs or other identity information data store to identify a candidate list of individual users matching the already known data attributes, as well as additional attributes about each candidate user. This query may be a "fuzzy" matching, which searches for alternatives of the user information, such as expanded to include fuzzy matches such as misspellings, phonetic variations, typographic variation (e.g., "rom" being a typographic variant for "tom" due to proximity of the letter "r" to "t" on a standard keyboard), stemming, nicknames, or the like. The level of fuzziness of this initial inquiry may be adjusted depending on the implementation. Table 2 shows an example of a response from such a query of the database based on the inputs from Table 1.

TABLE 2

| Record # | First Name | Last Name | ZIP Code | Date of Birth | Last 4 SSN |
|---|---|---|---|---|---|
| 1 | Jay | McCoy | 92110 | Jan. 1, 1980 | 1111 |
| 2 | Jimmy | McCoy | 92110 | Feb. 1, 1968 | 2222 |
| 3 | James | McKoy | 92110 | Oct. 1, 1972 | 2222 |
| 4 | Jaime | McCoyintosh | 92110 | Nov. 1, 1951 | 8888 |

In some implementations, the system may sacrifice specificity in the original query, such as by returning records based on a fuzzy, stem search that matches only a few leading characters from each field (e.g., First Name begins with "J", Last Name begins with "McC", ZIP Code begins with 921). Because the quick search does not require detailed analysis of the entire value for a given data field, the results may be obtained faster than if a full analysis were performed, and in those implementations, disambiguation applied to the returned candidate records (such as using the techniques described below) may be used to determine a confidence level in the user's identity.

In some implementations, the result set returned by the initial query (e.g., the records in Table 2) may be processed by the content provisioning system to determine whether there is a perfect match within the result set. For example, if the result set included another Record # 5 for James McCoy in ZIP code 92110, the system may determine that record five is an exact match to the provided user information and further disambiguation (such as using the techniques described below) are not performed. Rather, with a single perfect match identified, the system may confirm identity of the user and provide the appropriate offer content to the user. In situations where a perfect match is not included in the candidate list or to or more perfect matches are included in the candidate list, further disambiguation may be performed.

The system may then evaluate the candidate list and eliminate candidate users having a probabilistic fuzzy match below a certain threshold. For example, "Jaime McCountinosh" may be eliminated because of the degree of difference between the user attributes received from the mobile carrier and attributes of that particular candidate from the credit header database (and/or other databases in other embodiments). For the remaining candidate users in the candidate list, the system may rank order the candidates based on the similarity to the user attributes from the carrier. In the example provided, there are 2 possible high quality matches in view of the significant match of CHF attributes of the three users with the user attributes from the mobile carrier (e.g., "Jay McCoy" and "Jimmy McCoy"). With this overlap in remaining candidate users, attributes shared by the candidate users may be used to interact with the user in a personalized way. For example, the system may present a greeting to the user such as "Hello, Mr. McCoy" but let the user know that they might need to do some additional validation.

In the above example, record numbers 1 and 2 would be kept because they are seen as high confidence matches with the first and last name provided by the service provider. In implementations where address information (e.g., ZIP code, street address, etc.) is received from an authoritative source (e.g., the mobile service provider), the system may compare the address of any candidate users with and the incoming address information from the service provider. In some embodiments, the address information from the service provider may be compared to one or more historical addresses of the candidate users from the CHF (and/or other data sources) of the candidate users. Similarly, other attributes provided by the mobile carrier may not only be compared to current attributes of the candidate user from other data sources (e.g. CHF), but also to historical attributes of the candidate user's. The system may be configured to automatically select a single authenticated user if the carrier provided user attributes match only a single user's CHF data, thereby ending the search.

When more than one possible candidate remains without a perfect match, the system may apply additional profiling to determine which disambiguation questions can be asked to arrive at a single candidate. Assuming the above example has three unique candidates, the system may determine if asking for the date of birth, month of birth, year of birth, or last four SSN or some combination thereof will uniquely identify only one of the three candidates. In the very rare case where the system cannot distinguish between two or more candidates, even with additional PII provided by the user, the process may provide an indication that the identity cannot be confirmed without further authentication procedures. In some embodiments, the further authentication procedures may be initiated at that time by the content provisioning system, such as by directing the user's mobile device to an out of wallet authentication site, such as may be provided by a credit bureau, to ask the user for information regarding particular credit data items (e.g., balances of particular loans/mortgages, previous residence addresses, etc.). In some embodiments, further processing of publication criteria for offers requiring a higher level of user authentication, e.g., credit offers or insurance quotes, may be terminated when the identity of the user cannot be confirmed. This safeguards the system from making an offer to the wrong person.

The various processes, hardware configurations, and variations of such, for identifying (or verifying an identity of) a specific user may be referred to herein as SmartPIN or Smart Lookup.

In some embodiments, device—level fraud analysis may be integrated into the various user identification processes. For example, in some embodiments, script code (e.g., JavaScript) may be included on a landing page to which the user is directed after initiating an identity validation process (e.g., in response to the user completing a call to action, such as sending a specific text message to a particular telephone number to receive a prequalified offer). The script code may be configured to determine characteristics of the mobile device and/or user based on metadata associated with the URL request, and in some implementations by requesting further identification information from the mobile device without notifications to the user. For example, the script code may determine a "device fingerprint" that can be compared to one or more lists of device fingerprints associated with high risks of fraud. Thus, a likelihood of potential fraud by the particular user device may be determined and used to determine how to further interact with the user (e.g., to close the connection with the user device based on a high likelihood of fraud or continue the communication with the user device).

Comparison/Scoring Process

The ability to uniquely identify a user (from a set of multiple possible users sharing a set of user attributes) based on minimal additional information requests from the user optimizes the user identification process. The determination as to whether a given candidate is a "match" presents a non-trivial problem for computer implemented systems. To generate a value that can be compared to the threshold for matching, a scoring process may be implemented.

In one example scoring algorithm, a minimum cutoff to qualify for consideration (e.g., to remain on a candidate user list) may be a 0.4 Jaccard index score (scaled from 0 to 1.0). Equation (1) below shows one expression of a Jaccard index for the similarity between two data sets A and B.

$$J(A, B) = \frac{|A \cap B|}{|A \cup B|} = \frac{|A \cap B|}{|A| + |B| - |A \cap B|} \quad \text{Equation (1)}$$

where $0 \leq J(A, B) \leq 1$.

The system may use a bi-character Jaccard index for the fuzzy matching algorithm. This minimum cutoff is selected to be loose enough to allow for possible name variations. The system may implement further constraints to ensure validity. A nickname table may be included to enhance the candidate list and prevent the system from missing common name variations. The candidate list may be processed for relevant matches to the original input (e.g., from the service provider) as well as nicknames.

Whether the input information to the process is received from a service provider by the user, the system may look for candidate records that have at least a Jaccard score of 0.4 or higher. If more than one candidate has a Jaccard score greater than or equal to 0.7, the system may initiate a disambiguation process. The disambiguation process may be skipped if a perfect match for the name is identified based on the Jaccard score and the candidate record has a perfect match to the provided address information.

If the system has more than one candidate remaining and/or lacks the address information confirmation, the disambiguation process begins. In one implementation, the disambiguation may first parse the list of date of births from the remaining candidates and determine if each candidate in the list has a unique birthdate. If every remaining candidate has a unique date of birth (DOB), the system can ask the user for date of birth and, based on this information, one match can be identified. For the candidates shown in Table 2, DOB will provide a unique identification for any one of the candidates. If the DOB received by the system is not one of the candidate DOBs, the system may provide an indication that the identity cannot be confirmed and further processing terminated. The system also may also determine that other candidate information (e.g., Last 4 SSN) is not unique. In such instances, the system would not prompt the user to provide this information.

The system may include two or more paths to the identification. For example, the identification inputs may be provided automatically via the service provider or directly from the user. The system may include features to prevent displaying any information that the user did not provide. For example, the system may require a candidate have at least 0.9 or higher Jaccard score before displaying a candidate's information simply because it matches to the input name provided by the service provider. Table 3 shows some examples of the Jaccard score for various candidate comparisons.

TABLE 3

| Candidate 1 | Candidate 2 | Jaccard score |
|---|---|---|
| "James Mcoy" | "James McCoy" | 0.7273 |
| "John Smith" | "Jonh Smith" | 0.5 |
| "John Smith" | "Johhn Smith" | 0.9 |
| "Bob Grey" | "Bob Gery" | 0.4 |

Thus, even for a comparison having a 0.4 Jaccard score, the names may be visibly very similar. Thus, the disambiguation process may increase the clarity on distinguishing between facially related candidate by collecting information using follow-up questions that identify one and only one candidate. The system may be configured to prevent further activity until the user provides all the correct information that is required to positively identify the user.

Additional Analysis

Based on automated and manual analysis of research data, user authentication based on only credit header file data may be able to get 96% unique identifications from the full name and zip code (such as may be provided by the mobile carrier through which the user sends an initial text message to initiate a prequalification process). Further, if the system also considers the date of birth and/or last four SSN, a unique identification can be identified more than 99.8% of the time. For the remaining 0.2% of the time or if the user is a no-hit (e.g., not found in the data stores accessible by the system), the system may simply default by not making any offer and terminating any further processing (e.g., decline to provide an offer, content, or other good/service).

While the discussion has highlighted the features for identifying and providing authenticated user information based on a limited set of inputs in the context of credit offers, the identification process may be applicable in other fields. For example, when selling a home or other object, it is typical for the seller to place a sign advertising the availability of the item. This sign may include an active (e.g., user prompt; QR code; barcode) or passive (e.g., beacon, RFID, NFC) indicator. This indicator may cause a mobile device associated with a user interested in the item to send a text message or other initiation message to start the identification process. For example, a location indicator may detect presence of a user near a house that is for sale and initiate communications with the user regarding the house. In this example, the user may not provide any proactive request for the information, but rather the information is provided based on the user's proximity to the house for sale. In some embodiments, other criteria may be assessed before initiating communication with the user, such as the user's predicted interest in purchasing a house. In another example, the location indicator may detect presence of the user near the house that is for sale and directly communicate to the user device (e.g. via Bluetooth communication) information on how the user can initiate a prequalification process and/or receive further information on the house (and/or related houses for sale or other similar real estate information), such as by providing a short code that can be selected by the user to send a text message to the content provisioning system 150. Thus, message content provided to the user may be associated with the specific item (e.g., the particular house for sale) such that the location and specific terms for the process (e.g., mortgage lending, credit lending, insurance rating, etc.) may be identified not just for the user but also for the specific item of interest.

Example Implementations and Architectural Features

FIG. 1 is a block diagram showing an example environment for providing personalized content to a mobile device. As discussed, the resources available to a mobile device 102 may be limited. The limitations may be physical, such as display size or input means for providing information. These limitations can present a barrier to viewing or otherwise interacting with content presented via the mobile device 102. The limitation may be a computing resource such as power, processing speed, network bandwidth, network connectivity, or the like. It may be desirable to conserve these resources to ensure longer operational time for the mobile device 102. Each message transmitted or received requires resources to process. Accordingly, the ability to accurately identify a user of the mobile device 102 in a way that limits the number of resources can improve the overall speed at which the user can be identified but also improve the resource utilization for the mobile device 102 during the identification or content provisioning process.

In the embodiment of FIG. 1, the mobile device 102 is shown as a smart phone. The mobile device 102 may be implemented as a tablet computer, a wearable device (e.g., smartwatch, smart glasses), or other communications device configured to transmit and receive messages. The mobile device 102 may include one or more transceivers (not shown) to transmit and receive such messages. The messages may be transmitted to or receive from one or more communication systems 110 such as a satellite 112, an access point 114 (e.g., cellular access point), or a wide area network router 116 (e.g., WI-FI®). Other examples of communication systems 110 include BLUETOOTH® systems, ZIGBEE™ systems, Z-WAVE® systems, GIMBAL™ systems, near field communication systems, or other wired or wireless systems. The communications may provide data communication path to a network 120 such as the Internet, cellular networks, or combinations of networks. The communications may provide services such as location services. For example, a beacon may transmit location information that can be received by the mobile device 102 and used to identify a location of the mobile device 102. The geofencing information may include an identifier of the beacon which can then be used to look up a location associated with the beacon. In some implementations, the location services may include a global positioning service (GPS). The GPS signals provide a way for the mobile device 102 to identify its current location. Location may also or alternatively be determined based on the access point 114 location or address information (e.g., IP address) of the wide area network router 116.

A personalized content provisioning system 150 may be included in the environment 100. The personalized content provisioning system 150 may include an identity confirmation device 155, a publication manager 160, and a content generator 170. The identity confirmation device 155 may be included to authenticate the identity of a user, such as using the various systems and methods discussed herein. In some implementations, authentication of a user may be referred to as Smart Lookup. The identity may be based on information provided by the mobile device 102 or an application executing thereon. For example, the mobile device 102 may include a device identifier in messages transmitted to the personalized content provisioning system 150. Examples of a device identifier include an IP address, a telephone number, a tax identifier, a media access control (MAC) address, and a mobile equipment identifier (MEID). The information may be configuration information for the mobile device 102 such as home address, username, account number, or the like. In some implementations, a software application such as an offer identification application, may be installed on the mobile device 102 and used to interact with the content provisioning system to identify any offers for the user. The offer identification application, such as an application provided by a credit bureau or other entity that has access to regulated data of users, may receive user input values through a user interface such as name, mailing address, email address, birthdate, etc. One or more of the user input values may be included in the information transmitted to the personalized content provisioning system 150.

In some implementations, the information provided to the identity confirmation device 155 may not be sufficient to uniquely identify a user of the mobile device 102. In such instances, the identity confirmation device 155 may be further configured to cause presentation of a user interface to collect one or more additional elements of information to identify the user as described herein.

The publication manager 160 may be configured to receive content and publication criteria that must be met for the content to be provided to a user. The content may include offer content or instructional content. The content may be associated with location criteria such that the content can be published to users at or associated with a specified location. In some implementations, the content may be associated with user behavior. The behavior may include historical locations, time between visits to one or more locations, mobile device behavior (e.g., logging into an application, executing a feature of an application), interactions with the personalized content provisioning system 150, messages (e.g., text messages) received (e.g., specific message content or specific message destination), or the like. The content and criteria may be stored in a publication information data store 184.

The content generator 170 may be assessing the publication criteria received by the publication manager to determine, for specific behavior or requests, whether and when to respond to the mobile device 102. A user request processor 172 may be included to process user initiated requests for content. For example, a user may activate a control element on an application executing via his mobile device. The control element may transmit a request to view current content offerings.

In some implementations, the content generator 170 may include identified information for a user to prefill content such as a form or other interactive interface. An identity data types may be mapped to specific fields and, if available for an identified user, included in the content. The prefilled content may be provided for display or printing such as via a kiosk. In some implementations, the prefill may be performed without presentation to the user. For example, consider an implementation where the user transmits a text message including "more info" to a predetermined destination. The user may be identified using information from the mobile carrier and, based on the identification information, additional user information such as address, gender, or the like may be received. This additional user information may be used to transmit a request to produce a physical mail item including the additional information. In this example, the user did not need to provide address or other information to complete the request. The additional user information may be provided via a machine interface such as an application programming interface configured to receive a device identifier or a limited set of user values (e.g., name and postal code) and return a set of additional user information if a user can be identified. The set of information may be accompanied by a confidence score indicating the likelihood that a given set of information is associated with input the user information. In some embodiments, third parties (e.g., entities that require consumers to provide PII to determine eligibility or enroll in a service) may leverage the prefill technology using an API that facilities direct communication with the content generator 170, such as to verify identity of a user based on a minimal set of user information (as discussed thoroughly herein) and then provide back more extensive user PII once the user's identity is verified (such as from the identity information database 188 and/or other internal or external databases of user information).

In some implementations, the content may include an authorization token such as an optical scancode (e.g., barcode, QR code). For example, if the user is identified and authorized for a specific line of credit, the mobile device may display an interface including the optical scancode to complete a transaction at a point of sale against the line of credit.

A behavior detector 174 may be included to generate and transmit content based on user behavior. In some implementations, this may be referred to as a content "push." The behavior detector 174 may receive behavior information associated with the mobile device 102. The information may be received from the mobile device 102 (e.g., included in a message transmitted from the mobile device 102 to the personalized content provisioning system 150. The information may be received from a service provider such as an application service provider or communication service provider (e.g., satellite, cellular, internet service provider). The behavior information may be stored in a user history data store 182.

The behavior detector 174 may monitor the user history data store 182 for user records that include behaviors associated with content. Once a behavior condition is met, the behavior detector 174 may initiate generation of content for the mobile device 102 associated with the behavior.

Whether in response to a user request or a detected behavior, generating content may include identifying the user of the mobile device 102. The identification may be performed using the identity confirmation device 155. Generating the content may include customizing the content to include specific values for the user in the content. For example, it may be desirable to insert the user's first and last name to personalize the message. The personal information may be retrieved from an identity information data store 188. The identity information data store 188 may be queried using at least a portion of the user information associated with a request for personalized content. One example of an identity information data store is a credit header database (and/or other databases in other embodiments). In some implementations, content may include variable features such as a prequalified line of credit. This value may be generated for the specific user based on their personal information.

For tracking purposes, it may be desirable, as part of generating the content, to maintain a record of the content provided. A content history data store 186 may be included to store an identifier for a personalized content item provided to the mobile device 102 and/or the authenticated user to which the content item was targeted. The content history data store 186 may include an identifier of the mobile device 102 and an expiration date for the content. In some implementations, one or more custom values generated for the content may be stored in association with the identifier for the personalized content item (e.g., prequalified line of credit, contact information of agent included for accepting or inquiring about the content, etc.).

An ID-device binding data store 180 may also be included in the environment 100. The binding data may store an association of device identifiers and an identifier for a specific user. In some implementations, the identifier for a specific user may be a personal identifier that uniquely identifies the user within the environment 100 or at least in the context of the personalized content provisioning system 150.

Example Implementations and Architectural Features—Behavior Provisioning

Figure 2:
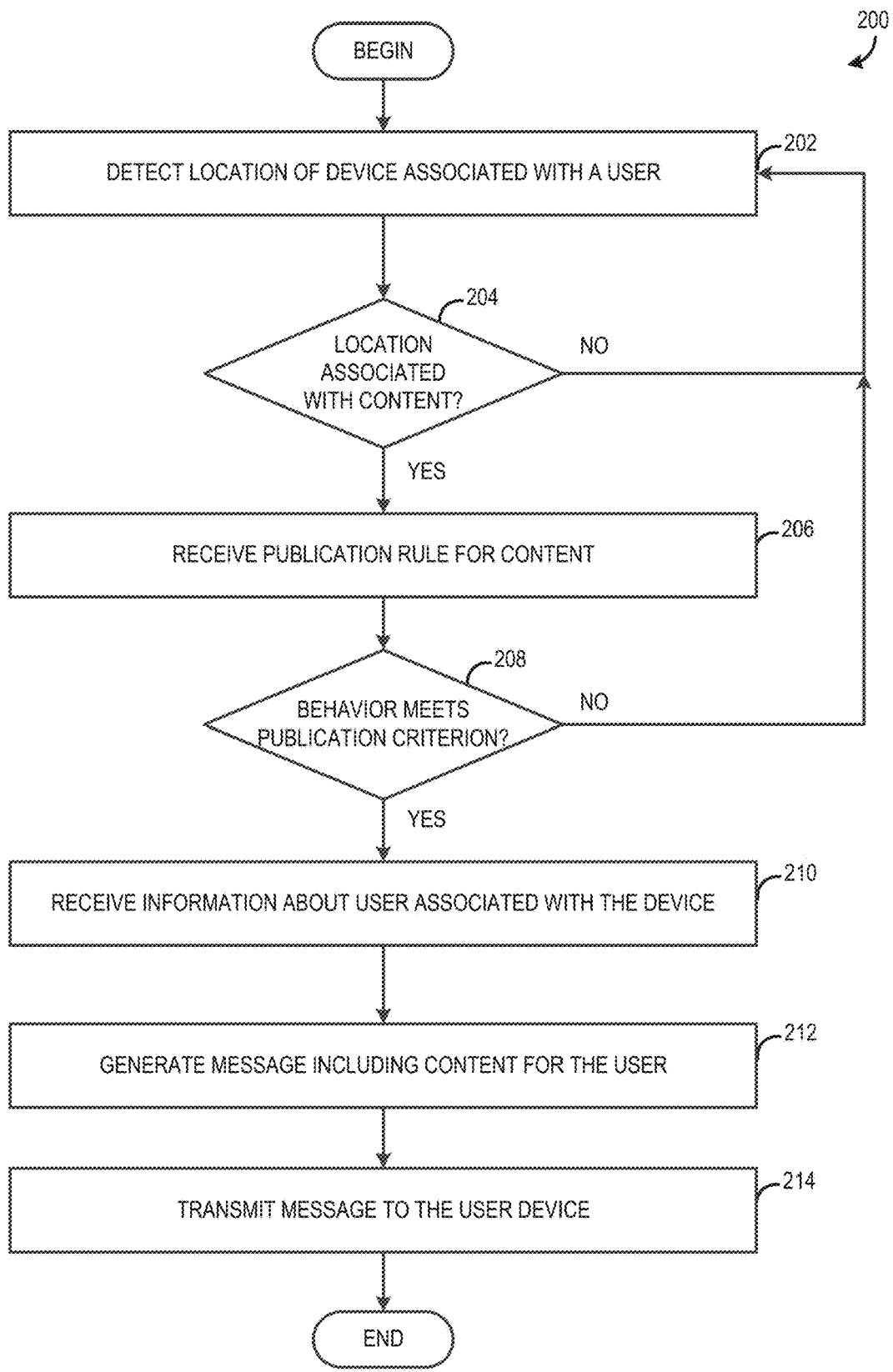
FIG. 2 is a flow diagram showing an example method of behavior initiated content provisioning.

FIG. 2 is a flow diagram showing an example method of behavior initiated content provisioning. The method 200 may be implemented in whole or in part by the personalized content provisioning system 150. The method 200 illustrates an example method in which user behavior, such as location behavior, can be used to provide personalized content to a user. Consider the case where a user visits a car dealership on Monday. The system may detect a mobile device associated with the user at the dealership. Later in the week, the same user is detected at the dealership (or a related dealership). Based on an interaction with a sensor at the dealership or entering a geofenced area, which may or may not require any affirmative input from the user (as discussed in the various embodiments herein), an alert may be transmitted to the mobile device indicating that the user is prequalified for a loan to purchase a car at the dealership. Depending on the embodiment, the method of FIG. 2 may include fewer or additional blocks and the blocks may be performed in an order that is different than illustrated.

At block 202, a location of a device associated with a user may be detected such as by a presence system or a behavior detector. The detection may be based on information transmitted from the device. For example, a presence detection system may be implemented to identify where a mobile device is located, when it arrived at the location, and, in some implementations, how long it was at the location. The identification may be based on transmitting a beacon identifier from the mobile device to the presence detection system. In some implementations, the information may be transmitted by a service accessed by the device such as accessing the WI-FI® network at a location.

At block 204, the personalized content provisioning system 150 may determine whether the location of the device is associated with content. The determination may include querying a publication information data store for content associated with the location. In some implementations, the association may be based on an area. For example, a content element may be associated with an entire city block. If the location of the device is within that city block, then the location may be deemed associated with the area. In some implementations, a threshold distance may be associated with an area. Thus, if the device location is determined to be within the threshold distance of a geographic area, the device location may be deemed associated with the area.

If the determination at block 204 is negative, the method 200 may return to block 202 to detect another location for the device. If the determination at block 204 is affirmative, then content may be associated with the location. At block 206, the personalized content provisioning system 150 may receive a publication rule for the content associated with the location. The publication rule may identify user attributes required for delivery of the content to the user. For example, the publication criteria may indicate that the user has visited a particular location two or more times in one week.

At block 208, the personalized content provisioning system 150 applies the remaining publication criteria (e.g., pre-validation criteria for a credit card offer) to user attributes (e.g., from third party data sources and/or directly Received from the user device) to determine if content (e.g., a credit card offer) should be provided to the user. The determination may include retrieving behavior data from a user history data store.

If the determination at block 208 is negative (the user attributes identified by the system did not meet the publication criteria), the method 200 may return to block 202 and continue as described above. If the determination at block 208 is affirmative and the behavior meets a publication criterion, the method 200 may continue to block 210. At block 210, information about the user associated with the device may be received by the personalized content provisioning system 150. Receiving the information may include retrieving user information from the user history data store. Receiving information may include receiving information from the device or application executing thereon. In some implementations, it may be desirable to obtain consent of the user before requesting and receiving personal information. For example, information may be received from a service provider that provides a service to the user or the device. Before requesting such information, the user may be prompted such as via a graphical user interface to consent to data gathering. A response confirming the consent may be received to permit requesting and receipt of this information.

At block 212, a message including the content for the user may be generated by the personalized content provisioning system 150. Generating the content may include generating one or more values to include within the content. For example, a maximum line of credit may be identified based on the user information or a metric therefor. For example, the metric may be a score based on prior transactions. The score may indicate how reliable the user performed one or more prior transactions. In some implementations, the metric may be used to select a version of content for a user associated with the metric or other user data. For example, if the user is associated with a mailing address in California, a version of the content tailored to California residents may be selected. The content generation may include generating an identifier that uniquely identifies the personalized content provided to the user. For example, it may be desirable to maintain a record of the terms or conditions included in the content. The content may be associated with an expiration date. The expiration data may be selected based on the current date, a date when the offer was first presented, a promotion end date, or a combination thereof.

At block 214, the personalized content provisioning system 150 may transmit the message to the device. The message including the personalized content may be transmitted via wired, wireless, or hybrid wired and wireless means such as via one or more of the communication systems 110 and/or the network 120 shown in FIG. 1. The message may cause the device to activate and/or initiate an application that is configured to present the content.

For example, in certain implementations, an alert indicating a product offer to a user may be automatically transmitted to the mobile device 102 in response to determining that personalized content should be provide to the user (e.g., in block 214), such as in real-time as the user is at the location triggering the content analysis (e.g., at block 204). Such alert communications may be automatically transmitted to the user in one or more modes of communication, such as, for example, direct to a mobile application, electronic mail, text messaging (e.g., SMS, MMS, or other), to name a few. In certain modes of communication, the communication may be configured to automatically operate on the user's electronic device. For example, upon receipt of an alert, a software application installed on the user's mobile device may be automatically activated to deliver the communication to the user (e.g., a SMS viewer or application may automatically display information from the alert communication when received by the device or when the device is connected to the internet). Alternatively, the alert communication may activate a web browser and access a web site to present the alert communication to the entity. In another example, a communication may be transmitted to the user's email account and, when received, automatically cause the user's device, such as a computer, tablet, or the like, to display the transmitted communication or a link to take the entity to a webpage with additional information regarding the selected publication content (e.g., product or service offer).

FIG. 2 describes a method of providing personalized content based on detected behaviors. In some implementations, it may be desirable to provide personalized content on demand such as in response to a user request.

Example Implementations and Architectural Features—Requested Provisioning

Figure 3:
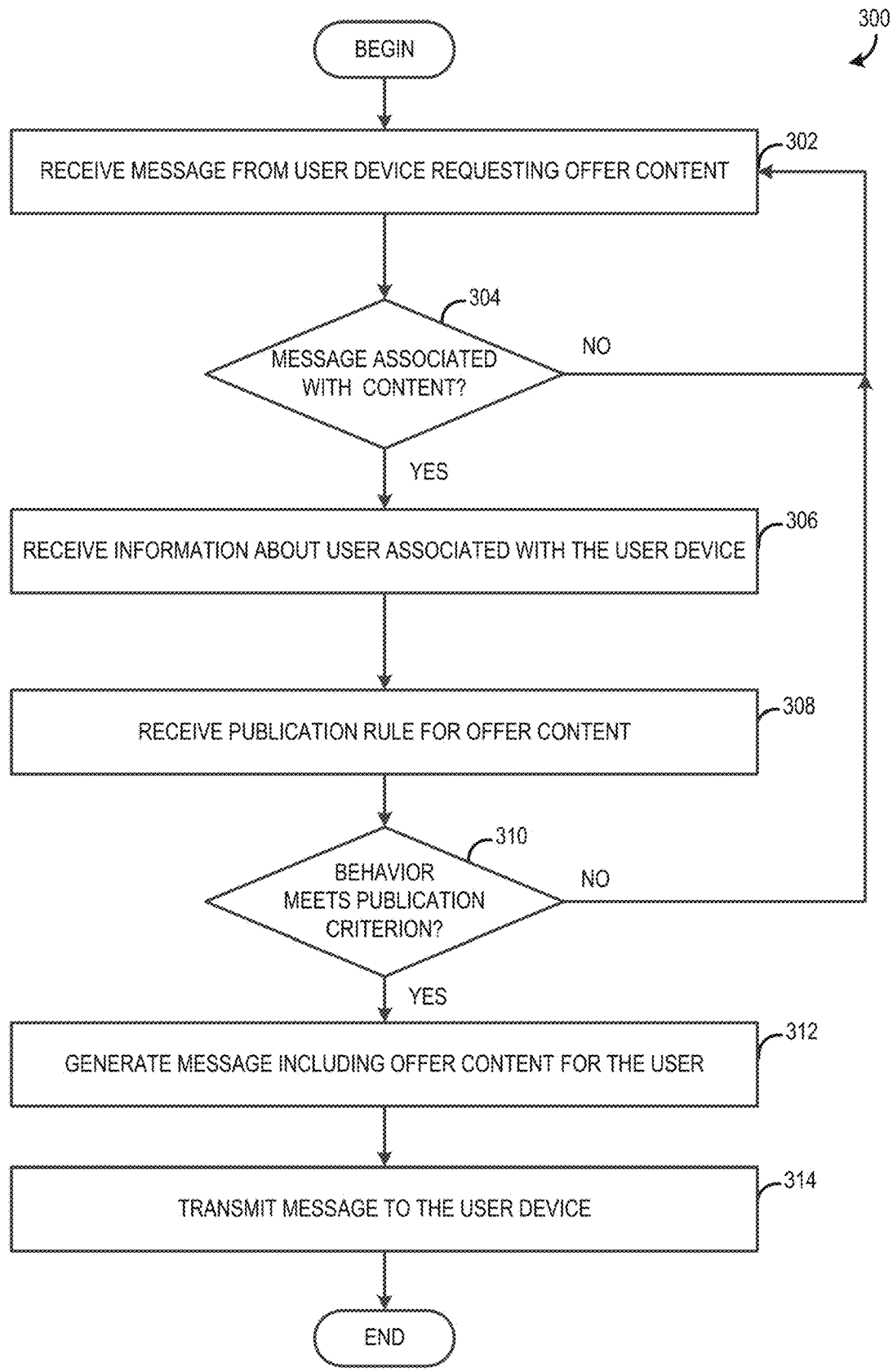
FIG. 3 is a flow diagram showing an example method of user requested content provisioning.

FIG. 3 is a flow diagram showing an example method of user requested content provisioning. The method 300 may be implemented in whole or in part by the personalized content provisioning system 150. The method 300 illustrates an example method wherein a user can request that information regarding the user be obtained and a determination of eligibility for content be performed. Consider the case where a user visits a car dealership while walking home. The dealership may include a sign saying "Text 'credit' to 333333 to drive home today." In such implementations, the act of submitting a text message with a specific keyword (e.g., credit) can be sufficient to identify the user and determine that the user is qualified to receive particular content, such as a credit prequalification offer that is tailored to the user. Depending on the embodiment, the method of FIG. 3 may include fewer or additional blocks and the blocks may be performed in an order that is different than illustrated.

At block 302, a message requesting offer content may be received from a user device. The message may be received in response to a location alert (e.g., behavior based), such as a message sent to the user device as the user walks into the car dealership and requests a reply back from the user. The message may be received without direct solicitation via the user device such as by a user seeing a sign or hearing a radio advertisement, creating the message, and transmitting the message. In some implementations, the message may be generated via an application executing on the user device. For example, a bank may provide its users a custom application. The custom application may include a user interface element that, when activated, causes transmission of a message to the content provisioning system requesting identification of current credit offers for the use. It will be appreciated that the example method in FIG. 3 discusses credit offers, but the method 300 may be applicable for requesting and providing other types of personal content such as educational content, informational content, bank cards, mortgages, job applications, government forms, auto loans, retail loans, loyalty programs, pre-fillable content, timeshare or other eligibility based content, comparison service, or the like.

The message may include a keyword such as "credit." In some implementations, the message may include an image such as an image of a car the user is thinking about purchasing. The message may be transmitted along with information about the user and/or the user device such as a device identifier, phone number, sender email address, IP address of the device, current location of the user device, or other identifying information for the user and/or user device.

At block 304, the personalized content provisioning system 150 may determine that the message received at block 302 is associated with content. The determination may include querying a publication information data store for content associated with the location of the user device or other attribute included in the request. For example, where the request includes a text message, the determination at block 304 may include identifying content associated with the destination number and specific message included. For example, a car dealership may be associated with a particular message destination code (e.g., a phone number or other short message code). The same dealership may have different promotions or content that can be served. In such implementations, each campaign may be associated with a different keyword. In some implementations, the code may be associated with date information indicating when the code is "active" for providing content. Table 1 below provides one example of how codes may be associated with different content (e.g., different campaigns, different credit levels (e.g., standard versus preferred), or different user types (e.g., individual versus business)).

TABLE 1

| Destination Number | Code | Content Identifier | Description |
|---|---|---|---|
| 444444 | "credit" | prequal-2017 | 2017 user credit prequalification campaign (standard) |
| 444444 | "accord rebate" | accreb-39275 | Mfg. Accord rebate program 39275 |
| 444444 | "fleet fi" | b2b-prequal-2017 | 2017 business credit prequalification campaign |
| 888888 | "credit" | prequal-2017 | 2017 user credit prequalification campaign (preferred) |

If the determination at block 304 is negative, the method 300 may return to block 302 to receive another message from the user device. In the negative case, it may be that the destination number and/or code received at block 302 are no longer valid or are not yet active. If the determination at block 304 is affirmative, then content may be available for the user.

At block 306, information about the user associated with the device may be received by the personalized content provisioning system 150. Receiving the information may include retrieving user information from the user history data store. Receiving information may include receiving information from the device or application executing thereon. In some implementations, it may be desirable to obtain consent of the user before requesting and receiving personal information. For example, information may be received from a service provider that provides a service to the user or the device. Before requesting such information, the user may be prompted such as via a graphical user interface to consent to data gathering. A response confirming the consent may be received to permit requesting and receipt of this information.

At block 308, the personalized content provisioning system 150 may receive a publication rule for the available content. The publication rule may identify a user behavior to provide the content. For example, the user behavior may include visiting the location two or more times in one week. The publication rule may include consideration of user information. For example, demographic information (e.g., mailing address, age, gender, etc.) may be used to determine whether content is available for the user.

If the determination at block 308 is negative, the method 300 may return to block 302 and continue as described above. If the determination at block 308 is affirmative and the user information or behavior meets a publication criterion, the method 300 may continue to block 310.

At block 310, a message including the content for the user may be generated by the personalized content provisioning system 150. Generating the content may include generating one or more values to include within the content. For example, a maximum line of credit may be identified based on the user information or a metric therefor. For example, the metric may be a score based on prior transactions. The score may indicate how reliable the user performed one or more prior transactions. In some implementations, the metric may be used to select a version of content for a user associated with the metric or other user data. For example, if the user is associated with a mailing address in California, a version of the content tailored to California residents may be selected. The content generation may include generating an identifier that uniquely identifies the personalized content provided to the user. For example, it may be desirable to maintain a record of the terms or conditions included in the content. The content may be associated with an expiration date. The expiration data may be selected based on the current date, a date when the offer was first presented, a promotion end date, or a combination thereof.

At block 312, the personalized content provisioning system 150 may generate a message including offer content for the user and then at block 314 transmit the message to the device. The message including the personalized content may be transmitted via wired, wireless, or hybrid wired and wireless means such as via one or more of the communication systems 110 and/or the network 120 shown in FIG. 1. The message may cause the device to activate and/or initiate an application that is configured to present the content.

Example Implementations and Architectural Features—Intelligent Identification

Figure 4:
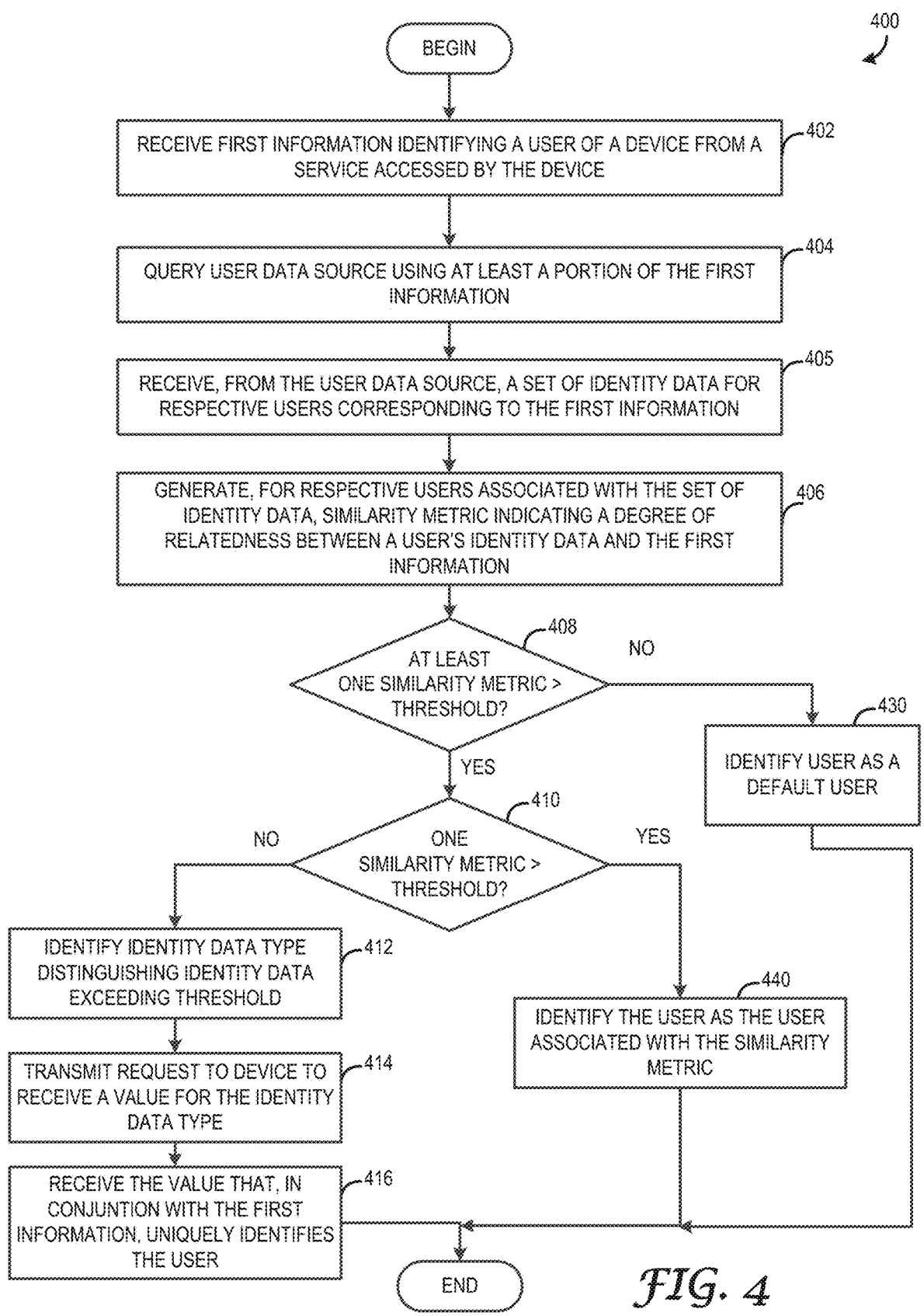
FIG. 4 is a flow diagram showing an example method of identifying a user.

FIG. 4 is a flow diagram showing an example method of identifying a user. Some implementations, such as the methods shown in FIGS. 2 and 3, may include uniquely identifying a user based on limited information. FIG. 4 provides one way to efficiently identify a user of a device. Depending on the embodiment, the method of FIG. 4 may include fewer or additional blocks and the blocks may be performed in an order that is different than illustrated.

The method 400 may begin at block 402 by receiving, e.g., at the identity confirmation device 155 of the content provisioning system 150 (FIG. 1), first information identifying a user of a device from a service accessed by the device. For example, the first information may be user input to an application executing on the device. As another example, the first information may be a phone number or device identifier assigned by a service provider (e.g., mobile network operator) to the device, or even user information associated with the phone number provided by the service provider. If the first information is a phone number, a reverse lookup may be performed to identity user data associated with the phone number. The user data may include first name, last name, and mailing address information such as a ZIP code. In some implementations, the user data may include historical user data such as previous addresses or names (e.g., due to a change in marital or adoption status).

At block 404, the system may query a user data source using at least a portion of the first information. For example, a credit data base including header files associated with different users may be queried using the first name, last name, and ZIP code identified by the first information.

A set of user data for different users corresponding to the first information may be received at block 405. As discussed above, some users may have the same first name or last name. Such user records may correspond to the first information. In some implementations, the correspondence may be based on fuzzy logic or phonetic matching. Similarity may also be based on current user information or historical user information (e.g., prior address, name, etc.). Because there may be discrepancies between the received first information and the specific users identified from the user data source, the method 400 may further process the received records to identify a record for a unique user included in the set of users. In some embodiments, if a "perfect match" is included in the candidate identity records returned from the query at block 404, the system may forgo the remainder of the matching process by identifying that user as the authenticated user. In some embodiments, this short-circuiting of the matching process may only be performed if a single perfect match exists in the returned candidate identity records, where a perfect match may be defined as exact matching of all user provided data (e.g., exact match of first name, last name, ZIP code provided by the user), or in some embodiments could include variants of certain identity data (e.g., a perfect match could be identified for a candidate record for "Joe Jones" in response to the user providing the name of "Joseph Jones"), or as defined by the offer provider (e.g., based on the needed level of identity verification).

At block 406, the system may generate a similarity metric identifying, for each of the candidate users, how closely the user data for a respective candidate user matches the first information. One example of a similarity metric is a Jaccard score. The degree of relatedness may be used to identify whether any candidate users may be identified as the user and to what level of confidence. In cases where historical information for a user is included, a weight may be applied to discount values occurring further from the current time. For example, if a user moved in the last six months, the prior address may be considered with a higher weight than a previous address for a person who moved thirteen years ago. The weighting may be dynamically specified for each data type (e.g., a first weight may be applied for names while a second weight may be used for ZIP code). The weighting applied for a data type may be identified in a configuration accessible by the system.

At block 408, the system may determine whether at least one of the candidate users is associated with a metric that meets or exceeds a matching threshold. For example, it may be desirable to identify a "match" only when the Jaccard score exceeds a minimum threshold, such as to ensure that credit offers provided to a user are based on that same user's unique credit data that qualifies the user for the credit offers. This may ensure a minimal degree of relatedness. If the determination at block 408 is negative, the user data store may not include records with sufficient level of relatedness to identify the user. In such instances, the method 400 may proceed to block 430 to identify a default user. Identifying a default user may include collecting generic user information that can be presented to any user. For example, in the context of credit offers, the user may be provided with generic invitations to apply for credit, rather than being provided with an offer of credit that may be provided only to qualifying authenticated users. This may include identifying no user information and providing a request to provide a more robust set of information than provided via the first information.

While the default user is a helpful fail-safe, it is envisioned that the determination at block 410 will match at least one user. Based on experiments, it has been determined that many users may be uniquely identified on the basis of first name, last name, and ZIP code. Accordingly, the default identification at block 410 may apply to a small percentage of the users submitted for identification.

In the case where at least one user is identified at block 410, the method 400 may continue to block 412 to determine whether only one user exceeds the threshold. The determination at block 412 may be affirmative when only one user is identified with a similarity metric above the matching threshold. In such cases, the method 400 may proceed to block 440 to positively identify the user as the candidate user associated with the metric. The positive identification may include providing additional information about the user retrieved from the user data source. One example of such additional information may include user information for processing credit inquiries.

Returning to block 412, if more than one candidate user is associated with a metric that exceeds the threshold, it may be that a unique user cannot be associated with the first information. In such instances, the method 400 may compare the remaining candidate users' information to identify a data type or field (e.g., first name, date of birth, last four of the Social Security Number, previous street address, etc.) that may be used to distinguish all candidate users. For example, consider the three example candidate user records shown in Table 4 below.

TABLE 4

| Candidate No. | First Name | ZIP code | Street | House No. |
|---|---|---|---|---|
| 1 | Pat | 92212 | Main St. | 146 |
| 2 | Pat | 92212 | Garden St. | 735 |
| 3 | Pat | 93102 | Lincoln Blvd. | 33982 |

In Table 4, the example candidates have the same first name, so the data type or field associated with first name cannot distinguish the candidate users. Similarly, the data type or field associated with ZIP code cannot distinguish all of the candidate users as two the three candidates are associated with the same ZIP code. The street address information can distinguish the candidate users as each user can be uniquely identified based on the house number. Accordingly, the data type or field associated with house number may be identified for the example shown in Table 4.

At block 414, the system may transmit a request to the user device requesting a value for the data type or field identified at block 412. It will be appreciated that the method 400 requires only this single value for distinguishing the candidate users. This ensures a limited collection and exchange of information between the system and the device to attain a unique identification. The request transmitted at block 414 may cause the display of a data collection user interface to receive and transmit a value for the requested data type or field to the system.

At block 416, the value may be received from the user device. The value may be compared to the candidate user values to ensure the received value is in fact associated with one of the candidate users. In the case where the received value is not associated with any of the candidate users, the method 400 may proceed to block 440 as described. However, it is expected that the received value will match one of the candidate users thereby providing a unique identification of the user.

Once the user is uniquely identified, user information for the user may be provided for additional processing. For example, as discussed, personalized content may be provided based on the identity of a user. In some implementations, such personalization may require specific user information to identify or generate the content. One specific example is a prequalified credit offer. In some implementations, a model may be included. The model may accept a set of input values representing specific user information such as age, income, credit score, etc. These values may only be provided if the user is uniquely identified such as via the method 400. Generating the content may include generating one or more values to include within the content. For example, a maximum line of credit may be identified based on the user information or a metric therefor. For example, the metric may be a score based on prior transactions. The score may indicate how reliable the user performed one or more prior transactions. In some implementations, the metric may be used to select a version of content for a user associated with the metric or other user data. For example, if the user is associated with a mailing address in California, a version of the content tailored to California residents may be selected. The content generation may include generating an identifier that uniquely identifies the personalized content provided to the user. For example, it may be desirable to maintain a record of the terms or conditions included in the content. The content may be associated with an expiration date. The expiration data may be selected based on the current date, a date when the offer was first presented, a promotion end date, or a combination thereof.

FIG. 5 is a messaging diagram showing example communications for providing personalized content to a mobile device. FIG. 5 shows messages exchanged between a user device 502, a short code provider 506, a decisioning service 508, and a service operator 510 (e.g., mobile carrier, internet service provider, application service provider, etc.). The messages in FIG. 5 are shown as being exchanged directly between entities. It will be appreciated that intermediaries such as security devices, routers, gateways, network switches, and the like may be included. These intermediaries have been omitted to focus the reader on certain features of providing personalized content. Additionally, in some embodiments functionality of two or more devices illustrated in FIG. 5 may be performed by a single entity and/or single device.

A user of the user device 502 may receive a call to action. For example, the user device 502 may transmit a message including device information, such as a location of the user device 502 or a signal detected by the user device 502 such as a beacon identifier. In response, the user device 502 may receive a message including a short code. The message may be a text message indicating that the short code may be used to request personalized content. The message may include instructions to adjust a graphical user interface of the user device 502 to display the short code for requesting personalized content. In some implementations, the message may include a URL that directs the user to a web portal (e.g., by launching a browser on the user's mobile device) to provide further identity verification information and/or perform other actions to prequalify for an offer. In some embodiments, the content provisioning system 150 includes a URL shortening logic that generates short URLs (e.g., <20 characters) that are redirected to the corresponding full URL (e.g., 80+characters). Longer URLs may not work on certain mobile devices (e.g., may result in an error code on the user device) and/or are not user-friendly (e.g., may fill the entire mobile device display with irrelevant information to the user). Thus, providing of shortened URLs by shortening logic at the content provisioning system may reduce the occurrence of technological challenges and/or errors in interacting with users. The URL shortening logic may include code, e.g., python code that generates the shortened URLs and stores them in association with the full URL on a web services server (e.g., Amazon's web services or AWS). In some embodiments, an external URL shortening service may be called to provide shortened URLs that may then be included in message content by the content provisioning system 150.

The user of the user device 502 may decide to request the content offered by activating a control element on the user device 502 to transmit a short code message 524 to the short code provider 506. In some implementations, the short code message 524 may be manually input by the user such as based on information collected from a sign or other promotional material. The short code provider 506 may translate the short code received in the short code message 524 to identify a process or service to respond to the request. The short code message 524 may include information identifying the user device 502 such as a phone number, mobile equipment identifier, username, or account number. This identifying information may be transmitted in a message 526 to the decisioning service 508. The decisioning service 508 may implement the personalized content selection and generation features described such as in FIG. 2, 3, or 4.

The decisioning service 508 may request consent from the user of the user device 502 to retrieve additional information about the user such as performing a reverse lookup for personal information about the user based on the device identifier. In such implementations, a consent request message 528 may be transmitted to the user device 502. The consent request message 528 may include a link that can be activated via the user device 502 to provide consent and continue the process. The link may include a token or other temporary credential to associate the consent with a particular session. In some implementations, the consent request message 528 may request return of a password, personal access number, or other verification information.

As shown in FIG. 5, the consent may be provided in the form of a short code message 530. The message 530 is received by the short code provider 506 and provided in turn to the decisioning service 508 via message 532. The message 532 may include consent information such as a password or token along with the device identifier. The decisioning service 508 may then associate the consent with a particular device and thus set of personal information. The decisioning service 508 may transmit a message 534 to the service provider 510 to retrieve additional user information for the user associated with the user device 502. For example, the service provider 510 may be a cellular service provider for the user device 502. Using a phone number, additional information about the user account associated with the phone number may be retrieved via message 536. The user data collected, or a portion thereof, may be transmitted via message 538 to the decisioning service 508. In some implementations, the service provider 510 may be an application service provider, credit service provider, merchant, retailer, government, or other entity to whom users have identified themselves. In some implementations, more than one service provider 510 may be included and queried for user information. The user information received from respective providers may be different or may be the same, in which case, a comparison may be performed between values for a given data field to generate a confidence in the identification result.

In some implementations, the service provider 510 may be a social media or other online media provider. For example, the content provisioning system 150 may request user PII from a social media server in response to the user indicating a desire to be prequalified for a particular offer (e.g., for an auto loan). Similar to embodiments discussed herein where a wireless service provider (e.g., Verizon, AT&T, Sprint, etc.) provide initial user identification information (e.g., name and ZIP Code), a social media server may provide similar and/or additional information regarding users that may then be used in a user verification process and determination of eligibility for the particular offer.

In some embodiments, a call to action may be presented via a social media service such as via a textual or image post. An interaction with the call to action (e.g., click, like, download, display, button press) may cause initiation of one or more of the identification and content provisioning features described. For example, a user may see content on their social media feed (on a mobile, portable, or desktop device) regarding prequalification for credit (which may be provided to the user based on analysis of the user's profile and recent posts that indicate the user is searching for a new car, house, etc.) that, when selected, initiates any of the identity verification processes discussed herein.

At this point, the decisioning service 508 has at least two sources of information to help identify the user of the user device 502 namely the information provided by the user device 502 during the communication session and the information provided by the service provider 510. Via messaging 540, the decisioning service 508 may identify the user based on the collected information. In some instances, the identification may include querying an additional user data source such as credit header files or other personal information data stores. In some instances, the collected data may not be sufficient to uniquely identify a specific user. In such instances, messaging 542 may be included to request and receive additional identity data to distinguish amongst multiple candidate users, such as discussed with reference to Table 4 above.

Once the user of the user device 520 is uniquely identified, via message 544, the personalized content may be generated. Generating the content may include generating one or more values to include within the content. For example, a maximum line of credit may be identified based on the user information or a metric therefor. For example, the metric may be a score based on prior transactions. The score may indicate how reliable the user performed one or more prior transactions. In some implementations, the metric may be used to select a version of content for a user associated with the metric or other user data. For example, if the user is associated with a mailing address in California, a version of the content tailored to California residents may be selected. The content generation may include generating an identifier that uniquely identifies the personalized content provided to the user. For example, it may be desirable to maintain a record of the terms or conditions included in the content. The content may be associated with an expiration date. The expiration data may be selected based on the current date, a date when the offer was first presented, a promotion end date, or a combination thereof. Having identified and generated the personalize content, the decisioning service 508 may transmit a message 548 including the content or information that the user device 502 may use to access the content such as a network location (e.g., URL) of the content.

Figure 6A:
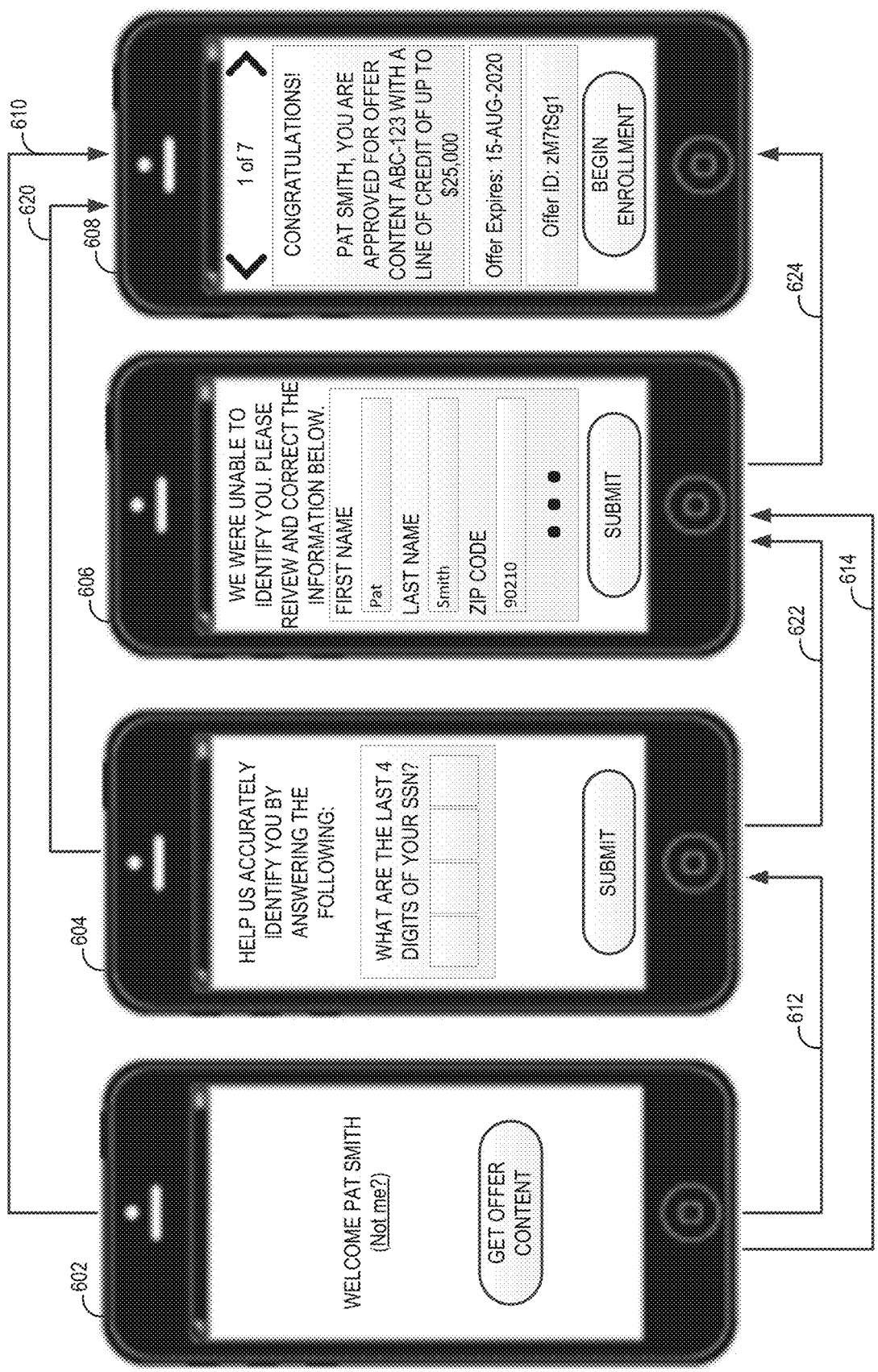
FIG. 6A is a pictorial diagram showing example user interface transitions for requesting and receiving personalized content on a mobile device.

FIG. 6A is a pictorial diagram showing user interface transitions for requesting and receiving personalized content on a mobile device. A welcome interface 602 provides a welcome message. The welcome message may be generated by an application executing on the user device, such as one provided by a bank, a car dealership, a car manufacturer, or an online retailer or a general purpose application such as a web-browser, dynamic media streaming application, or other network content viewing application. The welcome interface 602 may include personalized content such as the user's name "PAT SMITH." The welcome interface 602 includes a textual control element ("Not me?") that, when activated, may cause the user interface to collect user information for a different user. The welcome interface 602 includes a button control element ("Get Offer Content") that, when activate, transmits a message to request content. The request may be transmitted to a personalized content provisioning system.

If the user submitting the request can be uniquely identified, such as via the method 400 shown in FIG. 4, the interface may receive information to for a first transition 610 from the welcome interface 602 to a content presentation interface 608. The content presentation interface 608 may include personalized content selected based on the user data received in the message as well as any user information identified from one or more service providers. The content presentation interface 608 may include navigation arrows to allow viewing of different content for which the user is qualified to receive. The content shown on the content presentation interface 608 may include a personalized message. The personalized message may include name ("PAT SMITH") or custom generated values ("$25,000") based on the user data. The content presentation interface 608 also shows an expiration date for the content and a unique identifier for the content. The content presentation interface 608 also includes a button control element ("Begin Enrollment") that, when activated, transmits a message to a network service to begin a process associated with the content. As shown in FIG. 6A, the process may be an enrollment process to accept the prequalified credit offer described in the received content. The message may include the offer identifier to facilitate expedited collection of the required information for the process.

Returning to the welcome interface 602, if the user cannot be uniquely identified but a limited set of candidate users correspond to the user data provided, a second transition 612 may present a clarification interface 604. The clarification interface 608 may be generated to collect one or more elements of identity data that can uniquely distinguish the limited set of candidate users. As discussed, there may be one data type (e.g., month of birth, house number, street name, numeric day of birth, previous city of residence, etc.) that can distinguish all users in the limited set. In such implementations, a value for this data type may be the only requested information. As shown in FIG. 6A, the clarification interface 604 is requesting only the last four digits of the user's social security number.

The clarification interface 604 may include input control elements (shown as boxes) for receiving user input values such as respective digits of a social security number. The clarification interface 604 also includes a control element ("submit" button) that, when activated, causes transmission of the input values to the system. If the provided information narrows the identity of the user to a unique user, transition 620 may provide the personalized content via the content presentation interface 608 as described above. If the provided information fails to uniquely identify a user, transition 622 may cause presentation of a user information input interface 606.

The user information input interface 606 may include one or more input control elements to receive respective values for a set of data types such as first name, last name, last four digits of the social security number, home address ZIP code, and the like. An input control element may be prepopulated with known values, such as a first name common to the set of candidate users identified based on the initial request. The user information input interface 606 may include a control element such as a "submit" button that, when activated, causes transmission of the input values to the system. In some implementations, the interfaces shown in FIG. 6A may be provided within an application such as a web browser or custom built application. Upon submission of valid values, transition 624 may cause presentation of the content presentation interface 608 as described above.

Transition 614 from the welcome interface 602 to the user information input interface 606 may be initiated when the candidate list of users cannot be distinguished based on a single data type or field or no candidate users are found. In such implementations, the user information input interface 606 may prepopulate some fields with user values common to members of the candidate list and leave fields empty for those values which cannot be distinguished.

In some embodiments, the user identification and offer provision systems as discussed herein, such as with reference to FIG. 6A, may be implemented in an online marketplace environment, wherein the user may be provided with multiple offers for which they are prequalified, rather than a single particular offer. For example, upon identification of a user (e.g., using some or all of the identity verification process of FIG. 4), the user may be directed to a marketplace (e.g. via a shortened URL to the marketplace that is sent to the user's mobile device as a text message or application—direct message) that displays multiple offers for exploration by the user (e.g. in a browser or standalone application provided by the content provisioning system 150). In the context of credit card offers, for example, the marketplace may identify multiple (two, three, four, five, or more) credit card offers for which the user is prequalified that are perhaps sorted to identify the prequalified offers with the most advantageous terms (e.g., lowest interest rates, best rewards programs, etc.)—or to display up all of the prequalified offers in some embodiments. The user may then be given the opportunity to filter the prequalified offers (e.g., by interest rate, rewards program features, etc.) and identify a particular offer for which the user would like to complete an application. Depending on the implementation, the offers may be selected from a plurality of offer providers, such that the user could potentially be provided with prequalified offers from multiple offer providers. In the example context of credit card offers, this means that are user could be provided with credit card offers from multiple financial institutions (e.g., a first credit card from big bank A, a second credit card from big bank B, etc.). As noted elsewhere, example implementations, such as in particular vertical markets (e.g., credit card offers) are provided for ease of explanation and do not limit the scope of any associated systems and methods to other vertical markets.

Figure 6B:
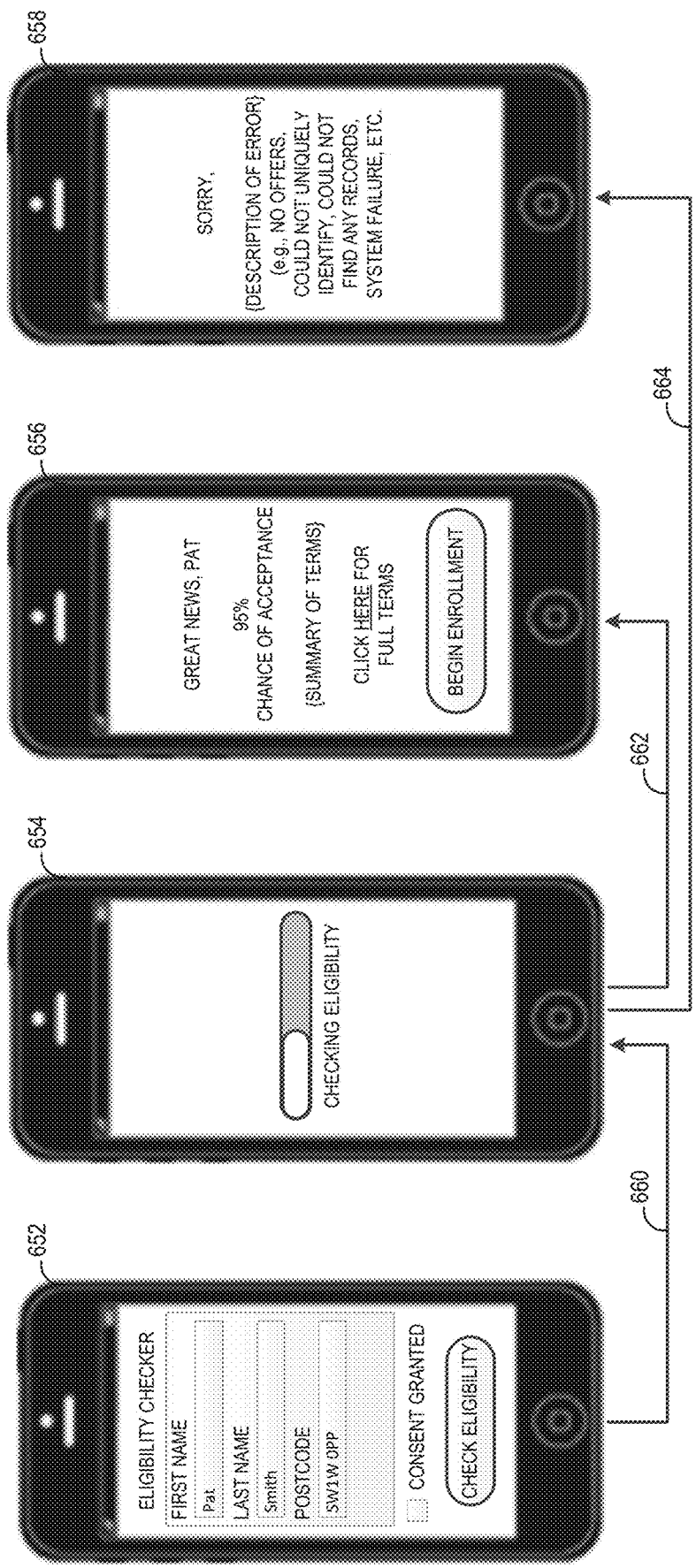
FIG. 6B is a pictorial diagram showing another example user interface transitions for requesting and receiving personalized content on a mobile device.

FIG. 6B is a pictorial diagram showing another example user interface transitions for requesting and receiving personalized content on a mobile device. An eligibility initiation interface 652 may be presented on a user device. The eligibility initiation interface 652 may be presented in response to a message received from the personalized content provisioning system 150. For example, the message may cause execution of an application on the user device to present the eligibility initiation interface 652. In some implementations, the application may be executed by the user via the user device. In such instances, the eligibility initiation interface 652 may be presented without remote communication (e.g., to the personalized content provisioning system 150).

The eligibility initiation interface 652 may include input control elements (shown as boxes) for receiving user input values such as first name, last name, or postcode. In some implementations, the application presenting the eligibility initiation interface 652 may pre-populate the fields with a value for one or more of the input control elements. For example, if the user previously provided name or postcode information as a configuration for the application, these values may be retrieved from the configuration storage and displayed in respective input control elements. The eligibility initiation interface 652 may include additional control elements such as a checkbox to indicate user's consent to process his or her personal information. In some implementations, an additional control element may be provided that, when activated, shows additional details about the processing, what information may be collected, how the information may be used, etc. The eligibility initiation interface 652 shown in FIG. 6B also includes a control element (e.g., button "check eligibility") that, when activated, submits the user input values for further processing. For example, the user input values may be transmitted via a network for further processing such as to the personalized content provisioning system 150.

After submission, a transition 660 may cause presentation of a status interface 654. The status interface 654 may provide an indicator of the progress of the eligibility processing. The indicator shown in the status interface 654 comprises a progress bar. The progress bar may be updated based on one or more messages received from the system processing the eligibility request such as the personalized content provisioning system 150.

The result of the processing may be that the user is identified and is eligible for particular content. In such instances, a transition 662 may cause presentation of a content offer interface 656. The content offer interface 656 may include a personalized greeting (e.g., "Pat" is the name of the user and is used in the message shown). The content offer interface 656 may include an estimate of a likelihood of obtaining the content referenced on the content offer interface 656. For example, in a credit prequalification context, the prequalification decision may not be a firm offer of credit, but rather an indicator of what credit terms might be offered to the user. An actual offer may be contingent on additional verification or information not available at the prequalification stage.

As shown in FIG. 6B on the content offer interface 656, a percentage chance of acceptance is included. As discussed above, the content may be generated from a content template which includes a field for the likelihood information. The likelihood may be generated by the content generator 170.

The content offer interface 656 may include additional text summarizing the terms of the offer. In some implementations, the content offer interface 656 may include an additional control element, such as hyperlinked text or a button, that, when activated, causes presentation of the full terms of the offer. The presentation may include retrieving the terms from a network location or displaying additional information received from the source system. The content offer interface 656 may include a control element (e.g., button), that, when activated, begins the enrollment process. The control element may submit a session identifier to an enrollment system for continued processing. The session identifier may be used by the enrollment system to access user information collected by the prequalification process and/or the content offer identified.

In some implementations, once a user is approved for an offer, the approved offer information may be automatically provided to the offer provider, such as by pre-populating the offer provider's online eligibility service with the user's information. For example, the user may be provided with an option to perform a further approval process by selecting a link to the offer provider's online eligibility service, which will be pre-populated (or auto-populated as the service is opened) with the user's information. Additionally, the user information may be provided to other applications or entities. In the context of credit card offers, for example, once a user is approved for a particular credit card, the credit card information may be automatically (or after authorization by the user) provided to a mobile wallet on the user's mobile device. Mobile wallets may be included as part of an operating system (e.g., Apple pay on iPhones) or third-party mobile payment applications (e.g., Google pay). Thus, a credit card could be applied for, approved, and available for use by a user within a significantly shortened time, and without the user ever receiving a physical credit card in some implementations.

In some implementations, the user is presented with an option to receive a follow-up text or email (e.g., if they supply address) at some future time (e.g., 1 day, 1 week, or 1 month later—which may be determined automatically by the system or may be selectable by the user in some embodiments), that includes the link to the digital application process (e.g., either the same link as already provided or a modified link for identifying the user visit as responsive to a follow-up message).

Another result of the processing may be that the user cannot be positively identified. In such instances, one or more additional interfaces may be presented to receive user input values to identify and distinguish the user from other candidate users. Examples of these interfaces are shown in FIG. 6A, such as the interfaces 604 and 606.

In some instances, a content offer may not be identified. The failure to identify an offer may be because the user cannot be identified, because the user cannot be distinguished from other candidate users, because the user does not qualify for any available content offers, or because of a system failure (e.g., unavailable data source, system, etc.). In such instances, a transition 664 may cause the status interface 654 to be replaced with an error interface 658. The error interface 658 may include a description of the error identifying what caused the eligibility check to fail.

Design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The present disclosure describes various embodiments of interactive and dynamic user interfaces, such as the mobile user interfaces discussed above with reference to FIGS. 6A-6B, that are the result of significant development. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interface via the inputs described herein may provide an optimized display of, and interaction with, image data (including medical images) and may enable a user to more quickly and accurately access, navigate, assess, and digest the image data than previous systems.

Example Hardware Architecture

Figure 7:
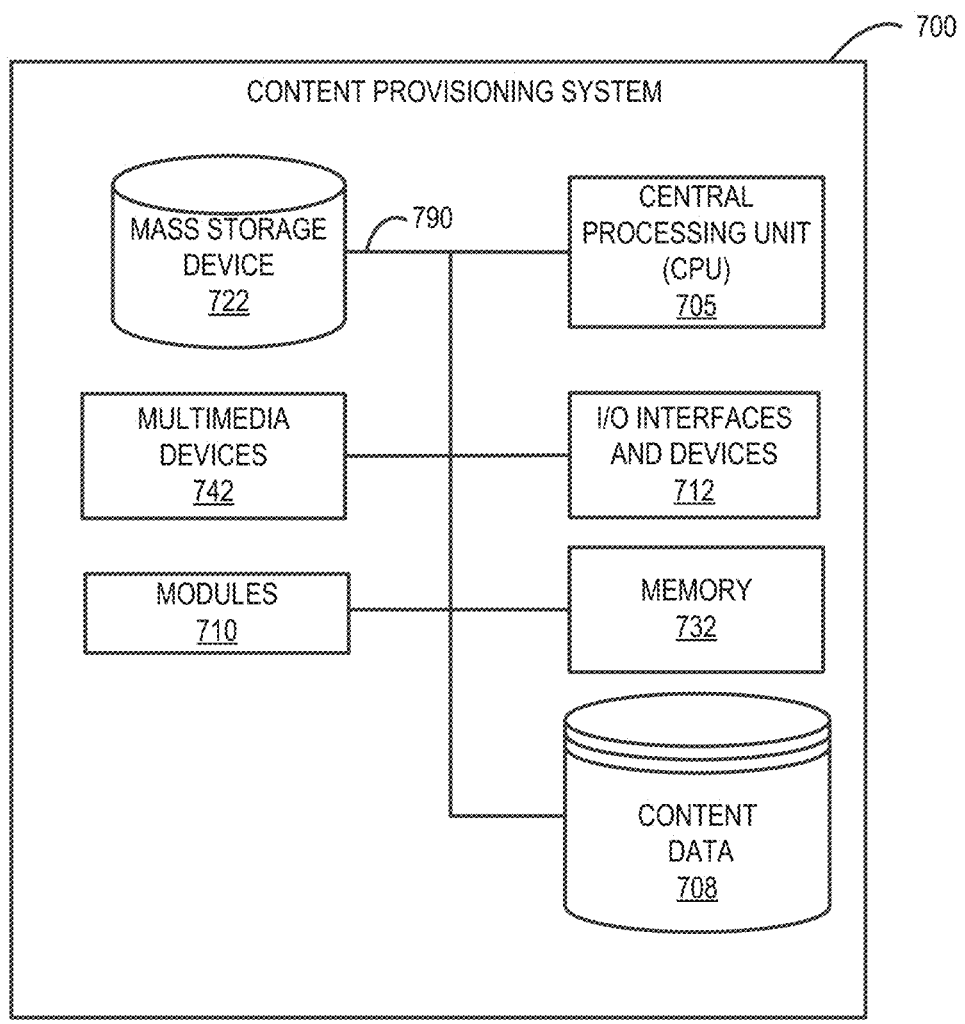
FIG. 7 is a block diagram showing example components of a location or behavior based content provisioning computing system.

FIG. 7 is a block diagram showing example components of a location or behavior based content provisioning computing system 150. The computing system 700 includes, for example, a personal computer that is IBM, Macintosh, or Linux/Unix compatible or a server or workstation. In one embodiment, the computing system 700 comprises a server, a laptop computer, a smart phone, a personal digital assistant, a kiosk, or a media player, for example. In one embodiment, the exemplary computing system 700 includes one or more central processing unit ("CPU") 705, which may each include a conventional or proprietary microprocessor. The computing system 700 further includes one or more memory 732, such as random access memory ("RAM") for temporary storage of information, one or more read only memory ("ROM") for permanent storage of information, and one or more mass storage device 722, such as a hard drive, diskette, solid state drive, or optical media storage device. Typically, the components of the computing system 700 are connected to the computer using a standard based bus system 790. In different embodiments, the standard based bus system could be implemented in Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of computing system 700 may be combined into fewer components and modules or further separated into additional components and modules.

The computing system 700 is generally controlled and coordinated by operating system software, such as Windows XP, Windows Vista, Windows 7, Windows 8, Windows Server, Unix, Linux, SunOS, Solaris, iOS, Blackberry OS, or other compatible operating systems. In Macintosh systems, the operating system may be any available operating system, such as MAC OS X. In other embodiments, the computing system 700 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary computing system 700 may include one or more commonly available input/output (I/O) devices and interfaces 712, such as a keyboard, mouse, touchpad, and printer. In one embodiment, the I/O devices and interfaces 712 include one or more display devices, such as a monitor, that allows the visual presentation of data to a user. More particularly, a display device provides for the presentation of GUIs, application software data, and multimedia presentations, for example. The computing system 700 may also include one or more multimedia devices 742, such as speakers, video cards, graphics accelerators, and microphones, for example.

In the embodiment of FIG. 7, the I/O devices and interfaces 712 provide a communication interface to various external devices. In the embodiment of FIG. 7, the computing system 700 is electronically coupled to one or more networks, which comprise one or more of a LAN, WAN, and/or the Internet, for example, via a wired, wireless, or combination of wired and wireless, communication link. The networks communicate with various computing devices and/or other electronic devices via wired or wireless communication links, such as the credit bureau data source and financial information data sources.

In some embodiments, information may be provided to the computing system 700 over a network from one or more data sources. The data sources may include one or more internal and/or external data sources that provide transaction data, such as credit issuers (e.g., financial institutions that issue credit cards), transaction processors (e.g., entities that process credit card swipes at points of sale), and/or transaction aggregators. The data sources may include internal and external data sources which store, for example, credit bureau data (for example, credit bureau data from File One(SM)) and/or other user data. In some embodiments, one or more of the databases or data sources may be implemented using a relational database, such as Sybase, Oracle, CodeBase and Microsoft® SQL Server as well as other types of databases such as, for example, a flat file database, an entity-relationship database, an object-oriented database, solr database, and/or a record-based database.

The content data storage 708 may be included to support the identification of users and/or provisioning of content to a user. For example, the content data may include content templates, content models, content publication rules, and the like.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the computing system 700, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In the example of FIG. 7, the modules 710 may be configured for execution by the CPU 705 to perform any or all of the processes discussed above with reference to FIGS. 2-4, the messaging shown in FIG. 5, or to generate and/or present the interfaces shown in FIG. 6A or FIG. 6B. Depending on the embodiment, certain processes, or in the processes, or groups of processes discussed herein may be performed by multiple devices, such as multiple computing system similar to computing system 700. For example, depending on the embodiment, certain of the processes described herein may be performed by a computing system that identifies content, while other processes are performed an identification system that determines a user's identity.

Further Identity Detection Features

In the description, some implementations of the identity detection (e.g., Smart Lookup) features have been described with reference to providing personalized content. The identity detection features may be used in additional or alternative implementations where an efficient and accurate identification of a user based at least in part on a communication device associated with the user is desired. Such implementations may include test taking systems, personal account systems (e.g., banking, insurance, email, or loyalty programs), inquiry systems (e.g., credit inquiry, education record inquiry, government record inquiry), content prefilling services, monitoring services (e.g., credit monitoring), login/authentication services, or the like.

Figure 8:
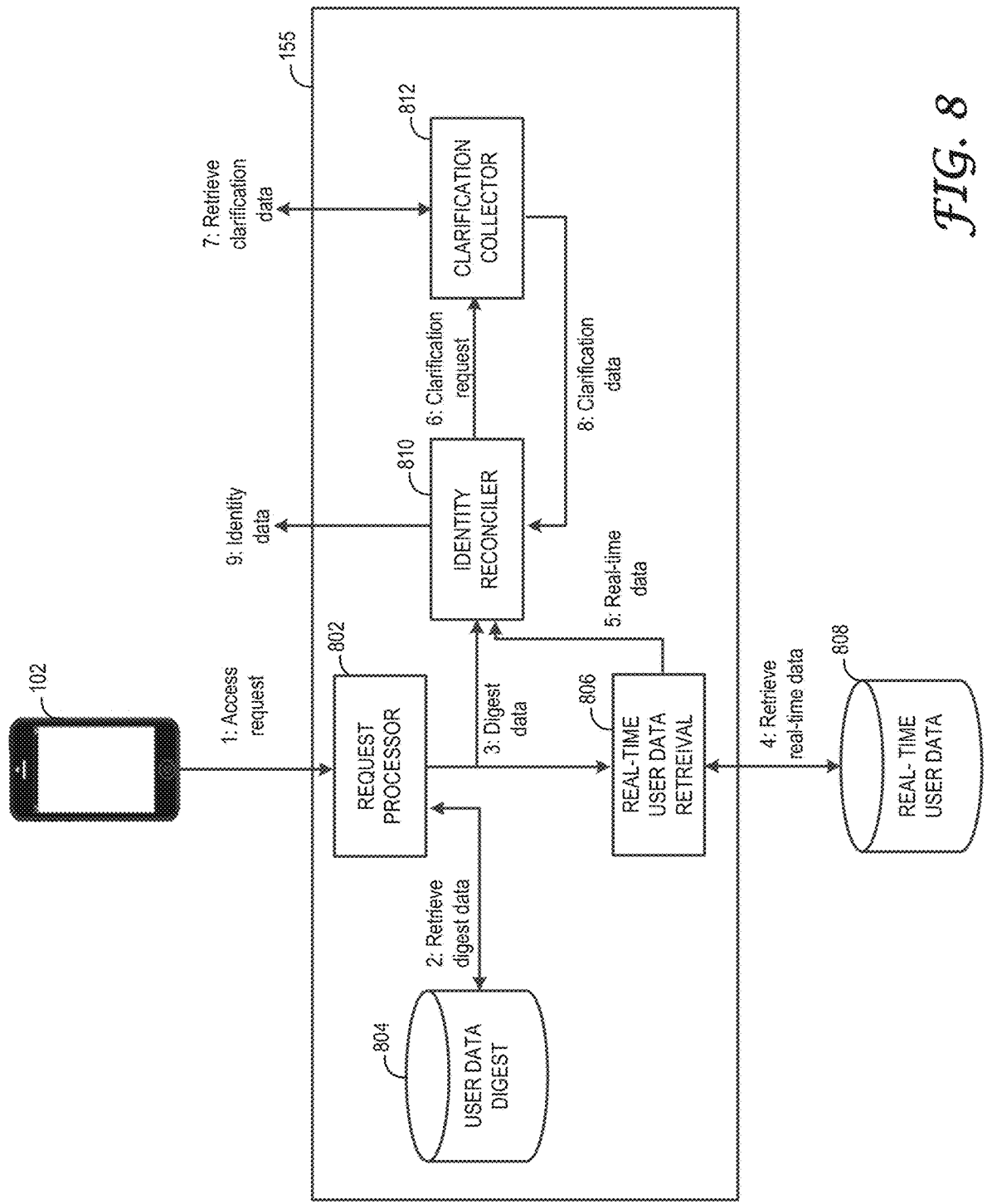
FIG. 8 is a block diagram showing example components of an identity service for identifying a user of a mobile device.

FIG. 8 is a block diagram showing example components of an identity confirmation device for identifying a user of a mobile device. A request processor 802 included in the identity confirmation device 155 may receive an access request message from the user device 102. The access request message may be received directly from the user device 102 or from a service that is being accessed or used by the user device 102. The access request message may include user information such as first name, last name, ZIP code or postcode, or an identifier that can be used to obtain the user information such from a service provider. The request processor 802 may present a machine interface such as an application programming interface or web service interface to receive messages from other services requesting identity confirmation and/or information. The interface may receive machine readable messages such as access request messages and return user information related thereto.

The request processor 802 may retrieve digest data from a user data digest data store 804. The digest data store 804 may store a limited set of user information for user and an associated custom identifier (e.g., PIN) for the user. The digest data store 804 may be a look up table indexed by the user information expected to be included in the access request. This provides a quick lookup of the custom identifier and other user information for the user. For example, the access request may include first name, last name, and postal code. The digest data store 804 may include a record for a user with the same first name, last name, and postal code. The record may also include address information (e.g., street address), date of birth, and the custom identifier.

In some implementations, the digest data store 804 may be generated based on information that does not include consideration of events that occurred since the last digest was generated. When dealing with hundreds of thousands of users who each may be associated with hundreds or thousands of events, it is not uncommon for a digest to lag behind current events by several days. Such events may impact identity decisioning or other downstream modeling based on user value inputs.

To mitigate the risk of stale or misidentification of a user, the digest data may be provided to a real-time user data retrieval 806. The real-time user data retrieval 806 may receive all or a portion of the digest data retrieved for the access request. Using the digest data, the real-time user data retrieval 806 may initiate a separate request for user information from a real-time user data storage 808. The real-time nature of the real-time user data storage 808 indicates that the user information included in the real-time user data storage 808 is based on events as processed by the system rather than a digested snapshot from a past point in time.

The real-time data may include first name, last name, postal code, address information (e.g., street address), date of birth, and a custom identifier. An identity reconciler 810 may compare the real-time data with the digest data to confirm the identity of the user. The confirmation may include comparing the custom identifiers (e.g., PINs) included in the real-time data and the digest data.

If the identifiers do not match or if there are multiple matches (e.g., several candidate users matching the digest data or several candidate users identified in the digest data), the identity reconciler 810 may transmit a clarification request to a clarification collector 812. The clarification collector 812 may be configured to identify what information is needed to identify a single user. For example, the clarification collector 812 may identify an identity data type that distinguishes all the candidate users. The clarification collector 812 may then retrieve the clarification data. Retrieving the clarification data may include causing presentation of an interface on the user device 102 to receive a user input including the clarification data. Retrieving the clarification data may include querying an additional service or data store for the clarification data. For example, the service that is to be accessed by the user device 102 may store user profiles which may include additional information that can be used to clarify the identity of the user of the user device 102. The received clarification data may be provided to the identity reconciler 810 for further consideration and analysis to identify the user.

If these identifiers included in the real-time and digest data match or if the clarification data singles out one user, then the identity reconciler 810 may confirm the identity of the user by transmitting identity data. The identity data may include transmitting additional user information such as address, date of birth, or other user information received from the real-time user data storage 808. In some implementations, the identity data may include a binary result indicating that the user is identified. This may be an efficient way to indicate to a service whether the user of the mobile device is authenticated and/or authorized to access the service. The identity information may then be used, in certain implementations, to automatically initiate additional processes based on the additional information regarding the now—authenticated user. For example, as discussed elsewhere herein, once the user's identity is authenticated, a form fill process may be initiated using information pulled from one or more databases accessible by the content provisioning system, such as PII included in a credit report (e.g., full residence address, age, credit score, etc.) of the authenticated user. In this form fill example, the user information may be encoded and transmitted to the user device for auto population of a form (e.g., a house/apartment rental application, online account registration, car rental application, credit application, etc.), or in some embodiments may be transmitted directly to the offer provider. The user information may be included with the initial data indicating results of the identity verification process or may be included in a subsequent data transmission to the requesting entity. Advantageously, this identity validation process may be used by any third-party entity that desires identity determination and/or identity verification.

Additional Embodiments

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

As used herein, the terms "determine" or "determining" encompass a wide variety of actions. For example, "determining" may include calculating, computing, processing, deriving, generating, obtaining, looking up (e.g., looking up in a table, a database or another data structure), ascertaining and the like via a hardware element without user intervention. Also, "determining" may include receiving (e.g., receiving information), accessing (e.g., accessing data in a memory) and the like via a hardware element without user intervention. Also, "determining" may include resolving, selecting, choosing, establishing, and the like via a hardware element without user intervention.

As used herein, the terms "provide" or "providing" encompass a wide variety of actions. For example, "providing" may include storing a value in a location of a storage device for subsequent retrieval, transmitting a value directly to the recipient via at least one wired or wireless communication medium, transmitting or storing a reference to a value, and the like. "Providing" may also include encoding, decoding, encrypting, decrypting, validating, verifying, and the like via a hardware element.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein, "receive" or "receiving" may include specific algorithms for obtaining information. For example, receiving may include transmitting a request message for the information. The request message may be transmitted via a network as described above. The request message may be transmitted according to one or more well-defined, machine readable standards which are known in the art. The request message may be stateful in which case the requesting device and the device to which the request was transmitted maintain a state between requests. The request message may be a stateless request in which case the state information for the request is contained within the messages exchanged between the requesting device and the device serving the request. One example of such state information includes a unique token that can be generated by either the requesting or serving device and included in messages exchanged. For example, the response message may include the state information to indicate what request message caused the serving device to transmit the response message.

As used herein, "generate" or "generating" may include specific algorithms for creating information based on or using other input information. Generating may include retrieving the input information such as from memory or as provided input parameters to the hardware performing the generating. Once obtained, the generating may include combining the input information. The combination may be performed through specific circuitry configured to provide an output indicating the result of the generating. The combination may be dynamically performed such as through dynamic selection of execution paths based on, for example, the input information, device operational characteristics (e.g., hardware resources available, power level, power source, memory levels, network connectivity, bandwidth, and the like). Generating may also include storing the generated information in a memory location. The memory location may be identified as part of the request message that initiates the generating. In some implementations, the generating may return location information identifying where the generated information can be accessed. The location information may include a memory location, network locate, file system location, or the like.

As used herein, "activate" or "activating" may refer to causing or triggering a mechanical, electronic, or electro-mechanical state change to a device. Activation of a device may cause the device, or a feature associated therewith, to change from a first state to a second state. In some implementations, activation may include changing a characteristic from a first state to a second state such as, for example, changing the viewing state of a lens of stereoscopic viewing glasses. Activating may include generating a control message indicating the desired state change and providing the control message to the device to cause the device to change state.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by the computing system and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

These and other embodiments relating to the systems and methods disclosed herein are detailed in the Appendices included in the priority applications, the entirety of which are bodily incorporated herein and the entirety of which is also incorporated herein by reference. The Appendices provides only examples of certain systems and methods that may be performed in accordance with the discussion above and does not limit the scope of alternative uses and implementations of such systems and methods.

Acronyms that may referenced in this application or an incorporated document include:
PPOI—Person places of interest
ID—identifier
HL—home location or home locator
SSN—social security number
DaaS—data as a service
DL—data labs
FN/LN—first name/last name
KBA—knowledge based authentication
API—application programming interface
SDK—software development kit
EXPN—Experian
GPS—global positioning system
WiFi—IEEE 802.11 family (e.g., c, d, e, n, g) of standards based wireless networking
PIN—personal identification number
FI—financial institution
UX—user experience

The invention claimed is:
1. A computer-implemented method of identification of a user of a mobile device, the method comprising:
under control of one or more computing devices configured with specific computer-executable instructions,
receiving first information identifying the user of the mobile device from a service associated with the mobile device;
querying, based on a fuzzy matching of at least a portion of the first information, a database which indexes credit header files of a plurality of users for a set of candidate users having the largest quantity of identity data values that matches user information from the credit header files;
determining a degree of difference between the identity data values of candidate users of the set of candidate users and the first information;
removing users from the set of candidate users based on the degree of difference;
for each user included in the set of candidate users, generating a metric indicating a degree of relatedness between the identity data values and the user information;
identifying candidate users having a generated metric exceeding a threshold;

identifying an identity data type associated with different identity data values that distinguish between the candidate users;

transmitting instructions to be received at the mobile device to request an input identity value of the identified identity data type from the user;

receiving the input identity value in response to transmitting the instructions;

determining that the input identity value corresponds to the identity data value of the identified identity data type for one candidate user; and determining the one candidate user qualifies for an offer for a line of credit.

2. The computer-implemented method of claim 1, wherein the service comprises at least one of an internet service, an application service, a cellular service, or a merchant service.

3. The computer-implemented method of claim 1, wherein generating the metric indicating the degree of relatedness between the identity data values and the user information comprises:

generating a count of identity data types included in identity data having corresponding identity data types included in the user information; and for an identity data type having a corresponding identity data type included in the user information, generating a comparison value indicating how closely the identity data value matches a user information value for the corresponding identity data type included in the user information, wherein the metric is based at least in part on the count and the comparison value.

4. The computer-implemented method of claim 1, wherein generating the metric indicating the degree of relatedness between the identity data values and the user information comprises:

identifying a historical weight for the identity data value based on a difference between a current time and a time when identity data was collected; and generating a comparison value indicating how closely the identity data value matches a user information value for a corresponding identity data type included in the user information, wherein the comparison value is weighted based at least in part on the historical weight.

5. The computer-implemented method of claim 1, wherein the first information is included in a request for personalized content, and wherein the computer-implemented method further comprises transmitting at least a portion of the user information and at least one of the identity data values of the one candidate user to a personalized content service.

6. The computer-implemented method of claim 1, further comprising:

receiving second information identifying a second user of a second mobile device from a second service associated with the second mobile device;

requesting candidate user information from the database using the second information; and in response to receiving no candidate user information results, transmitting instructions to the second mobile device to request input values to identify the second user.

7. The computer-implemented method of claim 1, further comprising:

causing, in response to receiving the first information, a consent request to be received at the mobile device; and receiving a consent response in response to causing the consent request, wherein said querying is based in part on the consent response.

8. A computer-implemented method of identification of a user of a mobile device, the method comprising:

receiving first information identifying the user of a mobile device;

identifying, using fuzzy matching, a set of candidates associated with at least a portion of the first information from a credit header database, wherein each candidate includes second information identifying the respective candidate, wherein the second information includes at least one first data field included in the first information;

determining a degree of difference between the second information of each respective candidate and the first information;

excluding candidates from the set of candidates based on the degree of difference;

for each candidate included in the set of candidates, determining a degree of relatedness between a value for the user for the at least one first data field and a value for the candidate for the at least one first data field;

identifying a specific candidate included in the set of candidates as the user based on the degree of relatedness; and determining the identified candidate qualifies for an offer for a line of credit.

9. The computer-implemented method of claim 8, wherein a service provider comprising at least one of an internet service provider, an application service provider, a cellular service provider, or a merchant service provider provides the first information.

10. The computer-implemented method of claim 8, further comprising generating an individual metric for each of the candidates included in the set of candidates, wherein the individual metric indicates the degree of relatedness.

11. The computer-implemented method of claim 10, wherein generating the individual metric comprises:

generating a count of first data fields included in the first information having corresponding second data fields included in the second information; and for a data field having the corresponding second data field included in the second information, generating a comparison value indicating how closely a value for the first data field in the first information matches a value for the corresponding second data field included in the second information, wherein the metric is based at least in part on the count and the comparison value.

12. The computer-implemented method of claim 10, wherein generating the individual metric indicating the degree of relatedness comprises:

identifying a historical weight for a value for a second data field included in the second information based on a difference between a current time and a time when the second information was collected; and generating a comparison value indicating how closely a value for a first data field in the first information matches the value for the second data field included in the second information, wherein the comparison value is weighted based at least in part on the historical weight.

13. The computer-implemented method of claim 8, further comprising transmitting at least a portion of a mobile identifier associated with the mobile device and at least one value of the identified candidate to a personalized content service.

14. The computer-implemented method of claim 8, further comprising:
- determining the set of candidates includes no candidate users;
- in response to receiving no candidate user information results, causing instructions to be received at the mobile device to request input values;
- generating a custom candidate user based on received input values; and
- adding the custom candidate user to the set of candidates.

15. The computer-implemented method of claim 8, further comprising:
- transmitting, in response to receiving the first information, a consent request to be received at the mobile device; and
- receiving a consent response in response to transmitting the consent request, wherein said identifying of the set of candidates is based in part on the consent response.

16. The computer-implemented method of claim 8, wherein identifying the set of candidates comprises querying a database storing information regarding a plurality of users, wherein the set of candidates includes one or more users having the largest quantity of identity data values matching the first information.

17. A system comprising:
- a computer-readable memory storing executable instructions; and
- one or more computer processors in communication with the computer-readable memory, wherein the one or more computer processors are configured to execute the executable instructions to at least:
  - receive first information identifying a user of a device from a service provider, the first information based on a device identifier associated with the device;
  - identify, using fuzzy matching, a set of candidates associated with at least a portion of the first information from a credit header database, wherein each candidate includes second information identifying the respective candidate and the second information having at least one data field included in the first information;
  - remove candidates from the set of candidates based on a degree of difference between the second information of each respective candidate and the first information;
  - generate an individual metric for each of the candidates included in the set of candidates, wherein the individual metric indicates a degree of relatedness between the second information and the first information;
  - identify a specific candidate included in the set of candidates as the user based on an associated individual metric corresponding to a threshold; and
  - determine the identified candidate qualifies for an offer for a line of credit.

18. The system of claim 17, wherein the one or more computer processors are further configured to execute the executable instructions to:
- identify the specific candidate and a second candidate having metrics corresponding to the threshold;
- identify a differentiation data field, wherein a value for the differentiation data field for the specific candidate is different from a value for the differentiation data field for the second candidate;
- receive input from the device for the differentiation data field; and
- determine the input corresponds to the value of the differentiation data field for the specific candidate.

19. The system of claim 17, wherein the one or more computer processors are further configured to execute the executable instructions to transmit at least a portion of the device identifier and at least one of the values of the specific candidate to a personalized content service.

20. The system of claim 17, wherein identifying the set of candidates comprises querying a database storing information regarding a plurality of users, wherein the set of candidates include one or more users having the largest quantity of identity data values matching the first information.

* * * * *